(12) United States Patent
Lim et al.

(10) Patent No.: US 12,457,322 B2
(45) Date of Patent: Oct. 28, 2025

(54) METHOD AND APPARATUS FOR ENCODING/DECODING IMAGE IN INTRA PREDICTION AND RECORDING MEDIUM FOR STORING BITSTREAM

(71) Applicants: Electronics and Telecommunications Research Institute, Daejeon (KR); CHIPS & MEDIA, INC, Seoul (KR)

(72) Inventors: Sung Chang Lim, Daejeon (KR); Jung Won Kang, Daejeon (KR); Ha Hyun Lee, Seoul (KR); Jin Ho Lee, Daejeon (KR); Hui Yong Kim, Daejeon (KR); Dae Yeon Kim, Seoul (KR)

(73) Assignees: Electronics and Telecommunications Research Institute, Daejeon (KR); CHIPS & MEDIA, INC, Seoul (KR)

( * ) Notice: Subject to any disclaimer, the term of this patent is extended or adjusted under 35 U.S.C. 154(b) by 264 days.

(21) Appl. No.: 17/608,399

(22) PCT Filed: Apr. 29, 2020

(86) PCT No.: PCT/KR2020/005750
§ 371 (c)(1),
(2) Date: Nov. 2, 2021

(87) PCT Pub. No.: WO2020/226359
PCT Pub. Date: Nov. 12, 2020

(65) Prior Publication Data
US 2022/0279161 A1    Sep. 1, 2022

(30) Foreign Application Priority Data

May 3, 2019  (KR) .................. 10-2019-0052145
Jun. 21, 2019 (KR) .................. 10-2019-0073909
(Continued)

(51) Int. Cl.
*H04N 19/105* (2014.01)
*H04N 19/119* (2014.01)
(Continued)

(52) U.S. Cl.
CPC ......... *H04N 19/105* (2014.11); *H04N 19/119* (2014.11); *H04N 19/132* (2014.11);
(Continued)

(58) Field of Classification Search
None
See application file for complete search history.

(56) References Cited

U.S. PATENT DOCUMENTS 11,290,713 B1 * 3/2022 Choi ................ H04N 19/11
2011/0280304 A1 * 11/2011 Jeon ................ H04N 19/176
375/E7.243

(Continued)

FOREIGN PATENT DOCUMENTS

CN  102972028 A  3/2013
CN  105284113 A  1/2016
(Continued)

OTHER PUBLICATIONS

Chun-Chi Chen et al., CE9: Removal of 4×N/8×8 CUs and Boundary Padding Process from DMVR (Test 9.1.1), Document: JVET-N0407-v2, Qualcomm Inc., Joint Video Experts Team (JVET) of ITU-T SG 16 WP 3 and ISO/IEC JTC 1/SC 29/WG 11, 14th Meeting: Geneva, CH, Mar. 19-27, 2019.

(Continued)

*Primary Examiner* — Edemio Navas, Jr.
(74) *Attorney, Agent, or Firm* — BROADVIEW IP LAW, PC

(57) ABSTRACT

Disclosed herein is an image encoding/decoding method. A method of decoding an image includes determining an intra prediction mode of a current block, and generating a pre-
(Continued)

diction block of the current block, by performing prediction based on the intra prediction mode. When the intra prediction mode of the current block is a matrix-based intra prediction (MIP) mode, a length of a reference sample used for intra prediction is derived based on a length of the current block.

16 Claims, 53 Drawing Sheets

(30) Foreign Application Priority Data

| | | | |
|---|---|---|---|
| Jun. 24, 2019 | (KR) | ......................... | 10-2019-0075285 |
| Jul. 12, 2019 | (KR) | ......................... | 10-2019-0084156 |
| Jul. 12, 2019 | (KR) | ......................... | 10-2019-0084793 |
| Sep. 23, 2019 | (KR) | ......................... | 10-2019-0117079 |
| Jan. 13, 2020 | (KR) | ......................... | 10-2020-0004039 |

(51) Int. Cl.

| | |
|---|---|
| *H04N 19/132* | (2014.01) |
| *H04N 19/169* | (2014.01) |
| *H04N 19/176* | (2014.01) |
| *H04N 19/186* | (2014.01) |
| *H04N 19/80* | (2014.01) |

(52) U.S. Cl.
CPC ......... *H04N 19/176* (2014.11); *H04N 19/186* (2014.11); *H04N 19/1883* (2014.11); *H04N 19/80* (2014.11)

(56) References Cited

U.S. PATENT DOCUMENTS

| | | | | |
|---|---|---|---|---|
| 2014/0105283 | A1 | 4/2014 | Li et al. | |
| 2014/0369426 | A1* | 12/2014 | Li | ......................... H04N 19/186 |
| | | | | 375/240.29 |
| 2016/0277762 | A1* | 9/2016 | Zhang | .................. H04N 19/593 |
| 2019/0191155 | A1 | 6/2019 | Ko et al. | |
| 2020/0099925 | A1 | 3/2020 | Lee | |
| 2020/0236356 | A1* | 7/2020 | Bordes | .................. H04N 19/172 |
| 2020/0344468 | A1* | 10/2020 | Lin | ...................... H04N 19/105 |
| 2021/0092395 | A1* | 3/2021 | Zhang | .................. H04N 19/132 |
| 2021/0160514 | A1* | 5/2021 | Ma | ......................... H04N 19/70 |
| 2021/0235127 | A1* | 7/2021 | Chen | .................... H04N 19/423 |
| 2021/0258608 | A1* | 8/2021 | Filippov | ............... H04N 19/182 |
| 2021/0297688 | A1* | 9/2021 | Xu | ......................... H04N 19/159 |
| 2021/0385482 | A1* | 12/2021 | Liu | ......................... H04N 19/513 |
| 2022/0141477 | A1* | 5/2022 | Kim | ......................... H04N 19/82 |
| | | | | 375/240.12 |
| 2023/0050376 | A1* | 2/2023 | Filippov | ............... H04N 19/176 |

FOREIGN PATENT DOCUMENTS

| | | |
|---|---|---|
| CN | 109417617 A | 3/2019 |
| KR | 100772576 B1 | 11/2007 |
| KR | 1020180123674 A | 11/2018 |
| KR | 1020190028325 A | 3/2019 |
| KR | 1020190044554 A | 4/2019 |
| WO | 2001086962 A1 | 11/2001 |
| WO | 2017148345 A1 | 9/2017 |
| WO | 2019/050292 A1 | 3/2019 |

OTHER PUBLICATIONS

Dae-Yeon Kim et al., CE3-related: CCLM with unified filter shape, Joint Video Experts Team (JVET), Document: JVET P0265 r1, Chips&Media and Electronics and Telecommunications Research Institute (ETRI), Joint Video Experts Team (JVET) of ITU-T SG 16 WP 3 and ISO/IEC JTC 1/SC 29/WG 11, 16th Meeting: Geneva, CH, Oct. 1-11, 2019.

Dae-Yeon Kim et al., CE3-related: Simplification on CCLM process, Document: JVET-00343, Chips&Media and Electronics and Telecommunications Research Institute (ETRI), Joint Video Experts Team (JVET) of ITU-T SG 16 WP 3 and ISO/IEC JTC 1/SC 29/WG 11, 15th Meeting: Gothenburg, SE, Jul. 3-12, 2019.

Geert Van Der Auwera et al., Description of Core Experiment 3: Intra Prediction and Mode Coding, Document: JVET-J1023, CE coordinators, Joint Video Experts Team (JVET) of ITU-T SG 16 WP 3 and ISO/IEC JTC 1/SC 29/WG 11, 10th Meeting: San Diego, USA, Apr. 10-20, 2018.

Yi-Wen Chen et al., AHG16: On derivation of CCLM predictors, Document: JVET-Q0500, Kwai Inc., Joint Video Experts Team (JVET) of ITU-T SG 16 WP 3 and ISO/IEC JTC 1/SC 29/WG 11, 17th Meeting: Brussels, BE, Jan. 7-17, 2020.

Bross, Benjamin et al. "Versatile Video Coding (Draft 4)." JVET-M1001-v7. Joint Video Experts Team (JVET) of ITU-T SG 16 WP 3 and ISO/IEC JTC 1/SC 29/WG 11. 13th Meeting: Marrakech, MA, Jan. 9-18, 2019.

Pfaff, Jonathan et al., "CE3: Affine linear weighted intra prediction (CE3-4.1, CE3-4.2)," Joint Video Experts Team (JVET) of ITU-T SG 16 WP 3 and ISO/IEC JTC 1/SC 29/WG 11, Mar. 2019. doc: JVET-N0217.

* cited by examiner

FIG. 12

FIG. 13
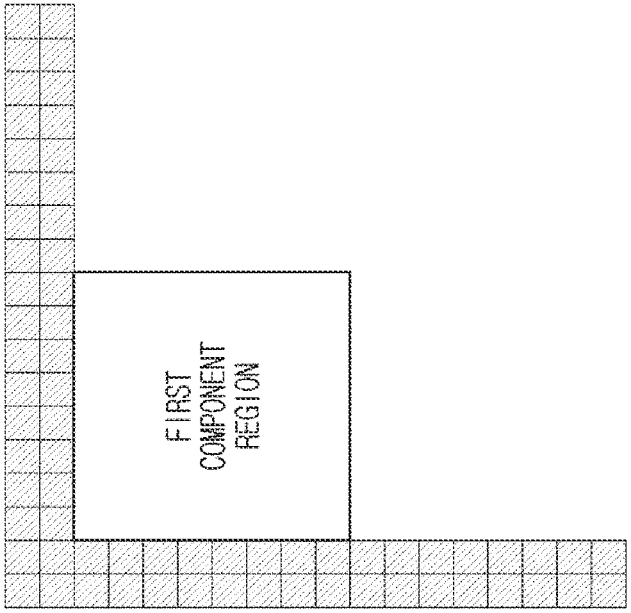
(a) EXAMPLE OF GENERATING NEIGHBORING SAMPLE LINE IN CASE OF YUV 4:4:4
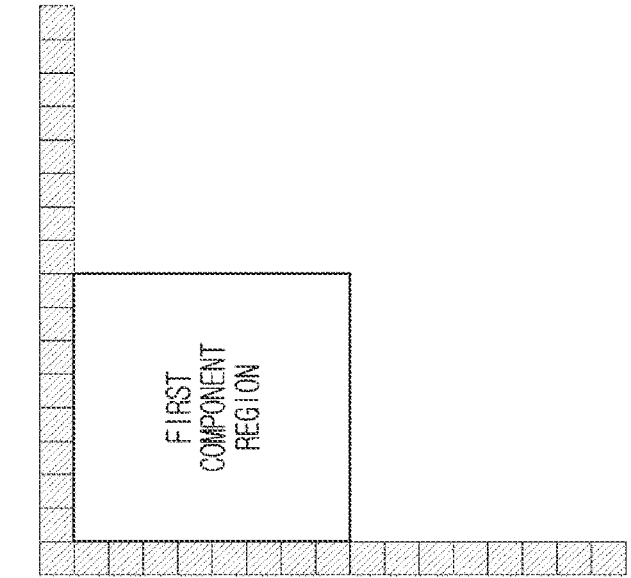
(b) EXAMPLE OF GENERATING NEIGHBORING SAMPLE LINE IN CASE OF YUV 4:2:2

(a) 4:2:0 co-sited    (b) 4:2:0 mid-sited

+ : FIRST COMPONENT
○ : SECOND COMPONENT

FIG. 25

| | |
|---|---|
| if( sps_mrl_enabled_flag && ( ( y0 % CtbSizeY ) > 0 ) ) | |
|     intra_luma_ref_idx[ x0 ][ y0 ] | ae(v) |
| if( sps_isp_enabled_flag && intra_luma_ref_idx[ x0 ][ y0 ] == 0 && <br>   ( cbWidth <= MaxTbSizeY && cbHeight <= MaxTbSizeY ) && <br>   ( cbWidth * cbHeight > MinTbSizeY * MinTbsizeY ) ) | |
|     intra_subpartitions_mode_flag[ x0 ][ y0 ] | ae(v) |
| if( intra_subpartitions_mode_flag[ x0 ][ y0 ] == 1 && <br>   cbWidth <= MaxTbSizeY && cbHeight <= MaxTbSizeY ) | |
|     intra_subpartitions_split_flag[ x0 ][ y0 ] | ae(v) |

| | |
|---|---|
| if( sps_mrl_enabled_flag) | |
|     intra_luma_ref_idx[ x0 ][ y0 ] | ae(v) |
| if( sps_isp_enabled_flag && intra_luma_ref_idx[ x0 ][ y0 ] == 0 && <br>   ( cbWidth <= MaxTbSizeY && cbHeight <= MaxTbSizeY ) && <br>   ( cbWidth * cbHeight > MinTbSizeY * MinTbsizeY ) ) | |
|     intra_subpartitions_mode_flag[ x0 ][ y0 ] | ae(v) |
| if( intra_subpartitions_mode_flag[ x0 ][ y0 ] == 1 && <br>   cbWidth <= MaxTbSizeY && cbHeight <= MaxTbSizeY ) | |
|     intra_subpartitions_split_flag[ x0 ][ y0 ] | ae(v) |

FIG. 26

Specification of CCLM prediction

Inputs to this process are:
- the intra prediction mode predModeIntra,
- a sample location ( xTbC, yTbC ) of the top-left sample of the current transform block relative to the top-left sample of the current picture,
- a variable nTbW specifying the transform block width,
- a variable nTbH specifying the transform block height,
- a variable cIdx specifying the colour component of the current block,
- chroma neighbouring samples p[ x ][ y ], with x = −1, y = 0..2 * nTbH − 1 and x = 0..2 * nTbW − 1, y = −1.

Output of this process are predicted samples predSamples[ x ][ y ], with x = 0..nTbW − 1, y = 0..nTbH − 1.
The current luma location ( xTbY, yTbY ) is derived as follows:

$$( xTbY, yTbY ) = ( xTbC << ( SubWidthC − 1 ), yTbC << ( SubHeightC − 1 ) ) \qquad (26\text{-}1)$$

The variables availL, availT and availTL are derived as follows:
- The derivation process for neighbouring block availability as specified in clause 6.4.4 is invoked with the current luma location ( xCurr, yCurr ) set equal to ( xTbY, yTbY ), the neighbouring luma location ( xTbY − 1, yTbY ), checkPredModeY set equal to FALSE, and cIdx as inputs, and the output is assigned to availL.
- The derivation process for neighbouring block availability as specified in clause 6.4.4 is invoked with the current luma location ( xCurr, yCurr ) set equal to ( xTbY, yTbY ), the neighbouring luma location ( xTbY, yTbY − 1 ), checkPredModeY set equal to FALSE, and cIdx as inputs, and the output is assigned to availT.
- The variable availTL is derived as follows:

$$availTL = availL \,\&\&\, availT \qquad (26\text{-}2)$$

- The number of available top-right neighbouring chroma samples numTopRight is derived as follows:
    - The variable numTopRight is set equal to 0 and availTR is set equal to TRUE.
    - When predModeIntra is equal to INTRA_T_CCLM, the following applies for x = nTbW..2 * nTbW − 1 until availTR is equal to FALSE or x is equal to 2 * nTbW − 1:
        - The derivation process for neighbouring block availability as specified in clause 6.4.4 is invoked with the current luma location ( xCurr, yCurr ) set equal to ( xTbY, yTbY ) the neighbouring luma location ( xTbY + x, yTbY − 1 ), checkPredModeY set equal to FALSE, and cIdx as inputs, and the output is assigned to availTR
        - When availTR is equal to TRUE, numTopRight is incremented by one.
- The number of available left-below neighbouring chroma samples numLeftBelow is derived as follows:
    - The variable numLeftBelow is set equal to 0 and availLB is set equal to TRUE.
    - When predModeIntra is equal to INTRA_L_CCLM, the following applies for y = nTbH..2 * nTbH − 1 until availLB is equal to FALSE or y is equal to 2 * nTbH − 1:
        - The derivation process for neighbouring block availability as specified in clause 6.4.4 is invoked with the current luma location ( xCurr, yCurr ) set equal to ( xTbY, yTbY ), the neighbouring luma location ( xTbY − 1, yTbY + y ), checkPredModeY set equal to FALSE, and cIdx as inputs, and the output is assigned to availLB
        - When availLB is equal to TRUE, numLeftBelow is incremented by one.

FIG. 27

The number of available neighbouring chroma samples on the top and top-right numSampT and the number of available neighbouring chroma samples on the left and left-below numSampL are derived as follows:

- If predModeIntra is equal to INTRA_LT_CCLM, the following applies:

numSampT = availT ? nTbW : 0                                                       (27-1)

numSampL = availL ? nTbH : 0                                                     (27-2)

- Otherwise, the following applies.

numSampT = ( availT && predModeIntra == INTRA_T_CCLM ) ?
    ( nTbW +Min( numTopRight, nTbH ) ) : 0                                     (27-3)

numSampL = ( availL && predModeIntra == INTRA_L_CCLM ) ? ( nTbH +
    Min( numLeftBelow, nTbW ) ) : 0                                        (27-4)

The variable bCTUboundary is derived as follows:

bCTUboundary = ( yTbY & ( CtbSizeY − 1 ) == 0 ) ? TRUE : FALSE.         (27-5)

The variable cntN and array pickPosN with N being replaced by L and T, are derived as follows:

- The variable numIs4N is derived as follows:

numIs4N = ( ( availT && availL && predModeIntra == INTRA_LT_CCLM ) ? 0 : 1)     (27-6)

- The variable startPosN is set equal to numSampN >> ( 2 + numIs4N ).

- The variable pickStepN is set equal to Max( 1, numSampN >> ( 1 + numIs4N ) ).

- If availN is equal to TRUE and predModeIntra is equal to INTRA_LT_CCLM or INTRA_N_CCLM, the following assignments are made:

- cntN is set equal to Min( numSampN, ( 1 + numIs4N ) << 1 ).

- pickPosN[ pos ] is set equal to (startPosN + pos * pickStepN), with pos = 0.. cntN − 1.

- Otherwise, cntN is set equal to 0.

The prediction samples predSamples[ x ][ y ] with x = 0..nTbW − 1, y = 0..nTbH − 1 are derived as follows:

- If both numSampL and numSampT are equal to 0, the following applies.

predSamples[ x ][ y ] = 1 << ( BitDepth − 1 )                                    (27-7)

- Otherwise, the following ordered steps apply:

1. The collocated luma samples pY[ x ][ y ] with x = 0..nTbW * SubWidthC − 1, y = 0..nTbH * SubHeightC − 1 are set equal to the reconstructed luma samples prior to the deblocking filter process at the locations ( xTbY + x, yTbY + y ).

2. The neighbouring luma samples pY[ x ][ y ] are derived as follows:

- When numSampL is greater than 0, the neighbouring left luma samples pY[ x ][ y ] with x = −1..−3, y = 0..SubHeightC * numSampL − 1, are set equal to the reconstructed luma samples prior to the deblocking filter process at the locations ( xTbY + x , yTbY +y ).

- When availT is equal to FALSE, the neighbouring top luma samples pY[ x ][ y ] with x = −1..SubWidthC * numSampT − 1, y = −1..−2, are set equal to the luma samples pY[ x ][ 0 ].

- When availL is equal to FALSE, the neighbouring left luma samples pY[ x ][ y ] with x = −1..−3, y = −1..SubHeightC * numSampL − 1, are set equal to the luma samples pY[ 0 ][ y ].

- When numSampT is greater than 0, the neighbouring top luma samples pY[ x ][ y ] with x = 0..SubWidthC * numSampT − 1, y = −1,−2, are set equal to the reconstructed luma samples prior to the deblocking filter process at the locations ( xTbY+ x, yTbY + y ).

- When availTL is equal to TRUE, the neighbouring top-left luma samples pY[ x ][ y ] with x = −1, y = −1, −2, are set equal to the reconstructed luma samples prior to the deblocking filter process at the locations ( xTbY+ x, yTbY + y ).

FIG. 28

3. The down-sampled collocated luma samples pDsY[ x ][ y ] with x = 0..nTbW − 1, y = 0..nTbH − 1 are derived as follows:

- If both SubWidthC and SubHeightC are equal to 1, the following applies:

- pDsY[ x ][ y ] with x = 1..nTbW − 1, y = 1..nTbH − 1 is derived as follows:

$$pDsY[ x ][ y ] = pY[ x ][ y ] \qquad (28\text{-}1)$$

- Otherwise, the following applies:

- The one-dimensional filter coefficients array F1 and F2, and the 2-dimensional filter coefficients arrays F3 and F4 are specified as follows.

$$F1[ 0 ] = 2, F1[ 1 ] = 0 \qquad (28\text{-}2)$$

$$F2[ 0 ] = 1, F2[ 1 ] = 2, F2[ 2 ] = 1 \quad (28\text{-}3)$$

$$F3[ i ][ j ] = F4[ i ][ j ] = 0, \text{ with } i = 0..2, j = 0..2 \qquad (28\text{-}4)$$

- If both SubWidthC and SubHeightC are equal to 2, the following applies:

$$F1[ 0 ] = 1, F1[ 1 ] = 1 \qquad (28\text{-}5)$$

$$F3[ 0 ][ 1 ] = 1, F3[ 1 ][ 1 ] = 4, F3[ 2 ][ 1 ] = 1, F3[ 1 ][ 0 ] = 1, F3[ 1 ][ 2 ] = 1 \qquad (28\text{-}6)$$

$$F4[ 0 ][ 1 ] = 1, F4[ 1 ][ 1 ] = 2, F4[ 2 ][ 1 ] = 1 \qquad (28\text{-}7)$$

$$F4[ 0 ][ 2 ] = 1, \quad F4[ 1 ][ 2 ] = 2, F4[ 2 ][ 2 ] = 1 \qquad (28\text{-}8)$$

- Otherwise, the following applies:

$$F3[ 1 ][ 1 ] = 8 \qquad (28\text{-}9)$$

$$F4[ 0 ][ 1 ] = 2, F4[ 1 ][ 1 ] = 4, F4[ 2 ][ 1 ] = 2, \qquad (28\text{-}10)$$

- If sps_chroma_vertical_collocated_flag is equal to 1, the following applies:

- pDsY[ x ][ y ] with x = 0..nTbW − 1, y = 0..nTbH − 1 is derived as follows.

$$\begin{aligned}pDsY[ x ][ y ] = (\,&F3[ 1 ][ 0 ] * pY[ SubWidthC * x ][ SubHeightC * y - 1 ] + \\ &F3[ 0 ][ 1 ] * pY[ SubWidthC * x - 1 ][ SubHeightC * y ] + \\ &F3[ 1 ][ 1 ] * pY[ SubWidthC * x ][ SubHeightC * y ] + \qquad (28\text{-}11)\\ &F3[ 2 ][ 1 ] * pY[ SubWidthC * x + 1 ][ SubHeightC * y ] + \\ &F3[ 1 ][ 2 ] * pY[ SubWidthC * x ][ SubHeightC * y + 1 ] + 4\,) >> 3\end{aligned}$$

- Otherwise (sps_chroma_vertical_collocated_flag is equal to 0), the following applies:

- pDsY[ x ][ y ] with x = 0..nTbW − 1, y = 0..nTbH − 1 is derived as follows:

$$\begin{aligned}pDsY[ x ][ y ] = (\,&F4[ 0 ][ 1 ] * pY[ SubWidthC * x - 1 ][ SubHeightC * y ] + \\ &F4[ 0 ][ 2 ] * pY[ SubWidthC * x - 1 ][ SubHeightC * y + 1 ] + \\ &F4[ 1 ][ 1 ] * pY[ SubWidthC * x ][ SubHeightC * y ] + \qquad (28\text{-}12)\\ &F4[ 1 ][ 2 ] * pY[ SubWidthC * x ][ SubHeightC * y + 1 ] + \\ &F4[ 2 ][ 1 ] * pY[ SubWidthC * x + 1 ][ SubHeightC * y ] + \\ &F4[ 2 ][ 2 ] * pY[ SubWidthC * x + 1 ][ SubHeightC * y + 1 ] + 4\,) >> 3\end{aligned}$$

4. When numSampL is greater than 0, the selected neighbouring left chroma samples pSelC[ idx ] are set equal to p[ −1 ][ pickPosL[ idx ] ] with idx = 0..cntL − 1, and the selected down-sampled neighbouring left luma samples pSelDsY[ idx ] with idx = 0..cntL − 1 are derived as follows:

- The variable y is set equal to pickPosL[ idx ]

- If both SubWidthC and SubHeightC are equal to 1, the following applies:

$$pSelDsY[ idx ] = pY[ -1 ][ y ] \qquad (28\text{-}13)$$

FIG. 29

- Otherwise the following applies:
  - If sps_chroma_vertical_collocated_flag is equal to 1, the following applies:

$$pSelDsY[\ idx\ ] = (\ F3[\ 1\ ][\ 0\ ] * pY[\ -SubWidthC\ ][\ SubHeightC * y - 1\ ] +$$
  $$F3[\ 0\ ][\ 1\ ] * pY[\ -1 - SubWidthC\ ][\ SubHeightC * y\ ] +$$
  $$F3[\ 1\ ][\ 1\ ] * pY[\ -SubWidthC\ ][\ SubHeightC * y\ ] + \quad (29\text{-}1)$$
  $$F3[\ 2\ ][\ 1\ ] * pY[\ 1 - SubWidthC\ ][\ SubHeightC * y\ ] +$$
  $$F3[\ 1\ ][\ 2\ ] * pY[\ -SubWidthC\ ][\ SubHeightC * y + 1\ ] + 4\ ) >> 3$$

- Otherwise (sps_chroma_vertical_collocated_flag is equal to 0), the following applies:

$$pSelDsY[\ idx\ ] = (\ F4[\ 0\ ][\ 1\ ] * pY[\ -1 - SubWidthC\ ][\ SubHeightC * y\ ] +$$
  $$F4[\ 0\ ][\ 2\ ] * pY[\ -1 - SubWidthC\ ][\ SubHeightC * y + 1\ ] +$$
  $$F4[\ 1\ ][\ 1\ ] * pY[\ -SubWidthC\ ][\ SubHeightC * y\ ] + \quad (29\text{-}2)$$
  $$F4[\ 1\ ][\ 2\ ] * pY[\ -SubWidthC\ ][\ SubHeightC * y + 1\ ] +$$
  $$F4[\ 2\ ][\ 1\ ] * pY[\ 1 - SubWidthC\ ][\ SubHeightC * y\ ] +$$
  $$F4[\ 2\ ][\ 2\ ] * pY[\ 1 - SubWidthC\ ][\ SubHeightC * y + 1\ ] + 4\ ) >> 3$$

5. When numSampT is greater than 0, the selected neighbouring top chroma samples pSelC[ idx ] are set equal to p[ pickPosT[ idx - cntL ] ][ -1 ] with idx = cntL..cntL + cntT - 1, and the down-sampled neighbouring top luma samples pSelDsY[ idx ] with idx = 0..cntL + cntT - 1 are specified as follows:

- The variable x is set equal to pickPosT[ idx - cntL ].
- If both SubWidthC and SubHeightC are equal to 1, the following applies:

$$pSelDsY[\ idx\ ] = pY[\ x\ ][\ -1\ ] \quad (29\text{-}3)$$

- Otherwise, the following applies:
  - If sps_chroma_vertical_collocated_flag is equal to 1, the following applies:
    - If bCTUboundary is equal to FALSE, the following applies:

$$pSelDsY[\ idx\ ] = (\ F3[\ 1\ ][\ 0\ ] * pY[\ SubWidthC * x\ ][\ -1 - SubHeightC\ ] +$$
    $$F3[\ 0\ ][\ 1\ ] * pY[\ SubWidthC * x - 1\ ][\ -SubHeightC\ ] +$$
    $$F3[\ 1\ ][\ 1\ ] * pY[\ SubWidthC * x\ ][\ -SubHeightC\ ] + \quad (29\text{-}4)$$
    $$F3[\ 2\ ][\ 1\ ] * pY[\ SubWidthC * x + 1\ ][\ -SubHeightC\ ] +$$
    $$F3[\ 1\ ][\ 2\ ] * pY[\ SubWidthC * x\ ][\ 1 - SubHeightC\ ] + 4\ ) >> 3$$

- Otherwise (bCTUboundary is equal to TRUE), the following applies:

$$pSelDsY[\ idx\ ] = (\ F2[\ 0\ ] * pY[\ SubWidthC * x - 1\ ][\ -1\ ] +$$
    $$F2[\ 1\ ] * pY[\ SubWidthC * x\ ][\ -1\ ] + \quad (29\text{-}5)$$
    $$F2[\ 2\ ] * pY[\ SubWidthC * x + 1\ ][\ -1\ ] + 2\ ) >> 2$$

- Otherwise (sps_chroma_vertical_collocated_flag is equal to 0), the following applies:
    - If bCTUboundary is equal to FALSE, the following applies:

$$pSelDsY[\ idx\ ] = (\ F4[\ 0\ ][\ 1\ ] * pY[\ SubWidthC * x - 1\ ][\ -1\ ] +$$
    $$F4[\ 0\ ][\ 2\ ] * pY[\ SubWidthC * x - 1\ ][\ -2\ ] +$$
    $$F4[\ 1\ ][\ 1\ ] * pY[\ SubWidthC * x\ ][\ -1\ ] + \quad (29\text{-}6)$$
    $$F4[\ 1\ ][\ 2\ ] * pY[\ SubWidthC * x\ ][\ -2\ ] +$$
    $$F4[\ 2\ ][\ 1\ ] * pY[\ SubWidthC * x + 1\ ][\ -1\ ] +$$
    $$F4[\ 2\ ][\ 2\ ] * pY[\ SubWidthC * x + 1\ ][\ -2\ ] + 4\ ) >> 3$$

- Otherwise (bCTUboundary is equal to TRUE), the following applies:

$$pSelDsY[\ idx\ ] = (\ F2[\ 0\ ] * pY[\ SubWidthC * x - 1\ ][\ -1\ ] +$$
    $$F2[\ 1\ ] * pY[\ SubWidthC * x\ ][\ -1\ ] + \quad (29\text{-}7)$$
    $$F2[\ 2\ ] * pY[\ SubWidthC * x + 1\ ][\ -1\ ] + 2\ ) >> 2$$

FIG. 30

6. When cntT + cntL is not equal to 0, the variables minY, maxY, minC and maxC are derived as follows.
   – When cntT + cntL is equal to 2, pSelComp[ 3 ] is set equal to pSelComp[ 0 ], pSelComp[ 2 ] is set equal to pSelComp[ 1 ], pSelComp[ 0 ] is set equal to pSelComp[ 1 ], and pSelComp[ 1 ] is set equal to pSelComp[ 3 ], with Comp being replaced by DsY and C.
   – The arrays minGrpIdx and maxGrpIdx are derived as follows:

$$minGrpIdx[ 0 ] = 0 \tag{30-1}$$

$$minGrpIdx[ 1 ] = 2 \tag{30-2}$$

$$maxGrpIdx[ 0 ] = 1 \tag{30-3}$$

$$maxGrpIdx[ 1 ] = 3 \tag{30-4}$$

– When pSelDsY[ minGrpIdx[ 0 ] ] is greater than pSelDsY[ minGrpIdx[ 1 ] ], minGrpIdx[ 0 ] and minGrpIdx[ 1 ] are swapped as follows:

$$( minGrpIdx[ 0 ], minGrpIdx[ 1 ] ) = Swap( minGrpIdx[ 0 ], minGrpIdx[ 1 ] ) \tag{30-5}$$

– When pSelDsY[ maxGrpIdx[ 0 ] ] is greater than pSelDsY[ maxGrpIdx[ 1 ] ], maxGrpIdx[ 0 ] and maxGrpIdx[ 1 ] are swapped as follows:

$$( maxGrpIdx[ 0 ], maxGrpIdx[ 1 ] ) = Swap( maxGrpIdx[ 0 ], maxGrpIdx[ 1 ] ) \tag{30-6}$$

– When pSelDsY[ minGrpIdx[ 0 ] ] is greater than pSelDsY[ maxGrpIdx[ 1 ] ], arrays minGrpIdx and maxGrpIdx are swapped as follows:

$$( minGrpIdx, maxGrpIdx ) = Swap( minGrpIdx, maxGrpIdx ) \tag{30-7}$$

– When pSelDsY[ minGrpIdx[ 1 ] ] is greater than pSelDsY[ maxGrpIdx[ 0 ] ], minGrpIdx[ 1 ] and maxGrpIdx[ 0 ] are swapped as follows:

$$( minGrpIdx[ 1 ], maxGrpIdx[ 0 ] ) = Swap( minGrpIdx[ 1 ], maxGrpIdx[ 0 ] ) \tag{30-8}$$

– The variables maxY, maxC, minY and minC are derived as follows:

$$maxY = ( pSelDsY[ maxGrpIdx[ 0 ] ] + pSelDsY[ maxGrpIdx[ 1 ] ] + 1 ) >> 1 \tag{30-9}$$

$$maxC = ( pSelC[ maxGrpIdx[ 0 ] ] + pSelC[ maxGrpIdx[ 1 ] ] + 1 ) >> 1 \tag{30-10}$$

$$minY = ( pSelDsY[ minGrpIdx[ 0 ] ] + pSelDsY[ minGrpIdx[ 1 ] ] + 1 ) >> 1 \tag{30-11}$$

$$minC = ( pSelC[ minGrpIdx[ 0 ] ] + pSelC[ minGrpIdx[ 1 ] ] + 1 ) >> 1 \tag{30-12}$$

FIG. 31

7. The variables a, b, and k are derived as follows:
   – If numSampL is equal to 0, and numSampT is equal to 0, the following applies:

$$k = 0 \tag{31-1}$$

$$a = 0 \tag{31-2}$$

$$b = 1 << (\text{BitDepth} - 1) \tag{31-3}$$

– Otherwise, the following applies:

$$\text{diff} = \text{maxY} - \text{minY} \tag{31-4}$$

– If diff is not equal to 0, the following applies:

$$\text{diffC} = \text{maxC} - \text{minC} \tag{31-5}$$

$$x = \text{Floor}(\text{Log2}(\text{diff})) \tag{31-6}$$

$$\text{normDiff} = ((\text{diff} << 4) >> x) \,\&\, 15 \tag{31-7}$$

$$x \mathrel{+}= (\text{normDiff} \,!=\, 0) \,?\, 1 : 0 \tag{31-8}$$

$$y = \text{Abs}(\text{diffC}) > 0 \,?\, \text{Floor}(\text{Log2}(\text{Abs}(\text{diffC}))) + 1 : 0 \tag{31-9}$$

$$a = (\text{diffC} * (\text{divSigTable}[\text{normDiff}] \,|\, 8) + 2^{y-1}) >> y \tag{31-10}$$

$$k = ((3 + x - y) < 1) \,?\, 1 : 3 + x - y \tag{31-11}$$

$$a = ((3 + x - y) < 1) \,?\, \text{Sign}(a) * 15 : a \tag{31-12}$$

$$b = \text{minC} - ((a * \text{minY}) >> k) \tag{31-13}$$

where divSigTable[ ] is specified as follows:

$$\text{divSigTable}[\,] = \{0, 7, 6, 5, 5, 4, 4, 3, 3, 2, 2, 1, 1, 1, 1, 0\} \tag{31-14}$$

– Otherwise (diff is equal to 0), the following applies:

$$k = 0 \tag{31-15}$$

$$a = 0 \tag{31-16}$$

$$b = \text{minC} \tag{31-17}$$

8. The prediction samples predSamples[ x ][ y ] with x = 0..nTbW − 1, y = 0..nTbH − 1 are derived as follows:

$$\text{predSamples}[x][y] = \text{Clip1}(((\text{pDsY}[x][y] * a) >> k) + b) \tag{31-18}$$

NOTE – This process uses sps_chroma_vertical_collocated_flag. However, in order to simplify implementation, it does not use sps_chroma_horizontal_collocated_flag.

FIG. 32

Variation #1 of CCLM prediction

Inputs to this process are:
- the intra prediction mode predModeIntra,
- a sample location ( xTbC, yTbC ) of the top-left sample of the current transform block relative to the top-left sample of the current picture,
- a variable nTbW specifying the transform block width,
- a variable nTbH specifying the transform block height,
- chroma neighbouring samples p[ x ][ y ], with x = −1, y = 0..2 * nTbH − 1 and x = 0..2 * nTbW − 1, y = −1.

Output of this process are predicted samples predSamples[ x ][ y ], with x = 0..nTbW − 1, y = 0..nTbH − 1.

The current luma location ( xTbY, yTbY ) is derived as follows:

$$( xTbY, yTbY ) = ( xTbC << ( SubWidthC − 1 ), yTbC << ( SubHeightC − 1 ) ) \qquad (8\text{-}145)$$

The variables availL, availT and availTL are derived as follows.
- The availability of left neighbouring samples derivation process for a block as specified in clause 6.4.X [Ed. (BB): Neighbouring blocks availability checking process tbd] is invoked with the current chroma location ( xCurr, yCurr ) set equal to ( xTbC, yTbC ) and the neighbouring chroma location ( xTbC − 1, yTbC ) as inputs, and the output is assigned to availL.
- The availability of top neighbouring samples derivation process for a block as specified in clause 6.4.X [Ed. (BB): Neighbouring blocks availability checking process tbd] is invoked with the current chroma location ( xCurr, yCurr ) set equal to ( xTbC, yTbC ) and the neighbouring chroma location ( xTbC, yTbC − 1 ) as inputs, and the output is assigned to availT.
- The variable availTL is derived as follows.

$$availTL = availL\ \&\&\ availT \qquad (8\text{-}146)$$

- The number of available top-right neighbouring chroma samples numTopRight is derived as follows:
    - The variable numTopRight is set equal to 0 and availTR is set equal to TRUE.
    - When predModeIntra is equal to INTRA_T_CCLM, the following applies for x = nTbW..2 * nTbW − 1 until availTR is equal to FALSE or x is equal to 2 * nTbW − 1:
        - The availability derivation process for a block as specified in clause 6.4.X [Ed. (BB): Neighbouring blocks availability checking process tbd] is invoked with the current chroma location ( xCurr, yCurr ) set equal to ( xTbC , yTbC ) and the neighbouring chroma location ( xTbC + x, yTbC − 1 ) as inputs, and the output is assigned to availableTR.
        - When availableTR is equal to TRUE, numTopRight is incremented by one.
- The number of available left-below neighbouring chroma samples numLeftBelow is derived as follows:
    - The variable numLeftBelow is set equal to 0 and availLB is set equal to TRUE.
    - When predModeIntra is equal to INTRA_L_CCLM, the following applies for y = nTbH..2 * nTbH − 1 until availLB is equal to FALSE or y is equal to 2 * nTbH − 1:
        - The availability derivation process for a block as specified in clause 6.4.X [Ed. (BB): Neighbouring blocks availability checking process tbd] is invoked with the current chroma location ( xCurr, yCurr ) set equal to ( xTbC , yTbC ) and the neighbouring chroma location ( xTbC − 1, yTbC + y ) as inputs, and the output is assigned to availableLB.
        - When availableLB is equal to TRUE, numLeftBelow is incremented by one.
    - The number of available neighbouring chroma samples on the top and top-right numSampT and the number of available neighbouring chroma samples on the left and left-below numSampL are derived as follows:

FIG. 33

- If predModeIntra is equal to INTRA_LT_CCLM, the following applies:

numSampT = nTbW                                                                                      (8-147)

numSampL = nTbH                                                                                     (8-148)

- Otherwise, the following applies:

numSampT = ( predModeIntra == INTRA_T_CCLM ) ? ( nTbW + Min( numTopRight, nTbH ) ) : 0      (8-149)

numSampL = ( predModeIntra == INTRA_L_CCLM ) ? ( nTbH + Min( numLeftBelow, nTbW ) ) : 0      (8-150)

The variable bCTUboundary is derived as follows:

bCTUboundary = ( yTbC & ( 1 << ( CtbLog2SizeY − 1 ) − 1 ) == 0 ) ? TRUE : FALSE.     (8-151)

The variable cntN and array pickPosN with N being replaced by L and T, are derived as follows:

- The variable numIs4N is derived as follows:

numIs4N = ( ( predModeIntra == INTRA_LT_CCLM ) ? 0 : 1)     (8-152)

- The variable startPosN is set equal to numSampN >> ( 2 + numIs4N ).
- The variable pickStepN is set equal to Max( 1, numSampN >> ( 1 + numIs4N ) ).
- If predModeIntra is equal to INTRA_LT_CCLM or INTRA_N_CCLM, the following assignments are made:
    - cntN is set equal to Min( numSampN, ( 1 + numIs4N ) << 1 ).
    - pickPosN[ pos ] is set equal to (startPosN + pos * pickStepN), with pos = 0.. cntN − 1.
- Otherwise, cntN is set equal to 0.

The prediction samples predSamples[ x ][ y ] with x = 0..nTbW − 1, y = 0..nTbH − 1 are derived by the following ordered steps:

1. The collocated luma samples pY[ x ][ y ] with x = 0..nTbW * SubWidthC − 1, y = 0..nTbH * SubHeightC − 1 are set equal to the reconstructed luma samples prior to the deblocking filter process at the locations ( xTbY + x, yTbY + y ).

2. For the generation of the neighbouring luma samples pY[ x ][ y ] with x = −3.. −1, y = −3..numSampL * SubHeightC − 1 and x = 0..numSampT * SubWidthC − 1, y = −3.. −1, the following applies:

- The reference sample availability marking process as specified in clause 8.4.5.2.6 is invoked with the sample location ( xTbC, yTbC ), the intra prediction reference line index 0, the reference sample width nTbW, the reference sample height nTbH, the colour component index 1 as inputs, and the availability of the neighbouring chroma samples refUnfiltC[ x ][ y ] with x = −1, y = −1..2 * nTbH − 1 and x = 0..2 * nTbW − 1, y = −1 as output.

- The availablity of the neighbouring luma samples refUnfilt[ x ][ y ] with x = −1, y = −1..2 * nTbH * SubHeightC − 1 and x = 0..2 * nTbW * SubWidthC − 1, y = −1 are derived as follows:

- refUnfilt[ −1 ][ −1 ] is set equal to refUnfiltC[ −1 ][ −1 ].

- refUnfilt[ x ][ y ] with x = −1, y = 0..2 * nTbH * SubHeightC − 1 is derived as follows:

refUnfilt[ x ][ y * SubHeightC ] = refUnfiltC[ x ][ y ]

If SubHeightC is equal to 2, the following applies:

refUnfilt[ x ][ y * SubHeightC + 1 ] = refUnfiltC[ x ][ y ]

- refUnfilt[ x ][ y ] with x = 0.. 2 * SubWidthC * nTbW − 1, y = −1 is derived as follows:

refUnfilt[ x * SubWidthC ][ y ] = refUnfiltC[ x ][ y ]

If SubWidthC is equal to 2, the following applies:

refUnfilt[ x * SubWidthC + 1 ][ y ] = refUnfiltC[ x ][ y ]

FIG. 34

- For the reference line index refIdx with 0, 2, when at least one sample refUnfilt[ x ][ y ] with x = −1, y = −1..SubHeightC * numSampL − 1 and x = 0..SubWidthC * numSampT − 1, y = −1 is marked as "not available for intra prediction", the reference sample substitution process as specified in clause 8.4.5.2.7 is invoked with the intra prediction reference line index refIdx, the reference sample width (SubWidth * numSampT), the reference sample height (SubHeightC * numSampL), the reference samples refUnfilt[ x ][ y ] with x = −1, y = −1..SubHeightC * numSampL − 1 and x = 0..SubWidthC * numSampT − 1, y = −1, and the colour component index 0 as inputs, and the neighbouring luma samples pY[ x ][ y ] with x = −1 − refIdx, y = −1 − refIdx..(SubHeightC * numSampL) and x = −refIdx..(SubWidthC * numSampT), y = −1 − refIdx as output.

3. The down-sampled collocated luma samples pDsY[ x ][ y ] with x = 0..nTbW − 1, y = 0..nTbH − 1 are derived as follows:

- If both SubWidthC and SubHeightC are equal to 1, the following applies:
     - pDsY[ x ][ y ] with x = 1..nTbW − 1, y = 1..nTbH − 1 is derived as follows:

$$pDstY[ x ][ y ] = pY[ x ][ y ] \qquad (8\text{-}153)$$

- Otherwise, the following applies:
     - The one-dimention filter coefficients array F2, and the 2-dimention filter coefficients array F3 and F4 are specified as follows.

$$F2[ 0 ] = 1, F2[ 1 ] = 2, F2[ 2 ] = 1 \qquad (8\text{-}153)$$

$$F3[ i ][ j ] = F4[ i ][ j ] = 0, \text{ with } i = 0..2, j = 0..2 \qquad (8\text{-}153)$$

- If both SubWidthC and SubHeightC are equal to 2, the following applies:

$$F3[ 0 ][ 1 ] = 1, F3[ 1 ][ 1 ] = 4, F2[ 2 ][ 1 ] = 1, F3[ 1 ][ 0 ] = 1, F3[ 1 ][ 2 ] = 1 \qquad (8\text{-}153)$$

$$F4[ 0 ][ 1 ] = 1, F4[ 1 ][ 1 ] = 2, F4[ 2 ][ 1 ] = 1 \qquad (8\text{-}153)$$

$$F4[ 0 ][ 2 ] = 1, \quad F4[ 1 ][ 2 ] = 2, F4[ 2 ][ 2 ] = 1 \qquad (8\text{-}153)$$

- Otherwise, the following applies:

$$F3[ 1 ][ 1 ] = 8 \qquad (8\text{-}153)$$

$$F4[ 0 ][ 1 ] = 2, F4[ 1 ][ 1 ] = 4, F4[ 2 ][ 1 ] = 2, \qquad (8\text{-}153)$$

- If sps_cclm_colocated_chroma_flag is equal to 1, the following applies:
     - pDsY[ x ][ y ] with x = 0..nTbW − 1, y = 0..nTbH − 1 is derived as follows:

$$\begin{aligned}pDsY[ x ][ y ] = (\ &F3[ 1 ][ 0 ] * pY[ SubWidthC * x ][ SubHeightC * y − 1 ] + \\ &F3[ 0 ][ 1 ] * pY[ SubWidthC * x − 1 ][ SubHeightC * y ] + \\ &F3[ 1 ][ 1 ] * pY[ SubWidthC * x ][ SubHeightC * y ] + \\ &F3[ 2 ][ 1 ] * pY[ SubWidthC * x + 1 ][ SubHeightC * y ] + \\ &F3[ 1 ][ 2 ] * pY[ SubWidthC * x ][ SubHeightC * y + 1 ] + 4 ) >> 3\end{aligned} \qquad (8\text{-}153)$$

- Otherwise (sps_cclm_colocated_chroma_flag is equal to 0), the following applies:
     - pDsY[ x ][ y ] with x = 0..nTbW − 1, y = 0..nTbH − 1 is derived as follows:

$$\begin{aligned}pDsY[ x ][ y ] = (\ &F4[ 0 ][ 1 ] * pY[ SubWidthC * x − 1 ][ SubHeightC * y ] + \\ &F4[ 0 ][ 2 ] * pY[ SubWidthC * x − 1 ][ SubHeightC * y + 1 ] + \\ &F4[ 1 ][ 1 ] * pY[ SubWidthC * x ][ SubHeightC * y ] + \\ &F4[ 1 ][ 2 ] * pY[ SubWidthC * x ][ SubHeightC * y + 1] + \\ &F4[ 2 ][ 1 ] * pY[ SubWidthC * x + 1 ][ SubHeightC * y ] + \\ &F4[ 2 ][ 2 ] * pY[ SubWidthC * x + 1 ][ SubHeightC * y + 1 ] + 4 ) >> 3\end{aligned} \qquad (8\text{-}153)$$

4. When cntL is greater than 0, the selected neighbouring left chroma samples pSelC[ idx ] are set equal to p[ −1 ][ pickPosL[ idx ] ] with idx = 0..cntL − 1, and the selected down-sampled neighbouring left luma samples pSelDsY[ idx ] with idx = 0..cntL − 1 are derived as follows:

FIG. 35

- The variable y is set equal to pickPosL[ idx ].
    - If both SubWidthC and SubHeightC are equal to 1, the following applies:

pSelDsY[ idx ] = pY[ −1 ][ y ]     (8-153)

- Otherwise the following applies:
        - If sps_cclm_colocated_chroma_flag is equal to 1, the following applies:

pSelDsY[ idx ] = ( F3[ 1 ][ 0 ] * pY[ −SubWidthC ][ SubHeightC * y − 1 ] +
            F3[ 0 ][ 1 ] * pY[ −1 − SubWidthC ][ SubHeightC * y ] +
            F3[ 1 ][ 1 ] * pY[ − SubWidthC ][ SubHeightC * y ] +      (8-153)
            F3[ 2 ][ 1 ] * pY[ 1 − SubWidthC ][ SubHeightC * y ] +
            F3[ 1 ][ 2 ] * pY[ − SubWidthC ][ SubHeightC * y + 1 ] + 4 ) >> 3

- Otherwise (sps_cclm_colocated_chroma_flag is equal to 0), the following applies:

pSelDsY[ idx ] = ( F4[ 0 ][ 1 ] * pY[ −1 − SubWidthC ][ SubHeightC * y ] +
            F4[ 0 ][ 2 ] * pY[ −1 − SubWidthC ][ SubHeightC * y + 1 ] +
            F4[ 1 ][ 1 ] * pY[ − SubWidthC ][ SubHeightC * y ] +      (8-153)
            F4[ 1 ][ 2 ] * pY[ − SubWidthC ][ SubHeightC * y + 1] +
            F4[ 2 ][ 1 ] * pY[ 1 − SubWidthC ][ SubHeightC * y ] +
            F4[ 2 ][ 2 ] * pY[ 1 − SubWidthC ][ SubHeightC * y + 1 ] + 4 ) >> 3

5. When cntT is greater than 0, the selected neighbouring top chroma samples pSelC[ idx ] are set equal to p[ pickPosT[ idx − cntL ] ][ −1 ] with idx = cntL..cntL + cntT − 1, and the down-sampled neighbouring top luma samples pSelDsY[ idx ] with idx = 0..cntL + cntT − 1 are specified as follows:

- The variable x is set equal to pickPosT[ idx − cntL ].
    - If both SubWidthC and SubHeightC are equal to 1, the following applies:

pSelDsY[ idx ] = pY[ x ][ −1 ]     (8-153)

- Otherwise, the following applies:
        - If bCTUboundary is equal to TRUE, the following applies:

pSelDsY[ idx ] = ( F2[ 0 ] * pY[ SubWidthC * x − 1 ][ −1 ] +
            F2[ 1 ] * pY[ SubWidthC * x ][ −1 ] +     (8-153)
            F2[ 2 ] * pY[ SubWidthC * x + 1 ][ −1 ] + 2 ) >> 2

- Otherwise (bCTUboundary is equal to FALSE), the following applies:
            - If sps_cclm_colocated_chroma_flag is equal to 1, the following applies:

pSelDsY[ idx ] = ( F3[ 1 ][ 0 ] * pY[ SubWidthC * x ][ −1 − SubHeightC ] +
                F3[ 0 ][ 1 ] * pY[ SubWidthC * x − 1 ][ − SubHeightC ] +
                F3[ 1 ][ 1 ] * pY[ SubWidthC * x ][ − SubHeightC] +      (8-153)
                F3[ 2 ][ 1 ] * pY[ SubWidthC * x + 1 ][ − SubHeightC ] +
                F3[ 1 ][ 2 ] * pY[ SubWidthC * x ][ 1 − SubHeightC ] + 4 ) >> 3

- Otherwise (sps_cclm_colocated_chroma_flag is equal to 0), the following applies:

pSelDsY[ idx ] = ( F4[ 0 ][ 1 ] * pY[ SubWidthC x − 1 ][ −2 ] +
                F4[ 0 ][ 2 ] * pY[ SubWidthC * x − 1 ][ −1 ] +
                F4[ 1 ][ 1 ] * pY[ SubWidthC * x ][ −2 ] +      (8-153)
                F4[ 1 ][ 2 ] * pY[ SubWidthC * x ][ −1] +
                F4[ 2 ][ 1 ] * pY[ SubWidthC * x + 1 ][ −2 ] +
                F4[ 2 ][ 2 ] * pY[ SubWidthC * x + 1 ][ −1 ] + 4 ) >> 3

6. When cntT+ cntL is not equal to 0, the variables minY, maxY, minC and maxC are derived as follows:

- When cntT + cntL is equal to 2, pSelComp[ 3 ] is set equal to pSelComp[ 0 ], pSelComp[ 2 ] is set equal to pSelComp[ 1 ], pSelComp[ 0 ] is set equal to pSelComp[ 1 ], and pSelComp[ 1 ] is set equal to pSelComp[ 3 ], with Comp being replaced by DsY and C.

FIG. 36

- The arrays minGrpIdx and maxGrpIdx are derived as follows:

$$minGrpIdx[0] = 0 \quad (8\text{-}181)$$

$$minGrpIdx[1] = 2 \quad (8\text{-}182)$$

$$maxGrpIdx[0] = 1 \quad (8\text{-}183)$$

$$maxGrpIdx[1] = 3 \quad (8\text{-}184)$$

- When pSelDsY[minGrpIdx[0]] is greater than pSelDsY[minGrpIdx[1]], minGrpIdx[0] and minGrpIdx[1] are swapped as follows:

$$(minGrpIdx[0], minGrpIdx[1]) = Swap(minGrpIdx[0], minGrpIdx[1]) \quad (8\text{-}185)$$

- When pSelDsY[maxGrpIdx[0]] is greater than pSelDsY[maxGrpIdx[1]], maxGrpIdx[0] and maxGrpIdx[1] are swapped as follows:

$$(maxGrpIdx[0], maxGrpIdx[1]) = Swap(maxGrpIdx[0], maxGrpIdx[1]) \quad (8\text{-}186)$$

- When pSelDsY[minGrpIdx[0]] is greater than pSelDsY[maxGrpIdx[1]], arrays minGrpIdx and maxGrpIdx are swapped as follows:

$$(minGrpIdx, maxGrpIdx) = Swap(minGrpIdx, maxGrpIdx) \quad (8\text{-}187)$$

- When pSelDsY[minGrpIdx[1]] is greater than pSelDsY[maxGrpIdx[0]], minGrpIdx[1] and maxGrpIdx[0] are swapped as follows:

$$(minGrpIdx[1], maxGrpIdx[0]) = Swap(minGrpIdx[1], maxGrpIdx[0]) \quad (8\text{-}188)$$

- The variables maxY, maxC, minY and minC are derived as follows:

$$maxY = (pSelDsY[maxGrpIdx[0]] + pSelDsY[maxGrpIdx[1]] + 1) >> 1 \quad (8\text{-}189)$$

$$maxC = (pSelC[maxGrpIdx[0]] + pSelC[maxGrpIdx[1]] + 1) >> 1 \quad (8\text{-}190)$$

$$minY = (pSelDsY[minGrpIdx[0]] + pSelDsY[minGrpIdx[1]] + 1) >> 1 \quad (8\text{-}191)$$

$$minC = (pSelC[minGrpIdx[0]] + pSelC[minGrpIdx[1]] + 1) >> 1 \quad (8\text{-}192)$$

7. The variables a, b, and k are derived as follows:

$$diff = maxY - minY \quad (8\text{-}196)$$

– If diff is not equal to 0, the following applies:

$$diffC = maxC - minC \quad (8\text{-}197)$$

$$x = Floor(Log2(diff)) \quad (8\text{-}198)$$

$$normDiff = ((diff << 4) >> x) \& 15 \quad (8\text{-}199)$$

$$x += (normDiff != 0) ? 1 : 0 \quad (8\text{-}200)$$

$$y = Floor(Log2(Abs(diffC))) + 1 \quad (8\text{-}201)$$

$$a = (diffC * (divSigTable[normDiff] | 8) + 2^{y-1}) >> y \quad (8\text{-}202)$$

$$k = ((3 + x - y) < 1) ? 1 : 3 + x - y \quad (8\text{-}203)$$

$$a = ((3 + x - y) < 1) ? Sign(a) * 15 : a \quad (8\text{-}204)$$

$$b = minC - ((a * minY) >> k) \quad (8\text{-}205)$$

FIG. 37 where divSigTable[ ] is specified as follows:

divSigTable[ ] = { 0, 7, 6, 5, 5, 4, 4, 3, 3, 2, 2, 1, 1, 1, 1, 0 }  (8-206)

– Otherwise (diff is equal to 0), the following applies:

k = 0  (8-207)

a = 0  (8-208)

b = minC  (8-209)

8. The prediction samples predSamples[ x ][ y ] with x = 0..nTbW − 1, y = 0..nTbH − 1 are derived as follows:

predSamples[ x ][ y ] = Clip1C( ( ( pDsY[ x ][ y ] * a ) >> k ) + b )  (8-210)

FIG. 38

Variation #2 of CCLM prediction

Inputs to this process are:
- the intra prediction mode predModeIntra,
- a sample location ( xTbC, yTbC ) of the top-left sample of the current transform block relative to the top-left sample of the current picture,
- a variable nTbW specifying the transform block width,
- a variable nTbH specifying the transform block height,
- chroma neighbouring samples p[ x ][ y ], with x = −1, y = 0..2 * nTbH − 1 and x = 0..2 * nTbW − 1, y = −1.

Output of this process are predicted samples predSamples[ x ][ y ], with x = 0..nTbW − 1, y = 0..nTbH − 1.

The current luma location ( xTbY, yTbY ) is derived as follows:

$$( xTbY, yTbY ) = ( xTbC << ( SubWidthC - 1 ), yTbC << ( SubHeightC - 1 ) ) \quad (8\text{-}145)$$

The variable bCTUboundary is derived as follows:

$$bCTUboundary = ( yTbC \ \& \ ( ( 1 << ( CtbLog2SizeY - 1 ) ) - 1 ) == 0 ) \ ? \ TRUE : FALSE. \quad (8\text{-}150)$$

When predModeIntra is equal to INTRA_LT_CCLM, the following applies:
- The variables numSampT and numSampL are set equal to nTbW and nTbH, respectively.
- The variables startPosT and startPosL are set equal to (nTbW >> 2) and (nTbH >> 2), respectively.
- The variables pickStepT and pickStepL are set equal to (nTbW >> 1) and (nTbH >> 1), respectively.
- The variables cntT and cntL are set equal to 2.

Otherwise, if predModeIntra is equal to INTRA_L_CCLM, the following applies:
  numSampL is set equal to (nTbH + Min(nTbW, nTbH)).
  startPosL is set equal to (nTbH + Min(nTbW, nTbH)) >> 3.
  pickStepL is set equal to (nTbH + Min(nTbW, nTbH)) >> 2.
  cntL is set equal to 4.

Otherwise, if predModeIntra is equal to INTRA_T_CCLM, the following applies:
  numSampT is set equal to (nTbW + Min(nTbW, nTbH)).
  startPosT is set equal to (nTbW + Min(nTbW, nTbH)) >> 3.
  pickStepT is set equal to (nTbW + Min(nTbW, nTbH)) >> 2.
  cntT is set equal to 4.

The variable picPosN[pos] with pos = 0.. cntN − 1 and N being replaced by L and T are derived as follows:
  pickPosN[ pos ] = (startPosN + pos * pickStepN)

The prediction samples predSamples[ x ][ y ] with x = 0..nTbW − 1, y = 0..nTbH − 1 are derived by the following ordered steps:

1. The collocated luma samples pY[ x ][ y ] with x = 0..nTbW * SubWidthC − 1, y = 0..nTbH * SubHeightC − 1 are set equal to the reconstructed luma samples prior to the deblocking filter process at the locations ( xTbY + x, yTbY + y ).

2. For the generation of the neighbouring luma samples pY[ x ][ y ] with x = −3.. −1, y = −3.. SubHeightC * numSampL − 1 and x = 0.. SubWidthC * numSampT − 1, y = −3.. −1, the following applies:
   - The reference sample availability marking process as specified in clause 8.4.5.2.6 is invoked with the sample location ( xTbC, yTbC ), the intra prediction reference line index 0, the reference sample width nTbW, the reference sample height nTbH, the colour component index 1 as inputs, and the availability of the

FIG. 39

- neighbouring chroma samples refUnfiltC[ x ][ y ] with x = −1, y = −1..2 * nTbH − 1 and x = 0..2 * nTbW − 1, y = −1 as output.
- The availablity of the neighbouring luma samples refUnfilt[ x ][ y ] with x = −1, y = −1..2 * SubHeightC * nTbH − 1 and x = 0..2 * SubWidthC * nTbW − 1, y = −1 are derived as follows:
  - refUnfilt[ −1 ][ −1 ] is set equal to refUnfiltC[ −1 ][ −1 ].
  - refUnfilt[ x ][ y ] with x = −1, y = 0..2 * SubHeightC * nTbH − 1 is derived as follows:

refUnfilt[ x ][ y * SubHeightC ] = refUnfiltC[ x ][ y ]

If SubHeightC is equal to 2, the following applies:

refUnfilt[ x ][ y * SubHeightC + 1 ] = refUnfiltC[ x ][ y ]

- refUnfilt[ x ][ y ] with x = 0..2 * SubWidthC * nTbW − 1, y = −1 is derived as follows:

refUnfilt[ x * SubWidthC ][ y ] = refUnfiltC[ x ][ y ]

If SubWidthC is equal to 2, the following applies:

refUnfilt[ x * SubWidthC + 1 ][ y ] = refUnfiltC[ x ][ y ]

- For the reference line index refIdx with 0..2, when at least one sample refUnfilt[ x ][ y ] with x = −1, y = −1.. SubHeightC * numSampL − 1 and x = 0.. SubWidthC * numSampT − 1, y = −1 is marked as "not available for intra prediction", the reference sample substitution process as specified in clause 8.4.5.2.7 is invoked with the intra prediction reference line index refIdx, the reference sample width (SubWidth * numSampT), the reference sample height (SubHeightC * numSampL), the reference samples refUnfilt[ x ][ y ] with x = −1, y = −1.. SubHeightC * numSampL − 1 and x = 0.. SubWidthC * numSampT − 1, y = −1, and the colour component index 0 as inputs, and the neighbouring luma samples pY[ x ][ y ] with x = −1 − refIdx, y = −1 − refIdx.. (SubHeightC * numSampL) and x = −refIdx.. (SubWidthC * numSampT), y = −1 − refIdx as output.

3. The down-sampled collocated luma samples pDsY[ x ][ y ] with x = 0..nTbW − 1, y = 0..nTbH − 1 are derived as follows:
   - If both SubWidthC and SubHeightC are equal to 1, the following applies:
     - pDsY[ x ][ y ] with x = 1..nTbW − 1, y = 1..nTbH − 1 is derived as follows:

pDstY[ x ][ y ] = pY[ x ][ y ]  (8-153)

- Otherwise, the following applies:
     - The one-dimention fitler coefficients array F2, and the 2-dimention filter coefficients array F3 and F4 are specified as follows.

F2[ 0 ] = 1, F2[ 1 ] = 2, F2[ 2 ] = 1  (8-153)

F3[ i ][ j ] = F4[ i ][ j ] = 0, with i = 0..2, j = 0..2  (8-153)

--If both SubWidthC and SubHeightC are equal to 2, the following applies:

F3[ 0 ][ 1 ] = 1, F3[ 1 ][ 1 ] = 4, F2[ 2 ][ 1 ] = 1, F3[ 1 ][ 0 ] = 1, F3[ 1 ][ 2 ] = 1  (8-153)

F4[ 0 ][ 1 ] = 1, F4[ 1 ][ 1 ] = 2, F4[ 2 ][ 1 ] = 1  (8-153)

F4[ 0 ][ 2 ] = 1, F4[ 1 ][ 2 ] = 2, F4[ 2 ][ 2 ] = 1  (8-153)

--Otherwise, the following applies:

F3[ 1 ][ 1 ] = 8  (8-153)

F4[ 0 ][ 1 ] = 2, F4[ 1 ][ 1 ] = 4, F4[ 2 ][ 1 ] = 2,  (8-153)

- If sps_cclm_colocated_chroma_flag is equal to 1, the following applies:
     - pDsY[ x ][ y ] with x = 0..nTbW − 1, y = 0..nTbH − 1 is derived as follows:

FIG. 40

$$pDsY[\,x\,][\,y\,] = (\,F3[\,1\,][\,0\,] * pY[\,SubWidthC * x\,][\,SubHeightC * y - 1\,] +$$
$$F3[\,0\,][\,1\,] * pY[\,SubWidthC * x - 1\,][\,SubHeightC * y\,] +$$
$$F3[\,1\,][\,1\,] * pY[\,SubWidthC * x\,][\,SubHeightC * y\,] +$$
$$F3[\,2\,][\,1\,] * pY[\,SubWidthC * x + 1\,][\,SubHeightC * y\,] +$$
$$F3[\,1\,][\,2\,] * pY[\,SubWidthC * x\,][\,SubHeightC * y + 1\,] + 4\,) >> 3$$
(8-153)

– Otherwise (sps_cclm_colocated_chroma_flag is equal to 0), the following applies:

– pDsY[ x ][ y ] with x = 0..nTbW − 1, y = 0..nTbH − 1 is derived as follows:

$$pDsY[\,x\,][\,y\,] = (\,F4[\,0\,][\,1\,] * pY[\,SubWidthC * x - 1\,][\,SubHeightC * y\,] +$$
$$F4[\,0\,][\,2\,] * pY[\,SubWidthC * x - 1\,][\,SubHeightC * y + 1\,] +$$
$$F4[\,1\,][\,1\,] * pY[\,SubWidthC * x\,][\,SubHeightC * y\,] +$$
$$F4[\,1\,][\,2\,] * pY[\,SubWidthC * x\,][\,SubHeightC * y + 1\,] +$$
$$F4[\,2\,][\,1\,] * pY[\,SubWidthC * x + 1\,][\,SubHeightC * y\,] +$$
$$F4[\,2\,][\,2\,] * pY[\,SubWidthC * x + 1\,][\,SubHeightC * y + 1\,] + 4\,) >> 3$$
(8-153)

4. When cntL is greater than 0, the selected neighbouring left chroma samples pSelC[ idx ] are set equal to p[ −1 ][ pickPosL[ idx ] ] with idx = 0..cntL − 1, and the selected down-sampled neighbouring left luma samples pSelDsY[ idx ] with idx = 0..cntL − 1 are derived as follows:

– The variable y is set equal to pickPosL[ idx ].

– If both SubWidthC and SubHeightC are equal to 1, the following applies:

$$pSelDsY[\,idx\,] = pY[\,-1\,][\,y\,] \quad (8\text{-}153)$$

– Otherwise the following applies:

– If sps_cclm_colocated_chroma_flag is equal to 1, the following applies:

$$pSelDsY[\,idx\,] = (\,F3[\,1\,][\,0\,] * pY[\,-SubWidthC\,][\,SubHeightC * y - 1\,] +$$
$$F3[\,0\,][\,1\,] * pY[\,-1 - SubWidthC\,][\,SubHeightC * y\,] +$$
$$F3[\,1\,][\,1\,] * pY[\,-SubWidthC\,][\,SubHeightC * y\,] +$$
$$F3[\,2\,][\,1\,] * pY[\,1 - SubWidthC\,][\,SubHeightC * y\,] +$$
$$F3[\,1\,][\,2\,] * pY[\,-SubWidthC\,][\,SubHeightC * y + 1\,] + 4\,) >> 3$$
(8-153)

– Otherwise (sps_cclm_colocated_chroma_flag is equal to 0), the following applies:

$$pSelDsY[\,idx\,] = (\,F4[\,0\,][\,1\,] * pY[\,-1 - SubWidthC\,][\,SubHeightC * y\,] +$$
$$F4[\,0\,][\,2\,] * pY[\,-1 - SubWidthC\,][\,SubHeightC * y + 1\,] +$$
$$F4[\,1\,][\,1\,] * pY[\,-SubWidthC\,][\,SubHeightC * y\,] +$$
$$F4[\,1\,][\,2\,] * pY[\,-SubWidthC\,][\,SubHeightC * y + 1\,] +$$
$$F4[\,2\,][\,1\,] * pY[\,1 - SubWidthC\,][\,SubHeightC * y\,] +$$
$$F4[\,2\,][\,2\,] * pY[\,1 - SubWidthC\,][\,SubHeightC * y + 1\,] + 4\,) >> 3$$
(8-153)

5. When cntT is greater than 0, the selected neighbouring top chroma samples pSelC[ idx ] are set equal to p[ pickPosT[ idx − cntL ] ][ −1 ] with idx = cntL..cntL + cntT − 1, and the down-sampled neighbouring top luma samples pSelDsY[ idx ] with idx = 0..cntL + cntT − 1 are specified as follows:

– The variable x is set equal to pickPosT[ idx − cntL ].

– If both SubWidthC and SubHeightC are equal to 1, the following applies:

$$pSelDsY[\,idx\,] = pY[\,x\,][\,-1\,] \quad (8\text{-}153)$$

– Otherwise, the following applies:

– If bCTUboundary is equal to TRUE, the following applies:

$$pSelDsY[\,idx\,] = (\,F2[\,0\,] * pY[\,SubWidthC * x - 1\,][\,-1\,] +$$
$$F2[\,1\,] * pY[\,SubWidthC * x\,][\,-1\,] +$$
$$F2[\,2\,] * pY[\,SubWidthC * x + 1\,][\,-1\,] + 2\,) >> 2$$
(8-153)

– Otherwise (bCTUboundary is equal to FALSE), the following applies:

– If sps_cclm_colocated_chroma_flag is equal to 1, the following applies:

FIG. 41

$$pSelDsY[ idx ] = ( F3[ 1 ][ 0 ] * pY[ SubWidthC * x ][ -1 - SubHeightC ] +$$
$$F3[ 0 ][ 1 ] * pY[ SubWidthC * x - 1 ][ -SubHeightC ] +$$
$$F3[ 1 ][ 1 ] * pY[ SubWidthC * x ][ -SubHeightC ] + \quad (8\text{-}153)$$
$$F3[ 2 ][ 1 ] * pY[ SubWidthC * x + 1 ][ -SubHeightC ] +$$
$$F3[ 1 ][ 2 ] * pY[ SubWidthC * x ][ 1 - SubHeightC ] + 4 ) >> 3$$

– Otherwise (sps_cclm_colocated_chroma_flag is equal to 0), the following applies:

$$pSelDsY[ idx ] = ( F4[ 0 ][ 1 ] * pY[ SubWidthC x - 1 ][ -2 ] +$$
$$F4[ 0 ][ 2 ] * pY[ SubWidthC * x - 1 ][ -1 ] +$$
$$F4[ 1 ][ 1 ] * pY[ SubWidthC * x ][ -2 ] + \quad (8\text{-}153)$$
$$F4[ 1 ][ 2 ] * pY[ SubWidthC * x ][ -1 ] +$$
$$F4[ 2 ][ 1 ] * pY[ SubWidthC * x + 1 ][ -2 ] +$$
$$F4[ 2 ][ 2 ] * pY[ SubWidthC * x + 1 ][ -1 ] + 4 ) >> 3$$

6. The variables minY, maxY, minC and maxC are derived as follows:

– The arrays minGrpIdx and maxGrpIdx are derived as follows:

$$minGrpIdx[ 0 ] = 0 \quad (8\text{-}180)$$

$$minGrpIdx[ 1 ] = 2 \quad (8\text{-}181)$$

$$maxGrpIdx[ 0 ] = 1 \quad (8\text{-}182)$$

$$maxGrpIdx[ 1 ] = 3 \quad (8\text{-}183)$$

– When pSelDsY[ minGrpIdx[ 0 ] ] is greater than pSelDsY[ minGrpIdx[ 1 ] ], minGrpIdx[ 0 ] and minGrpIdx[ 1 ] are swapped as follows:

$$( minGrpIdx[ 0 ], minGrpIdx[ 1 ] ) = Swap( minGrpIdx[ 0 ], minGrpIdx[ 1 ] ) \quad (8\text{-}184)$$

– When pSelDsY[ maxGrpIdx[ 0 ] ] is greater than pSelDsY[ maxGrpIdx[ 1 ] ], maxGrpIdx[ 0 ] and maxGrpIdx[ 1 ] are swapped as follows:

$$( maxGrpIdx[ 0 ], maxGrpIdx[ 1 ] ) = Swap( maxGrpIdx[ 0 ], maxGrpIdx[ 1 ] ) \quad (8\text{-}185)$$

– When pSelDsY[ minGrpIdx[ 0 ] ] is greater than pSelDsY[ maxGrpIdx[ 1 ] ], arrays minGrpIdx and maxGrpIdx are swapped as follows:

$$( minGrpIdx, maxGrpIdx ) = Swap( minGrpIdx, maxGrpIdx ) \quad (8\text{-}186)$$

– When pSelDsY[ minGrpIdx[ 1 ] ] is greater than pSelDsY[ maxGrpIdx[ 0 ] ], minGrpIdx[ 1 ] and maxGrpIdx[ 0 ] are swapped as follows:

$$( minGrpIdx[ 1 ], maxGrpIdx[ 0 ] ) = Swap( minGrpIdx[ 1 ], maxGrpIdx[ 0 ] ) \quad (8\text{-}187)$$

– The variables maxY, maxC, minY and minC are derived as follows:

$$maxY = ( pSelDsY[ maxGrpIdx[ 0 ] ] + pSelDsY[ maxGrpIdx[ 1 ] ] + 1 ) >> 1 \quad (8\text{-}188)$$

$$maxC = ( pSelC[ maxGrpIdx[ 0 ] ] + pSelC[ maxGrpIdx[ 1 ] ] + 1 ) >> 1 \quad (8\text{-}189)$$

$$minY = ( pSelDsY[ minGrpIdx[ 0 ] ] + pSelDsY[ minGrpIdx[ 1 ] ] + 1 ) >> 1 \quad (8\text{-}190)$$

$$minC = ( pSelC[ minGrpIdx[ 0 ] ] + pSelC[ minGrpIdx[ 1 ] ] + 1 ) >> 1 \quad (8\text{-}191)$$

7. The variables a, b, and k are derived as follows:

$$diff = maxY - minY \quad (8\text{-}195)$$

– If diff is not equal to 0, the following applies:

$$diffC = maxC - minC \quad (8\text{-}196)$$

FIG. 42

$$x = \text{Floor}(\text{Log2}(\text{diff})) \qquad (8\text{-}197)$$

$$\text{normDiff} = ((\text{diff} << 4) >> x) \& 15 \qquad (8\text{-}198)$$

$$x \mathrel{+}= (\text{normDiff} != 0) ? 1 : 0 \qquad (8\text{-}199)$$

$$y = \text{Floor}(\text{Log2}(\text{Abs}(\text{diffC}))) + 1 \qquad (8\text{-}200)$$

$$a = (\text{diffC} * (\text{divSigTable}[\text{normDiff}] | 8) + 2^{y-1}) >> y \qquad (8\text{-}201)$$

$$k = ((3 + x - y) < 1) ? 1 : 3 + x - y \qquad (8\text{-}202)$$

$$a = ((3 + x - y) < 1) ? \text{Sign}(a) * 15 : a \qquad (8\text{-}203)$$

$$b = \text{minC} - ((a * \text{minY}) >> k) \qquad (8\text{-}204)$$

where divSigTable[ ] is specified as follows.

$$\text{divSigTable}[\,] = \{0, 7, 6, 5, 5, 4, 4, 3, 3, 2, 2, 1, 1, 1, 1, 0\} \qquad (8\text{-}205)$$

– Otherwise (diff is equal to 0), the following applies:

$$k = 0 \qquad (8\text{-}206)$$

$$a = 0 \qquad (8\text{-}207)$$

$$b = \text{minC} \qquad (8\text{-}208)$$

8. The prediction samples predSamples[ x ][ y ] with x = 0..nTbW − 1, y = 0..nTbH − 1 are derived as follows:

$$\text{predSamples}[x][y] = \text{Clip1C}(((\text{pDsY}[x][y] * a) >> k) + b) \qquad (8\text{-}209)$$

FIG. 43

Variation #3 of CCLM prediction

Inputs to this process are:
- the intra prediction mode predModeIntra,
- a sample location ( xTbC, yTbC ) of the top-left sample of the current transform block relative to the top-left sample of the current picture,
- a variable nTbW specifying the transform block width,
- a variable nTbH specifying the transform block height,
- chroma neighbouring samples p[ x ][ y ], with x = −1, y = 0..2 * nTbH − 1 and x = 0..2 * nTbW − 1, y = −1.

Output of this process are predicted samples predSamples[ x ][ y ], with x = 0..nTbW − 1, y = 0..nTbH − 1.

The current luma location ( xTbY, yTbY ) is derived as follows:

$$( xTbY, yTbY ) = ( xTbC << ( SubWidthC - 1 ), yTbC << ( SubHeightC - 1 ) ) \quad (8\text{-}145)$$

The variable bCTUboundary is derived as follows:

$$bCTUboundary = ( yTbC \,\&\, ( 1 << ( CtbLog2SizeY - 1 ) - 1 ) == 0 ) \,?\, TRUE : FALSE. \quad (8\text{-}150)$$

The variables numSampT and numSampL are set equal to nTbW and nTbH, respectively.

The variables startPosT and startPosL are set equal to (nTbW >> 2) and (nTbH >> 2), respectively.

The variables pickStepT and pickStepL are set equal to (nTbW >> 1) and (nTbH >> 1), respectively.

The variables cntT and cntL are set equal to 2.

When predModeIntra is equal to INTRA_N_CCLM with N being replaced by L and T are derived as follows:
- numSampN = 2 * numSampN
- cntN = 2 * cntN The variable picPosN[pos] with pos = 0.. cntN − 1 and N being replaced by L and T are derived as follows:

pickPosN[ pos ] = (startPosN + pos * pickStepN)

The prediction samples predSamples[ x ][ y ] with x = 0..nTbW − 1, y = 0..nTbH − 1 are derived by the following ordered steps:

1. The collocated luma samples pY[ x ][ y ] with x = 0..nTbW * SubWidthC − 1, y = 0..nTbH * SubHeightC − 1 are set equal to the reconstructed luma samples prior to the deblocking filter process at the locations ( xTbY + x, yTbY + y ).

2. For the generation of the neighbouring luma samples pY[ x ][ y ] with x = −3.. −1, y = −3.. SubHeightC * numSampL − 1 and x = 0.. SubWidthC * numSampT − 1, y = −3.. −1, the following applies:
    - The reference sample availability marking process as specified in clause 8.4.5.2.6 is invoked with the sample location ( xTbC, yTbC ), the intra prediction reference line index 0, the reference sample width nTbW, the reference sample height nTbH, the colour component index 1 as inputs, and the availability of the neighbouring chroma samples refUnfiltC[ x ][ y ] with x = −1, y = −1..2 * nTbH − 1 and x = 0..2 * nTbW − 1, y = −1 as output.
    - The availablity of the neighbouring luma samples refUnfilt[ x ][ y ] with x = −1, y = −1.. 2 * SubHeightC * nTbH − 1 and x = 0.. 2 * SubWidthC * nTbW − 1, y = −1 are derived as follows:
        - refUnfilt[ −1 ][ −1 ] is set equal to refUnfiltC[ −1 ][ −1 ].
        - refUnfilt[ x ][ y ] with x = −1, y = 0.. 2 * SubHeightC * nTbH − 1 is derived as follows:
            refUnfilt[ x ][ y * SubHeightC ] = refUnfiltC[ x ][ y ]
            If SubHeightC is equal to 2, the following applies:
            refUnfilt[ x ][ y * SubHeightC + 1 ] = refUnfiltC[ x ][ y ]

FIG. 44

- refUnfilt[ x ][ y ] with x = 0..2 * SubWidthC * nTbW − 1, y = −1 is derived as follows:

refUnfilt[ x * SubWidthC ][ y ] = refUnfiltC[ x ][ y ]

If SubWidthC is equal to 2, the following applies:

refUnfilt[ x * SubWidthC + 1 ][ y ] = refUnfiltC[ x ][ y ]

- For the reference line index refIdx with 0..2, when at least one sample refUnfilt[ x ][ y ] with x = −1, y = −1.. SubHeightC * numSampL − 1 and x = 0.. SubWidthC * numSampT − 1, y = −1 is marked as "not available for intra prediction", the reference sample substitution process as specified in clause 8.4.5.2.7 is invoked with the intra prediction reference line index refIdx, the reference sample width (SubWidth * numSampT), the reference sample height (SubHeightC * numSampL), the reference samples refUnfilt[ x ][ y ] with x = −1, y = −1.. SubHeightC * numSampL − 1 and x = 0.. SubWidthC * numSampT − 1, y = −1, and the colour component index 0 as inputs, and the neighbouring luma samples pY[ x ][ y ] with x = −1 − refIdx, y = −1 − refIdx.. (SubHeightC * numSampL) and x = −refIdx.. (SubWidthC * numSampT), y = −1 − refIdx as output.

3. The down-sampled collocated luma samples pDsY[ x ][ y ] with x = 0..nTbW − 1, y = 0..nTbH − 1 are derived as follows:

- If both SubWidthC and SubHeightC are equal to 1, the following applies:

- pDsY[ x ][ y ] with x = 1..nTbW − 1, y = 1..nTbH − 1 is derived as follows:

pDstY[ x ][ y ] = pY[ x ][ y ]  (8-153)

- Otherwise, the following applies:

- The one-dimention filter coefficients array F2, and the 2-dimention filter coefficients array F3 and F4 are specified as follows.

F2[ 0 ] = 1, F2[ 1 ] = 2, F2[ 2 ] = 1  (8-153)

F3[ i ][ j ] = F4[ i ][ j ] = 0, with i = 0..2, j = 0..2  (8-153)

- If both SubWidthC and SubHeightC are equal to 2, the following applies:

F3[ 0 ][ 1 ] = 1, F3[ 1 ][ 1 ] = 4, F2[ 2 ][ 1 ] = 1, F3[ 1 ][ 0 ] = 1, F3[ 1 ][ 2 ] = 1  (8-153)

F4[ 0 ][ 1 ] = 1, F4[ 1 ][ 1 ] = 2, F4[ 2 ][ 1 ] = 1  (8-153)

F4[ 0 ][ 2 ] = 1,  F4[ 1 ][ 2 ] = 2, F4[ 2 ][ 2 ] = 1  (8-153)

- Otherwise, the following applies:

F3[ 1 ][ 1 ] = 8  (8-153)

F4[ 0 ][ 1 ] = 2, F4[ 1 ][ 1 ] = 4, F4[ 2 ][ 1 ] = 2.  (8-153)

- If sps_cclm_colocated_chroma_flag is equal to 1, the following applies:

- pDsY[ x ][ y ] with x = 0..nTbW − 1, y = 0..nTbH − 1 is derived as follows:

pDsY[ x ][ y ] = ( F3[ 1 ][ 0 ] * pY[ SubWidthC * x ][ SubHeightC * y − 1 ] +
                           F3[ 0 ][ 1 ] * pY[ SubWidthC * x − 1 ][ SubHeightC * y ] +
                           F3[ 1 ][ 1 ] * pY[ SubWidthC * x ][ SubHeightC * y ] +  (8-153)
                           F3[ 2 ][ 1 ] * pY[ SubWidthC * x + 1 ][ SubHeightC * y ] +
                           F3[ 1 ][ 2 ] * pY[ SubWidthC * x ][ SubHeightC * y + 1 ] + 4 ) >> 3

- Otherwise (sps_cclm_colocated_chroma_flag is equal to 0), the following applies:

- pDsY[ x ][ y ] with x = 0..nTbW − 1, y = 0..nTbH − 1 is derived as follows:
       pDsY[ x ][ y ] = ( F4[ 0 ][ 1 ] * pY[ SubWidthC * x − 1 ][ SubHeightC * y ] +
                           F4[ 0 ][ 2 ] * pY[ SubWidthC * x − 1 ][ SubHeightC * y + 1 ] +
                           F4[ 1 ][ 1 ] * pY[ SubWidthC * x ][ SubHeightC * y ] +  (8-153)
                           F4[ 1 ][ 2 ] * pY[ SubWidthC * x ][ SubHeightC * y + 1 ] +

FIG. 45

$$F4[2][1] * pY[\text{SubWidthC} * x + 1][\text{SubHeightC} * y] +$$
$$F4[2][2] * pY[\text{SubWidthC} * x + 1][\text{SubHeightC} * y + 1] + 4) >> 3$$

4. When cntL is greater than 0, the selected neighbouring left chroma samples pSelC[ idx ] are set equal to p[ −1 ][ pickPosL[ idx ] ] with idx = 0..cntL − 1, and the selected down-sampled neighbouring left luma samples pSelDsY[ idx ] with idx = 0..cntL − 1 are derived as follows:

– The variable y is set equal to pickPosL[ idx ].
   – If both SubWidthC and SubHeightC are equal to 1, the following applies:

$$\text{pSelDsY}[ \text{idx} ] = pY[ -1 ][ y ] \quad (8\text{-}153)$$

– Otherwise the following applies:
      – If sps_cclm_colocated_chroma_flag is equal to 1, the following applies:

$$\text{pSelDsY}[ \text{idx} ] = ( F3[1][0] * pY[ -\text{SubWidthC} ][ \text{SubHeightC} * y - 1 ] +$$
      $$F3[0][1] * pY[ -1 - \text{SubWidthC} ][ \text{SubHeightC} * y ] +$$
      $$F3[1][1] * pY[ -\text{SubWidthC} ][ \text{SubHeightC} * y ] + \quad (8\text{-}153)$$
      $$F3[2][1] * pY[ 1 - \text{SubWidthC} ][ \text{SubHeightC} * y ] +$$
      $$F3[1][2] * pY[ -\text{SubWidthC} ][ \text{SubHeightC} * y + 1 ] + 4 ) >> 3$$

– Otherwise (sps_cclm_colocated_chroma_flag is equal to 0), the following applies:

$$\text{pSelDsY}[ \text{idx} ] = ( F4[0][1] * pY[ -1 - \text{SubWidthC} ][ \text{SubHeightC} * y ] +$$
      $$F4[0][2] * pY[ -1 - \text{SubWidthC} ][ \text{SubHeightC} * y + 1 ] +$$
      $$F4[1][1] * pY[ -\text{SubWidthC} ][ \text{SubHeightC} * y ] +$$
      $$F4[1][2] * pY[ -\text{SubWidthC} ][ \text{SubHeightC} * y + 1 ] + \quad (8\text{-}153)$$
      $$F4[2][1] * pY[ 1 - \text{SubWidthC} ][ \text{SubHeightC} * y ] +$$
      $$F4[2][2] * pY[ 1 - \text{SubWidthC} ][ \text{SubHeightC} * y + 1 ] + 4 ) >> 3$$

5. When cntT is greater than 0, the selected neighbouring top chroma samples pSelC[ idx ] are set equal to p[ pickPosT[ idx − cntL ] ][ −1 ] with idx = cntL..cntL + cntT − 1, and the down-sampled neighbouring top luma samples pSelDsY[ idx ] with idx = 0..cntL + cntT − 1 are specified as follows:

– The variable x is set equal to pickPosT[ idx − cntL ].
   – If both SubWidthC and SubHeightC are equal to 1, the following applies:

$$\text{pSelDsY}[ \text{idx} ] = pY[ x ][ -1 ] \quad (8\text{-}153)$$

– Otherwise, the following applies:
      – If bCTUboundary is equal to TRUE, the following applies:

$$\text{pSelDsY}[ \text{idx} ] = ( F2[0] * pY[ \text{SubWidthC} * x - 1 ][ -1 ] +$$
      $$F2[1] * pY[ \text{SubWidthC} * x ][ -1 ] + \quad (8\text{-}153)$$
      $$F2[2] * pY[ \text{SubWidthC} * x + 1 ][ -1 ] + 2 ) >> 2$$

– Otherwise (bCTUboundary is equal to FALSE), the following applies:
         – If sps_cclm_colocated_chroma_flag is equal to 1, the following applies:

$$\text{pSelDsY}[ \text{idx} ] = ( F3[1][0] * pY[ \text{SubWidthC} * x ][ -1 - \text{SubHeightC} ] +$$
         $$F3[0][1] * pY[ \text{SubWidthC} * x - 1 ][ -\text{SubHeightC} ] +$$
         $$F3[1][1] * pY[ \text{SubWidthC} * x ][ -\text{SubHeightC} ] + \quad (8\text{-}153)$$
         $$F3[2][1] * pY[ \text{SubWidthC} * x + 1 ][ -\text{SubHeightC} ] +$$
         $$F3[1][2] * pY[ \text{SubWidthC} * x ][ 1 - \text{SubHeightC} ] + 4 ) >> 3$$

– Otherwise (sps_cclm_colocated_chroma_flag is equal to 0), the following applies.
         $$\text{pSelDsY}[ \text{idx} ] = ( F4[0][1] * pY[ \text{SubWidthC} * x - 1 ][ -2 ] +$$
         $$F4[0][2] * pY[ \text{SubWidthC} * x - 1 ][ -1 ] +$$
         $$F4[1][1] * pY[ \text{SubWidthC} * x ][ -2 ] + \quad (8\text{-}153)$$
         $$F4[1][2] * pY[ \text{SubWidthC} * x ][ -1 ] +$$

FIG. 46

$$F4[2][1] * pY[SubWidthC * x + 1][-2] +$$
$$F4[2][2] * pY[SubWidthC * x + 1][-1] + 4) >> 3$$

6. The variables minY, maxY, minC and maxC are derived as follows:
   – The arrays minGrpIdx and maxGrpIdx are derived as follows:

minGrpIdx[ 0 ] = 0                                                                                          (8-180)

minGrpIdx[ 1 ] = 2                                                                                          (8-181)

maxGrpIdx[ 0 ] = 1                                                                                          (8-182)

maxGrpIdx[ 1 ] = 3                                                                                          (8-183)

– When pSelDsY[ minGrpIdx[ 0 ] ] is greater than pSelDsY[ minGrpIdx[ 1 ] ], minGrpIdx[ 0 ] and minGrpIdx[ 1 ] are swapped as follows:
   ( minGrpIdx[ 0 ], minGrpIdx[ 1 ] ) = Swap( minGrpIdx[ 0 ], minGrpIdx[ 1 ] )                                  (8-184)

– When pSelDsY[ maxGrpIdx[ 0 ] ] is greater than pSelDsY[ maxGrpIdx[ 1 ] ], maxGrpIdx[ 0 ] and maxGrpIdx[ 1 ] are swapped as follows:
   ( maxGrpIdx[ 0 ], maxGrpIdx[ 1 ] ) = Swap( maxGrpIdx[ 0 ], maxGrpIdx[ 1 ] )                                  (8-185)

– When pSelDsY[ minGrpIdx[ 0 ] ] is greater than pSelDsY[ maxGrpIdx[ 1 ] ], arrays minGrpIdx and maxGrpIdx are swapped as follows:
   ( minGrpIdx, maxGrpIdx ) = Swap( minGrpIdx, maxGrpIdx )                                                     (8-186)

– When pSelDsY[ minGrpIdx[ 1 ] ] is greater than pSelDsY[ maxGrpIdx[ 0 ] ], minGrpIdx[ 1 ] and maxGrpIdx[ 0 ] are swapped as follows:
   ( minGrpIdx[ 1 ], maxGrpIdx[ 0 ] ) = Swap( minGrpIdx[ 1 ], maxGrpIdx[ 0 ] )                                  (8-187)

– The variables maxY, maxC, minY and minC are derived as follows:
   maxY = ( pSelDsY[ maxGrpIdx[ 0 ] ] + pSelDsY[ maxGrpIdx[ 1 ] ] + 1 ) >> 1                                    (8-188)

maxC = ( pSelC[ maxGrpIdx[ 0 ] ] + pSelC[ maxGrpIdx[ 1 ] ] + 1 ) >> 1                                        (8-189)

minY = ( pSelDsY[ minGrpIdx[ 0 ] ] + pSelDsY[ minGrpIdx[ 1 ] ] + 1 ) >> 1                                    (8-190)

minC = ( pSelC[ minGrpIdx[ 0 ] ] + pSelC[ minGrpIdx[ 1 ] ] + 1 ) >> 1                                        (8-191)

7. The variables a, b, and k are derived as follows:
   diff = maxY – minY                                                                                          (8-195)

– If diff is not equal to 0, the following applies:
   diffC = maxC – minC                                                                                         (8-196)

$x = \text{Floor}( \text{Log2}( \text{diff} ) )$                                                             (8-197)

normDiff = ( ( diff << 4 ) >> x ) & 15                                                                      (8-198)

x += ( normDiff != 0 ) ? 1 : 0                                                                              (8-199)

$y = \text{Floor}( \text{Log2}( \text{Abs}( \text{diffC} ) ) ) + 1$                                          (8-200)

$a = ( \text{diffC} * ( \text{divSigTable}[ \text{normDiff} ] | 8 ) + 2^{y-1} ) >> y$                        (8-201)

$$a = ( ( 3 + x - y ) < 1 ) \ ? \ \text{Sign}( a ) * 15 \ : \ a \quad (8\text{-}203)$$

$$b = \text{minC} - ( ( a * \text{minY} ) >> k ) \quad (8\text{-}204)$$

where divSigTable[ ] is specified as follows:

$$\text{divSigTable}[\ ] = \{ 0, 7, 6, 5, 5, 4, 4, 3, 3, 2, 2, 1, 1, 1, 1, 0 \} \quad (8\text{-}205)$$

– Otherwise (diff is equal to 0), the following applies:

$$k = 0 \quad (8\text{-}206)$$

$$a = 0 \quad (8\text{-}207)$$

$$b = \text{minC} \quad (8\text{-}208)$$

8. The prediction samples predSamples[ x ][ y ] with x = 0..nTbW − 1, y = 0..nTbH − 1 are derived as follows:

$$\text{predSamples}[\ x\ ][\ y\ ] = \text{Clip1C}( ( ( \text{pDsY}[\ x\ ][\ y\ ] * a ) >> k ) + b ) \quad (8\text{-}209)$$

FIG. 48

Variation #4 of CCLM prediction

Inputs to this process are:
- the intra prediction mode predModeIntra,
- a sample location ( xTbC, yTbC ) of the top-left sample of the current transform block relative to the top-left sample of the current picture,
- a variable nTbW specifying the transform block width,
- a variable nTbH specifying the transform block height,
- chroma neighbouring samples p[ x ][ y ], with x = −1, y = 0..2 * nTbH − 1 and x = 0..2 * nTbW − 1, y = − 1.

Output of this process are predicted samples predSamples[ x ][ y ], with x = 0..nTbW − 1, y = 0..nTbH − 1.

The current luma location ( xTbY, yTbY ) is derived as follows:

$$( xTbY, yTbY ) = ( xTbC << ( SubWidthC − 1 ), yTbC << ( SubHeightC − 1 ) ) \qquad (8\text{-}145)$$

The variable bCTUboundary is derived as follows:

$$bCTUboundary = ( yTbC \ \& \ ( 1 << ( CtbLog2SizeY − 1 ) − 1 ) == 0 ) \ ? \ TRUE : FALSE. \qquad (8\text{-}150)$$

When predModeIntra is equal to INTRA_LT_CCLM, the following applies:
- The variables numSampT and numSampL are set equal to (nTbW << 1) and (nTbH << 1), respectively.
- The variables startPosT and startPosL are set equal to (nTbW >> 2) and (nTbH >> 2), respectively.
- The variables pickStepT and pickStepL are set equal to (nTbW + 1) >> 1 and (nTbH + 1) >> 1, respectively.
- The variables cntT and cntL are set equal to 2.

Otherwise, if predModeIntra is equal to INTRA_L_CCLM, the following applies:

numSampL is set equal to (nTbH << 1).

startPosL is set equal to (nTbH >> 3).

pickStepL is set equal to (nTbH + 3) >> 2.

cntL is set equal to 4.

Otherwise, if predModeIntra is equal to INTRA_T_CCLM, the following applies:

numSampT is set equal to (nTbW << 1).

startPosT is set equal to (nTbW >> 3).

pickStepT is set equal to (nTbW + 3) >> 2.

cntT is set equal to 4.

The variable picPosN[ pos ] with pos = 0.. cnt N − 1 and N being replaced by L and T are derived as follows:

pickPosN[ pos ] = (startPosN + pos * pickStepN)

The prediction samples predSamples[ x ][ y ] with x = 0..nTbW − 1, y = 0..nTbH − 1 are derived by the following ordered steps:

1. The collocated luma samples pY[ x ][ y ] with x = 0..nTbW * SubWidthC − 1, y = 0..nTbH * SubHeightC − 1 are set equal to the reconstructed luma samples prior to the deblocking filter process at the locations ( xTbY + x, yTbY + y ).

2. For the generation of the neighbouring luma samples pY[ x ][ y ] with x = −3.. −1, y = −3.. SubHeightC * numSampL − 1 and x = 0.. SubWidthC * numSampT − 1, y = −3..−1, the following applies:
   - The reference sample availability marking process as specified in clause 8.4.5.2.6 is invoked with the sample location ( xTbC, yTbC ), the intra prediction reference line index 0, the reference sample width nTbW, the reference sample height nTbH, the colour component index 1 as inputs, and the availability of the

FIG. 49

- neighbouring chroma samples refUnfiltC[ x ][ y ] with x = −1, y = −1..2 * nTbH − 1 and x = 0..2 * nTbW − 1, y = −1 as output.
- The availability of the neighbouring luma samples refUnfilt[ x ][ y ] with x = −1, y = −1..2 * SubHeightC * nTbH − 1 and x = 0..2 * SubWidthC * nTbW − 1, y = −1 are derived as follows:
  - refUnfilt[ −1 ][ −1 ] is set equal to refUnfiltC[ −1 ][ −1 ].
  - refUnfilt[ x ][ y ] with x = −1, y = 0..2 * SubHeightC * nTbH − 1 is derived as follows:

refUnfilt[ x ][ y * SubHeightC ] = refUnfiltC[ x ][ y ]

If SubHeightC is equal to 2, the following applies:

refUnfilt[ x ][ y * SubHeightC + 1 ] = refUnfiltC[ x ][ y ]
  - refUnfilt[ x ][ y ] with x = 0..2 * SubWidthC * nTbW − 1, y = −1 is derived as follows:

refUnfilt[ x * SubWidthC ][ y ] = refUnfiltC[ x ][ y ]

If SubWidthC is equal to 2, the following applies:

refUnfilt[ x * SubWidthC + 1 ][ y ] = refUnfiltC[ x ][ y ]
- For the reference line index refIdx with 0..2, when at least one sample refUnfilt[ x ][ y ] with x = −1, y = −1..SubHeightC * numSampL − 1 and x = 0..SubWidthC * numSampT − 1, y = −1 is marked as "not available for intra prediction", the reference sample substitution process as specified in clause 8.4.5.2.7 is invoked with the intra prediction reference line index refIdx, the reference sample width (SubWidth * numSampT), the reference sample height (SubHeightC * numSampL), the reference samples refUnfilt[ x ][ y ] with x = −1, y = −1..SubHeightC * numSampL − 1 and x = 0..SubWidthC * numSampT − 1, y = −1, and the colour component index 0 as inputs, and the neighbouring luma samples pY[ x ][ y ] with x = −1..refIdx, y = −1 − refIdx..(SubHeightC * numSampL) and x = −refIdx..(SubWidthC * numSampT), y = −1 − refIdx as output.

3. The down-sampled collocated luma samples pDsY[ x ][ y ] with x = 0..nTbW − 1, y = 0..nTbH − 1 are derived as follows:
   - If both SubWidthC and SubHeightC are equal to 1, the following applies:
     - pDsY[ x ][ y ] with x = 1..nTbW − 1, y = 1..nTbH − 1 is derived as follows:

pDsY[ x ][ y ] = pY[ x ][ y ]     (8-153)
   - Otherwise, the following applies:
     - The one-dimention filter coefficients array F2, and the 2-dimention filter coefficients array F3 and F4 are specified as follows:

F2[ 0 ] = 1, F2[ 1 ] = 2, F2[ 2 ] = 1     (8-153)

F3[ i ][ j ] = F4[ i ][ j ] = 0, with i = 0..2, j = 0..2     (8-153)

−If both SubWidthC and SubHeightC are equal to 2, the following applies:

F3[ 0 ][ 1 ] = 1, F3[ 1 ][ 1 ] = 4, F3[ 2 ][ 1 ] = 1, F3[ 1 ][ 0 ] = 1, F3[ 1 ][ 2 ] = 1     (8-153)

F4[ 0 ][ 1 ] = 1, F4[ 1 ][ 1 ] = 2, F4[ 2 ][ 1 ] = 1     (8-153)

F4[ 0 ][ 2 ] = 1, F4[ 1 ][ 2 ] = 2, F4[ 2 ][ 2 ] = 1     (8-153)

−Otherwise, the following applies:

F3[ 1 ][ 1 ] = 8     (8-153)

F4[ 0 ][ 1 ] = 2, F4[ 1 ][ 1 ] = 4, F4[ 2 ][ 1 ] = 2,     (8-153)
   - If sps_cclm_colocated_chroma_flag is equal to 1, the following applies:
     - pDsY[ x ][ y ] with x = 0..nTbW − 1, y = 0..nTbH − 1 is derived as follows:

FIG. 50

$$pDsY[\,x\,][\,y\,] = (\,F3[\,1\,][\,0\,] * pY[\,SubWidthC * x\,][\,SubHeightC * y - 1\,] +$$
$$F3[\,0\,][\,1\,] * pY[\,SubWidthC * x - 1\,][\,SubHeightC * y\,] +$$
$$F3[\,1\,][\,1\,] * pY[\,SubWidthC * x\,][\,SubHeightC * y\,] +$$
$$F3[\,2\,][\,1\,] * pY[\,SubWidthC * x + 1\,][\,SubHeightC * y\,] +$$
$$F3[\,1\,][\,2\,] * pY[\,SubWidthC * x\,][\,SubHeightC * y + 1\,] + 4\,) >> 3$$
(8-153)

- Otherwise (sps_cclm_colocated_chroma_flag is equal to 0), the following applies:
  - pDsY[ x ][ y ] with x = 0..nTbW − 1, y = 0..nTbH − 1 is derived as follows:

$$pDsY[\,x\,][\,y\,] = (\,F4[\,0\,][\,1\,] * pY[\,SubWidthC * x - 1\,][\,SubHeightC * y\,] +$$
$$F4[\,0\,][\,2\,] * pY[\,SubWidthC * x - 1\,][\,SubHeightC * y + 1\,] +$$
$$F4[\,1\,][\,1\,] * pY[\,SubWidthC * x\,][\,SubHeightC * y\,] +$$
$$F4[\,1\,][\,2\,] * pY[\,SubWidthC * x\,][\,SubHeightC * y + 1\,] +$$
$$F4[\,2\,][\,1\,] * pY[\,SubWidthC * x + 1\,][\,SubHeightC * y\,] +$$
$$F4[\,2\,][\,2\,] * pY[\,SubWidthC * x + 1\,][\,SubHeightC * y + 1\,] + 4\,) >> 3$$
(8-153)

4. When cntL is greater than 0, the selected neighbouring left chroma samples pSelC[ idx ] are set equal to p[ −1 ][ pickPosL[ idx ] ] with idx = 0..cntL − 1, and the selected down-sampled neighbouring left luma samples pSelDsY[ idx ] with idx = 0..cntL − 1 are derived as follows:

- The variable y is set equal to pickPosL[ idx ].
- If both SubWidthC and SubHeightC are equal to 1, the following applies:

$$pSelDsY[\,idx\,] = pY[\,-1\,][\,y\,] \quad (8\text{-}153)$$

- Otherwise the following applies:
  - If sps_cclm_colocated_chroma_flag is equal to 1, the following applies:

$$pSelDsY[\,idx\,] = (\,F3[\,1\,][\,0\,] * pY[\,-SubWidthC\,][\,SubHeightC * y - 1\,] +$$
$$F3[\,0\,][\,1\,] * pY[\,-1 - SubWidthC\,][\,SubHeightC * y\,] +$$
$$F3[\,1\,][\,1\,] * pY[\,-SubWidthC\,][\,SubHeightC * y\,] +$$
$$F3[\,2\,][\,1\,] * pY[\,1 - SubWidthC\,][\,SubHeightC * y\,] +$$
$$F3[\,1\,][\,2\,] * pY[\,-SubWidthC\,][\,SubHeightC * y + 1\,] + 4\,) >> 3$$
(8-153)

- Otherwise (sps_cclm_colocated_chroma_flag is equal to 0), the following applies:

$$pSelDsY[\,idx\,] = (\,F4[\,0\,][\,1\,] * pY[\,-1 - SubWidthC\,][\,SubHeightC * y\,] +$$
$$F4[\,0\,][\,2\,] * pY[\,-1 - SubWidthC\,][\,SubHeightC * y + 1\,] +$$
$$F4[\,1\,][\,1\,] * pY[\,-SubWidthC\,][\,SubHeightC * y\,] +$$
$$F4[\,1\,][\,2\,] * pY[\,-SubWidthC\,][\,SubHeightC * y + 1\,] +$$
$$F4[\,2\,][\,1\,] * pY[\,1 - SubWidthC\,][\,SubHeightC * y\,] +$$
$$F4[\,2\,][\,2\,] * pY[\,1 - SubWidthC\,][\,SubHeightC * y + 1\,] + 4\,) >> 3$$
(8-153)

5. When cntT is greater than 0, the selected neighbouring top chroma samples pSelC[ idx ] are set equal to p[ pickPosT[ idx − cntL ] ][ −1 ] with idx = cntL..cntL + cntT − 1, and the down-sampled neighbouring top luma samples pSelDsY[ idx ] with idx = 0..cntL + cntT − 1 are specified as follows:

- The variable x is set equal to pickPosT[ idx − cntL ].
- If both SubWidthC and SubHeightC are equal to 1, the following applies:

$$pSelDsY[\,idx\,] = pY[\,x\,][\,-1\,] \quad (8\text{-}153)$$

- Otherwise, the following applies:
  - If bCTUboundary is equal to TRUE, the following applies:

$$pSelDsY[\,idx\,] = (\,F2[\,0\,] * pY[\,SubWidthC * x - 1\,][\,-1\,] +$$
$$F2[\,1\,] * pY[\,SubWidthC * x\,][\,-1\,] +$$
$$F2[\,2\,] * pY[\,SubWidthC * x + 1\,][\,-1\,] + 2\,) >> 2$$
(8-153)

- Otherwise (bCTUboundary is equal to FALSE), the following applies:
    - If sps_cclm_colocated_chroma_flag is equal to 1, the following applies:

FIG. 51

$$pSelDsY[\ idx\ ] = (\ F3[\ 1\ ][\ 0\ ] * pY[\ SubWidthC * x - 1\ ][\ -SubHeightC\ ] +$$
$$F3[\ 0\ ][\ 1\ ] * pY[\ SubWidthC * x - 1\ ][\ -SubHeightC\ ] +$$
$$F3[\ 1\ ][\ 1\ ] * pY[\ SubWidthC * x\ ][\ -SubHeightC\ ] +$$  (8-153)
$$F3[\ 2\ ][\ 1\ ] * pY[\ SubWidthC * x + 1\ ][\ -SubHeightC\ ] +$$
$$F3[\ 1\ ][\ 2\ ] * pY[\ SubWidthC * x\ ][\ 1 - SubHeightC\ ] + 4\ ) >> 3$$

— Otherwise (sps_cclm_colocated_chroma_flag is equal to 0), the following applies:

$$pSelDsY[\ idx\ ] = (\ F4[\ 0\ ][\ 1\ ] * pY[\ SubWidthC * x - 1\ ][\ -2\ ] +$$
$$F4[\ 0\ ][\ 2\ ] * pY[\ SubWidthC * x - 1\ ][\ -1\ ] +$$
$$F4[\ 1\ ][\ 1\ ] * pY[\ SubWidthC * x\ ][\ -2\ ] +$$  (8-153)
$$F4[\ 1\ ][\ 2\ ] * pY[\ SubWidthC * x\ ][\ -1\ ] +$$
$$F4[\ 2\ ][\ 1\ ] * pY[\ SubWidthC * x + 1\ ][\ -2\ ] +$$
$$F4[\ 2\ ][\ 2\ ] * pY[\ SubWidthC * x + 1\ ][\ -1\ ] + 4\ ) >> 3$$

6. The variables minY, maxY, minC and maxC are derived as follows:

– The arrays minGrpIdx and maxGrpIdx are derived as follows:

$$minGrpIdx[\ 0\ ] = 0 \quad (8\text{-}180)$$

$$minGrpIdx[\ 1\ ] = 2 \quad (8\text{-}181)$$

$$maxGrpIdx[\ 0\ ] = 1 \quad (8\text{-}182)$$

$$maxGrpIdx[\ 1\ ] = 3 \quad (8\text{-}183)$$

– When pSelDsY[ minGrpIdx[ 0 ] ] is greater than pSelDsY[ minGrpIdx[ 1 ] ], minGrpIdx[ 0 ] and minGrpIdx[ 1 ] are swapped as follows:

$$(\ minGrpIdx[\ 0\ ],\ minGrpIdx[\ 1\ ]\ ) = Swap(\ minGrpIdx[\ 0\ ],\ minGrpIdx[\ 1\ ]\ ) \quad (8\text{-}184)$$

– When pSelDsY[ maxGrpIdx[ 0 ] ] is greater than pSelDsY[ maxGrpIdx[ 1 ] ], maxGrpIdx[ 0 ] and maxGrpIdx[ 1 ] are swapped as follows:

$$(\ maxGrpIdx[\ 0\ ],\ maxGrpIdx[\ 1\ ]\ ) = Swap(\ maxGrpIdx[\ 0\ ],\ maxGrpIdx[\ 1\ ]\ ) \quad (8\text{-}185)$$

– When pSelDsY[ minGrpIdx[ 0 ] ] is greater than pSelDsY[ maxGrpIdx[ 1 ] ], arrays minGrpIdx and maxGrpIdx are swapped as follows:

$$(\ minGrpIdx,\ maxGrpIdx\ ) = Swap(\ minGrpIdx,\ maxGrpIdx\ ) \quad (8\text{-}186)$$

– When pSelDsY[ minGrpIdx[ 1 ] ] is greater than pSelDsY[ maxGrpIdx[ 0 ] ], minGrpIdx[ 1 ] and maxGrpIdx[ 0 ] are swapped as follows:

$$(\ minGrpIdx[\ 1\ ],\ maxGrpIdx[\ 0\ ]\ ) = Swap(\ minGrpIdx[\ 1\ ],\ maxGrpIdx[\ 0\ ]\ ) \quad (8\text{-}187)$$

– The variables maxY, maxC, minY and minC are derived as follows:

$$maxY = (\ pSelDsY[\ maxGrpIdx[\ 0\ ]\ ] + pSelDsY[\ maxGrpIdx[\ 1\ ]\ ] + 1\ ) >> 1 \quad (8\text{-}188)$$

$$maxC = (\ pSelC[\ maxGrpIdx[\ 0\ ]\ ] + pSelC[\ maxGrpIdx[\ 1\ ]\ ] + 1\ ) >> 1 \quad (8\text{-}189)$$

$$minY = (\ pSelDsY[\ minGrpIdx[\ 0\ ]\ ] + pSelDsY[\ minGrpIdx[\ 1\ ]\ ] + 1\ ) >> 1 \quad (8\text{-}190)$$

$$minC = (\ pSelC[\ minGrpIdx[\ 0\ ]\ ] + pSelC[\ minGrpIdx[\ 1\ ]\ ] + 1\ ) >> 1 \quad (8\text{-}191)$$

7. The variables a, b, and k are derived as follows:

$$diff = maxY - minY \quad (8\text{-}195)$$

– If diff is not equal to 0, the following applies:

$$diffC = maxC - minC \quad (8\text{-}196)$$

FIG. 52

$$x = \text{Floor}(\text{Log2}(\text{diff})) \quad (8\text{-}197)$$

$$\text{normDiff} = ((\text{diff} << 4) >> x) \& 15 \quad (8\text{-}198)$$

$$x += (\text{normDiff} != 0) ? 1 : 0 \quad (8\text{-}199)$$

$$y = \text{Floor}(\text{Log2}(\text{Abs}(\text{diffC}))) + 1 \quad (8\text{-}200)$$

$$a = (\text{diffC} * (\text{divSigTable}[\text{normDiff}] | 8) + 2^{y-1}) >> y \quad (8\text{-}201)$$

$$k = ((3 + x - y) < 1) ? 1 : 3 + x - y \quad (8\text{-}202)$$

$$a = ((3 + x - y) < 1) ? \text{Sign}(a) * 15 : a \quad (8\text{-}203)$$

$$b = \text{minC} - ((a * \text{minY}) >> k) \quad (8\text{-}204)$$

where divSigTable[ ] is specified as follows:

$$\text{divSigTable}[\,] = \{0, 7, 6, 5, 5, 4, 4, 3, 3, 2, 2, 1, 1, 1, 1, 0\} \quad (8\text{-}205)$$

– Otherwise (diff is equal to 0), the following applies:

$$k = 0 \quad (8\text{-}206)$$

$$a = 0 \quad (8\text{-}207)$$

$$b = \text{minC} \quad (8\text{-}208)$$

8. The prediction samples predSamples[ x ][ y ] with x = 0..nTbW − 1, y = 0..nTbH − 1 are derived as follows:

$$\text{predSamples}[x][y] = \text{Clip1C}(((\text{pDsY}[x][y] * a) >> k) + b) \quad (8\text{-}209)$$

FIG. 53

Variation #5 of CCLM prediction

Inputs to this process are:
- the intra prediction mode predModeIntra,
- a sample location ( xTbC, yTbC ) of the top-left sample of the current transform block relative to the top-left sample of the current picture,
- a variable nTbW specifying the transform block width,
- a variable nTbH specifying the transform block height,
- a variable cIdx specifying the colour component of the current block,
- chroma neighbouring samples p[ x ][ y ], with x = −1, y = 0..2 * nTbH − 1 and x = 0..2 * nTbW − 1, y = −1.

Output of this process are predicted samples predSamples[ x ][ y ], with x = 0..nTbW − 1, y = 0..nTbH − 1.

The current luma location ( xTbY, yTbY ) is derived as follows:

( xTbY, yTbY ) = ( xTbC << ( SubWidthC − 1 ), yTbC << ( SubHeightC − 1 ) )    (8-165)

The variable bCTUboundary is derived as follows:

bCTUboundary = ( yTbC & ( 1 << ( CtbLog2SizeY − 1 ) − 1 ) == 0 ) ? TRUE : FALSE.    (8-171)

When predModeIntra is equal to INTRA_LT_CCLM, the following applies:
- The variables numSampT and numSampL are set equal to nTbW and nTbH, respectively.
- The variables startPosT and startPosL are set equal to (nTbW >> 2) and (nTbH >> 2), respectively.
- The variables pickStepT and pickStepL are set equal to (nTbW >> 1) and (nTbH >> 1), respectively.
- The variables cntT and cntL are set equal to 2.

Otherwise, if predModeIntra is equal to INTRA_L_CCLM, the following applies:

numSampL is set equal to (nTbH + Min(nTbW, nTbH)).

startPosL is set equal to (nTbH + Min(nTbW, nTbH)) >> 3.

pickStepL is set equal to (nTbH + Min(nTbW, nTbH)) >> 2.

cntL is set equal to 4.

Otherwise, if predModeIntra is equal to INTRA_T_CCLM, the following applies:

numSampT is set equal to (nTbW + Min(nTbW, nTbH)).

startPosT is set equal to (nTbW + Min(nTbW, nTbH)) >> 3.

pickStepT is set equal to (nTbW + Min(nTbW, nTbH)) >> 2.

cntT is set equal to 4.

The variable picPosN[pos] with pos = 0..cntN − 1 and N being replaced by L and T are derived as follows:

pickPosN[ pos ] = (startPosN + pos * pickStepN)

The prediction samples predSamples[ x ][ y ] with x = 0..nTbW − 1, y = 0..nTbH − 1 are derived as follows:

FIG. 54

1. The collocated luma samples pY[ x ][ y ] with x = 0..nTbW * SubWidthC − 1, y = 0..nTbH * SubHeightC − 1 are set equal to the reconstructed luma samples prior to the deblocking filter process at the locations ( xTbY + x, yTbY + y ).

2. For the generation of the neighbouring luma samples pY[ x ][ y ] with x = −3..−1, y = −3..SubHeightC * numSampL − 1 and x = 0..SubWidthC * numSampT − 1, y = −3..−1, the following applies:

– The derivation process for neighbouring block availability as specified in clause 6.4.4 is invoked with the sample location (xCurr, yCurr) set equal to ( xTbC, yTbC ), the neighbouring chroma location ( xTbC + x, yTbC + y ), checkPredModeY set equal to FALSE, the colour component index 1 as inputs, and the availability of the neighbouring chroma samples availC[ x ][ y ] with x = −1, y = −1..2 * nTbH − 1 and x = 0..2 * nTbW − 1, y = −1 as output.

– The availability of the neighbouring luma samples availY[ x ][ y ] with x = −1, y = −1..2 * SubHeightC * nTbH − 1 and x = 0..2 * SubWidthC * nTbW − 1, y = −1 are derived as follows:

– availY[ −1 ][ −1 ] is set equal to availC[ −1 ][ −1 ].

– availY[ x ][ y ] with x = −1, y = 0..2 * SubHeightC * nTbH − 1 is derived as follows:
       availY[ x ][ y * SubHeightC ] = availC[ x ][ y ]
       If SubHeightC is equal to 2, the following applies:
       availY[ x ][ y * SubHeightC + 1 ] = availC[ x ][ y ]

– availY[ x ][ y ] with x = 0..2 * SubWidthC * nTbW − 1, y = −1 is derived as follows:
       availY[ x * SubWidthC ][ y ] = availC[ x ][ y ]
       If SubWidthC is equal to 2, the following applies:
       availY[ x * SubWidthC + 1 ][ y ] = availC[ x ][ y ]

– For the reference line index refIdx with 0..2, when at least one sample availY[ x ][ y ] with x = −1, y = −1..SubHeightC * numSampL − 1 and x = 0..SubWidthC * numSampT − 1, y = −1 is equal to FALSE, the reference sample substitution process as specified in clause 8.4.5.2.8 is invoked with the intra prediction reference line index refIdx, the reference sample width (SubWidth * numSampT), the reference sample height (SubHeightC * numSampL), the reference samples availY[ x ][ y ] with x = −1, y = −1..SubHeightC * numSampL − 1 and x = 0..SubWidthC * numSampT − 1, y = −1, and the colour component index 0 as inputs, and the neighbouring luma samples pY[ x ][ y ] with x = −1 − refIdx, y = −1 − refIdx..(SubHeightC * numSampL) and x = −refIdx..(SubWidthC * numSampT), y = −1 − refIdx as output.

3. The down-sampled collocated luma samples pDsY[ x ][ y ] with x = 0..nTbW − 1, y = 0..nTbH − 1 are derived as follows:

– If both SubWidthC and SubHeightC are equal to 1, the following applies:

– pDsY[ x ][ y ] with x = 1..nTbW − 1, y = 1..nTbH − 1 is derived as follows:

pDsY[ x ][ y ] = pY[ x ][ y ]   (8-174)

– Otherwise, the following applies:

– The one-dimensional filter coefficients array F1 and F2, and the 2-dimensional filter coefficients arrays F3 and F4 are specified as follows.

F2[ 0 ] = 1, F2[ 1 ] = 2, F2[ 2 ] = 1   (8-176)

F3[ i ][ j ] = F4[ i ][ j ] = 0, with i = 0..2, j = 0..2   (8-177)

– If both SubWidthC and SubHeightC are equal to 2, the following applies:

$$F4[0][1] = 1, F4[1][1] = 2, F4[2][1] = 1 \quad (8\text{-}180)$$

$$F4[0][2] = 1, \quad F4[1][2] = 2, F4[2][2] = 1 \quad (8\text{-}181)$$

– Otherwise, the following applies:

$$F3[1][1] = 8 \quad (8\text{-}183)$$

$$F4[0][1] = 2, F4[1][1] = 4, F4[2][1] = 2, \quad (8\text{-}184)$$

– If sps_cclm_colocated_chroma_flag is equal to 1, the following applies:

– pDsY[ x ][ y ] with x = 1..nTbW − 1, y = 1..nTbH − 1 is derived as follows:

$$\begin{aligned}
pDsY[x][y] = (\, &F3[1][0] * pY[\,SubWidthC * x\,][\,SubHeightC * y - 1\,] + \\
&F3[0][1] * pY[\,SubWidthC * x - 1\,][\,SubHeightC * y\,] + \\
&F3[1][1] * pY[\,SubWidthC * x\,][\,SubHeightC * y\,] + \\
&F3[2][1] * pY[\,SubWidthC * x + 1\,][\,SubHeightC * y\,] + \\
&F3[1][2] * pY[\,SubWidthC * x\,][\,SubHeightC * y + 1\,] + 4\,) >> 3
\end{aligned} \quad (8\text{-}185)$$

– Otherwise (sps_cclm_colocated_chroma_flag is equal to 0), the following applies.

– pDsY[ x ][ y ] with x = 1..nTbW − 1, y = 0..nTbH − 1 is derived as follows:

$$\begin{aligned}
pDsY[x][y] = (\, &F4[0][1] * pY[\,SubWidthC * x - 1\,][\,SubHeightC * y\,] + \\
&F4[0][2] * pY[\,SubWidthC * x - 1\,][\,SubHeightC * y + 1\,] + \\
&F4[1][1] * pY[\,SubWidthC * x\,][\,SubHeightC * y\,] + \\
&F4[1][2] * pY[\,SubWidthC * x\,][\,SubHeightC * y + 1\,] + \\
&F4[2][1] * pY[\,SubWidthC * x + 1\,][\,SubHeightC * y\,] + \\
&F4[2][2] * pY[\,SubWidthC * x + 1\,][\,SubHeightC * y + 1\,] + 4\,) >> 3
\end{aligned} \quad (8\text{-}194)$$

4. When cntL is greater than 0, the selected neighbouring left chroma samples pSelC[ idx ] are set equal to p[ −1 ][ pickPosL[ idx ] ] with idx = 0..cntL − 1, and the selected down-sampled neighbouring left luma samples pSelDsY[ idx ] with idx = 0..cntL − 1 are derived as follows.

– The variable y is set equal to pickPosL[ idx ].

– If both SubWidthC and SubHeightC are equal to 1, the following applies:

$$pSelDsY[\,idx\,] = pY[-1][\,y\,] \quad (8\text{-}197)$$

– Otherwise the following applies:

– If sps_cclm_colocated_chroma_flag is equal to 1, the following applies:

$$\begin{aligned}
pSelDsY[idx] = (\, &F3[1][0] * pY[-SubWidthC][\,SubHeightC * y - 1\,] + \\
&F3[0][1] * pY[-1 - SubWidthC][\,SubHeightC * y\,] + \\
&F3[1][1] * pY[-SubWidthC][\,SubHeightC * y\,] + \\
&F3[2][1] * pY[1 - SubWidthC][\,SubHeightC * y\,] + \\
&F3[1][2] * pY[-SubWidthC][\,SubHeightC * y + 1\,] + 4\,) >> 3
\end{aligned} \quad (8\text{-}198)$$

– Otherwise (sps_cclm_colocated_chroma_flag is equal to 0), the following applies:

$$\begin{aligned}
pSelDsY[idx] = (\, &F4[0][1] * pY[-1 - SubWidthC][\,SubHeightC * y\,] + \\
&F4[0][2] * pY[-1 - SubWidthC][\,SubHeightC * y + 1\,] + \\
&F4[1][1] * pY[-SubWidthC][\,SubHeightC * y\,] + \\
&F4[1][2] * pY[-SubWidthC][\,SubHeightC * y + 1\,] + \\
&F4[2][1] * pY[1 - SubWidthC][\,SubHeightC * y\,] + \\
&F4[2][2] * pY[1 - SubWidthC][\,SubHeightC * y + 1\,] + 4\,) >> 3
\end{aligned} \quad (8\text{-}200)$$

FIG. 56

5. When cntT is greater than 0, the selected neighbouring top chroma samples pSelC[ idx ] are set equal to p[ pickPosT[ idx − cntL ] ][ −1 ] with idx = cntL..cntL + cntT − 1, and the down-sampled neighbouring top luma samples pSelDsY[ idx ] with idx = 0..cntL + cntT − 1 are specified as follows:

– The variable x is set equal to pickPosT[ idx − cntL ].

– If both SubWidthC and SubHeightC are equal to 1, the following applies:

$$pSelDsY[\ idx\ ] = pY[\ x\ ][\ -1\ ] \quad (8\text{-}201)$$

– Otherwise, the following applies:

– If bCTUboundary is equal to TRUE, the following applies:

$$pSelDsY[\ idx\ ] = (\ F2[\ 0\ ] * pY[\ SubWidthC * x - 1\ ][\ -1\ ] + \\ F2[\ 1\ ] * pY[\ SubWidthC * x\ ][\ -1\ ] + \\ F2[\ 2\ ] * pY[\ SubWidthC * x + 1\ ][\ -1\ ] + 2\ ) >> 2 \quad (8\text{-}203)$$

– Otherwise (bCTUboundary is equal to FALSE), the following applies:

– If sps_cclm_colocated_chroma_flag is equal to 1, the following applies:

$$pSelDsY[\ idx\ ] = (\ F3[\ 1\ ][\ 0\ ] * pY[\ -1\ ][\ -1 - SubHeightC\ ] + \\ F3[\ 0\ ][\ 1\ ] * pY[\ -1\ ][\ -SubHeightC\ ] + \\ F3[\ 1\ ][\ 1\ ] * pY[\ 0\ ][\ -SubHeightC\ ] + \\ F3[\ 2\ ][\ 1\ ] * pY[\ 1\ ][\ -SubHeightC\ ] + \\ F3[\ 1\ ][\ 2\ ] * pY[\ -1\ ][\ 1 - SubHeightC\ ] + 4\ ) >> 3 \quad (8\text{-}204)$$

– Otherwise (sps_cclm_colocated_chroma_flag is equal to 0), the following applies:

$$pSelDsY[\ idx\ ] = (\ F4[\ 0\ ][\ 1\ ] * pY[\ SubWidthC * x - 1\ ][\ -2\ ] + \\ F4[\ 0\ ][\ 2\ ] * pY[\ SubWidthC * x - 1\ ][\ -1\ ] + \\ F4[\ 1\ ][\ 1\ ] * pY[\ SubWidthC * x\ ][\ -2\ ] + \\ F4[\ 1\ ][\ 2\ ] * pY[\ SubWidthC * x\ ][\ -1\ ] + \\ F4[\ 2\ ][\ 1\ ] * pY[\ SubWidthC * x + 1\ ][\ -2\ ] + \\ F4[\ 2\ ][\ 2\ ] * pY[\ SubWidthC * x + 1\ ][\ -1\ ] + 4\ ) >> 3 \quad (8\text{-}208)$$

6. The variables minY, maxY, minC and maxC are derived as follows:

– The arrays minGrpIdx and maxGrpIdx are derived as follows:

$$minGrpIdx[\ 0\ ] = 0 \quad (8\text{-}214)$$

$$minGrpIdx[\ 1\ ] = 2 \quad (8\text{-}215)$$

$$maxGrpIdx[\ 0\ ] = 1 \quad (8\text{-}216)$$

$$maxGrpIdx[\ 1\ ] = 3 \quad (8\text{-}217)$$

– When pSelDsY[ minGrpIdx[ 0 ] ] is greater than pSelDsY[ minGrpIdx[ 1 ] ], minGrpIdx[ 0 ] and minGrpIdx[ 1 ] are swapped as follows:

$$(\ minGrpIdx[\ 0\ ],\ minGrpIdx[\ 1\ ]\ ) = Swap(\ minGrpIdx[\ 0\ ],\ minGrpIdx[\ 1\ ]\ ) \quad (8\text{-}218)$$

– When pSelDsY[ maxGrpIdx[ 0 ] ] is greater than pSelDsY[ maxGrpIdx[ 1 ] ], maxGrpIdx[ 0 ] and maxGrpIdx[ 1 ] are swapped as follows:

$$(\ maxGrpIdx[\ 0\ ],\ maxGrpIdx[\ 1\ ]\ ) = Swap(\ maxGrpIdx[\ 0\ ],\ maxGrpIdx[\ 1\ ]\ ) \quad (8\text{-}219)$$

– When pSelDsY[ minGrpIdx[ 0 ] ] is greater than pSelDsY[ maxGrpIdx[ 1 ] ], arrays minGrpIdx and maxGrpIdx are swapped as follows:

FIG. 57

$(minGrpIdx, maxGrpIdx) = Swap(minGrpIdx, maxGrpIdx)$      (8-220)

– When pSelDsY[ minGrpIdx[ 1 ] ] is greater than pSelDsY[ maxGrpIdx[ 0 ] ], minGrpIdx[ 1 ] and maxGrpIdx[ 0 ] are swapped as follows:

$(minGrpIdx[1], maxGrpIdx[0]) = Swap(minGrpIdx[1], maxGrpIdx[0])$      (8-221)

– The variables maxY, maxC, minY and minC are derived as follows:

$maxY = (pSelDsY[maxGrpIdx[0]] + pSelDsY[maxGrpIdx[1]] + 1) >> 1$      (8-222)

$maxC = (pSelC[maxGrpIdx[0]] + pSelC[maxGrpIdx[1]] + 1) >> 1$      (8-223)

$minY = (pSelDsY[minGrpIdx[0]] + pSelDsY[minGrpIdx[1]] + 1) >> 1$      (8-224)

$minC = (pSelC[minGrpIdx[0]] + pSelC[minGrpIdx[1]] + 1) >> 1$      (8-225)

7. The variables a, b, and k are derived as follows:

$diff = maxY - minY$      (8-229)

– If diff is not equal to 0, the following applies:

$diffC = maxC - minC$      (8-230)

$x = Floor(Log2(diff))$      (8-231)

$normDiff = ((diff << 4) >> x) \& 15$      (8-232)

$x += (normDiff != 0) ? 1 : 0$      (8-233)

$y = Floor(Log2(Abs(diffC))) + 1$      (8-234)

$a = (diffC * (divSigTable[normDiff] | 8) + 2^{y-1}) >> y$      (8-235)

$k = ((3 + x - y) < 1) ? 1 : 3 + x - y$      (8-236)

$a = ((3 + x - y) < 1) ? Sign(a) * 15 : a$      (8-237)

$b = minC - ((a * minY) >> k)$      (8-238)

where divSigTable[ ] is specified as follows:

$divSigTable[\ ] = \{0, 7, 6, 5, 5, 4, 4, 3, 3, 2, 2, 1, 1, 1, 1, 0\}$      (8-239)

– Otherwise (diff is equal to 0), the following applies:

$k = 0$      (8-240)

$a = 0$      (8-241)

$b = minC$      (8-242)

8. The prediction samples predSamples[ x ][ y ] with x = 0..nTbW − 1, y = 0..nTbH − 1 are derived as follows:

$predSamples[x][y] = Clip1C(((pDsY[x][y] * a) >> k) + b)$      (8-243)

METHOD AND APPARATUS FOR ENCODING/DECODING IMAGE IN INTRA PREDICTION AND RECORDING MEDIUM FOR STORING BITSTREAM

TECHNICAL FIELD

The present invention relates to an image encoding/decoding method and apparatus, and a recording medium for storing a bitstream. More particularly, the present invention relates to a method of encoding/decoding an image using cross-component prediction.

BACKGROUND ART

Recently, the demand for high resolution and quality images such as high definition (HD) or ultra-high definition (UHD) images has increased in various applications. As the resolution and quality of images are improved, the amount of data correspondingly increases. This is one of the causes of increase in transmission cost and storage cost when transmitting image data through existing transmission media such as wired or wireless broadband channels or when storing image data. In order to solve such problems with high resolution and quality image data, a high efficiency image encoding/decoding technique is required.

There are various video compression techniques such as an inter prediction technique of predicting the values of pixels within a current picture from the values of pixels within a preceding picture or a subsequent picture, an intra prediction technique of predicting the values of pixels within a region of a current picture from the values of pixels within another region of the current picture, a transform and quantization technique of compressing the energy of a residual signal, and an entropy coding technique of allocating frequently occurring pixel values with shorter codes and less occurring pixel values with longer codes.

In encoding/decoding method and apparatus using cross-component prediction of prior art, when down-sampling is performed, various types of down-sampling filters are selectively used according to the location of down-sampling and the effectiveness of neighboring pixels, thereby optimizing may be difficult when implementing software and hardware.

DISCLOSURE

Technical Problem

An object of the present invention is to provide an image encoding/decoding method and apparatus with improved encoding/decoding efficiency.

Another object of the present invention is to provide an image encoding/decoding method and apparatus capable of performing accurate cross-component prediction in consideration of various color formats and sub-sampling factors.

Another object of the present invention is to provide a recording medium for storing a bitstream generated by an image decoding method or apparatus according to the present invention.

Technical Solution

A method of decoding an image according to an embodiment of the present invention includes determining an intra prediction mode of a current block, and generating a prediction block of the current block, by performing prediction based on the intra prediction mode. When the intra prediction mode of the current block is a matrix-based intra prediction (MIP) mode, a length of a reference sample used for intra prediction is derived based on a length of the current block.

In the method of decoding the image, the reference sample may include a top reference sample and a left reference sample, a length of the top reference sample may be derived as a width of the current block+1, and a length of the left reference sample may be derived as a height of the current block+1.

In the method of decoding the image, the reference sample may include a top reference sample and a left reference sample, a length of the top reference sample may be derived as twice a width of the current block and a length of the left reference sample may be derived as twice a height of the current block.

In the method of decoding the image, when the current block is a chroma block and the intra prediction mode of the current block is a cross-component prediction mode, the intra prediction of the current block may include generating a neighboring sample of a luma block corresponding to the current block, performing down-sampling with respect to the neighboring sample of the luma block, deriving a cross-component parameter based on the down-sampled neighboring sample, and generating the prediction block of the current block based on the cross-component parameter.

In the method of decoding the image, the neighboring sample of the luma block may include at least one of a top neighboring sample or a left neighboring sample, and, when the neighboring sample of the luma block is not available, the unavailable neighboring sample may be replaced with an inner sample of the luma block.

In the method of decoding the image, when the unavailable neighboring sample is the top neighboring sample, the inner sample of the luma block may be an inner sample adjacent to a top boundary of the luma block, and, when the unavailable neighboring sample is the left neighboring sample, the inner sample of the luma block may be an inner sample adjacent to a left boundary of the luma block.

In the method of decoding the image, the unavailable top neighboring sample and the inner sample adjacent to the top boundary of the luma block may have the same x coordinate, and the unavailable left neighboring sample and the inner sample adjacent to the left boundary of the luma block may have the same y coordinate.

In the method of decoding the image, the neighboring sample of the luma block may include at least one of a top neighboring sample or a left neighboring sample, and a filter used for down-sampling of the top neighboring sample may be differently determined based on at least one of whether a top boundary of the current block is a coding tree unit (CTU) boundary or information on locations of a chroma signal and a luma signal corresponding thereto.

In the method of decoding the image, wherein the neighboring sample of the luma block may include at least one of a top neighboring sample or a left neighboring sample, and a filter used for down-sampling of the left neighboring sample may be differently determined based on information on locations of a chroma signal and a luma signal corresponding thereto.

In the method of decoding the image, the intra prediction of the current block may further include performing down-sampling with respect to an inner sample of the luma block, and a filter used for down-sampling of the inner sample of the luma block may be differently determined based on at least one of whether the neighboring sample is available or information on locations of a chroma signal and a luma signal corresponding thereto.

A method of encoding an image according to another embodiment of the present invention includes determining an intra prediction mode of a current block, and generating a prediction block of the current block, by performing prediction based on the intra prediction mode. When the intra prediction mode of the current block is a matrix-based intra prediction (MIP) mode, a length of a reference sample used for intra prediction is derived based on a length of the current block.

In the method of encoding the image, the reference sample may include a top reference sample and a left reference sample, a length of the top reference sample may be derived as a width of the current block+1, and a length of the left reference sample may be derived as a height of the current block+1.

In the method of encoding the image, the reference sample may include a top reference sample and a left reference sample, a length of the top reference sample may be derived as twice a width of the current block and a length of the left reference sample may be derived as twice a height of the current block.

In the method of encoding the image, when the current block is a chroma block and the intra prediction mode of the current block is a cross-component prediction mode, the intra prediction of the current block may include generating a neighboring sample of a luma block corresponding to the current block, performing down-sampling with respect to the neighboring sample of the luma block, deriving a cross-component parameter based on the down-sampled neighboring sample, and generating the prediction block of the current block based on the cross-component parameter.

In the method of encoding the image, the neighboring sample of the luma block may include at least one of a top neighboring sample or a left neighboring sample, and, when the neighboring sample of the luma block is not available, the unavailable neighboring sample may be replaced with an inner sample of the luma block.

In the method of encoding the image, when the unavailable neighboring sample is the top neighboring sample, the inner sample of the luma block may be an inner sample adjacent to a top boundary of the luma block, and, when the unavailable neighboring sample is the left neighboring sample, the inner sample of the luma block may be an inner sample adjacent to a left boundary of the luma block.

In the method of encoding the image, the neighboring sample of the luma block includes at least one of a top neighboring sample or a left neighboring sample, and a filter used for down-sampling of the top neighboring sample may be differently determined based on at least one of whether a top boundary of the current block is a coding tree unit (CTU) boundary or information on locations of a chroma signal and a luma signal corresponding thereto.

In the method of encoding the image, the neighboring sample of the luma block may include at least one of a top neighboring sample or a left neighboring sample, and a filter used for down-sampling of the left neighboring sample may be differently determined based on information on locations of a chroma signal and a luma signal corresponding thereto.

In the method of encoding the image, the intra prediction of the current block may further include performing down-sampling with respect to an inner sample of the luma block, and a filter used for down-sampling of the inner sample of the luma block may be differently determined based on at least one of whether the neighboring sample is available or information on locations of a chroma signal and a luma signal corresponding thereto.

A non-transitory computer-readable recording medium for storing a bitstream generated by an image encoding method according to another embodiment includes determining an intra prediction mode of a current block, and generating a prediction block of the current block, by performing prediction based on the intra prediction mode. When the intra prediction mode of the current block is a matrix-based intra prediction (MIP) mode, a length of a reference sample used for intra prediction is derived based on a length of the current block.

Advantageous Effects

According to the present invention, it is possible to provide an image encoding/decoding method and apparatus with improved encoding/decoding efficiency.

According to the present invention, it is possible to provide an image encoding/decoding method and apparatus capable of performing accurate cross-component prediction in consideration of various color formats and sub-sampling factors.

According to the present invention, it is possible to simplify down-sampling of inner samples of a specific component block.

According to the present invention, it is possible to simplify down-sampling of top neighboring samples of a specific component block.

According to the present invention, it is possible to simplify down-sampling of left neighboring samples of a specific component block.

According to the present invention, it is possible to provide a recording medium for storing a bitstream generated by an image encoding method or apparatus according to the present invention.

According to the present invention, it is possible to provide a recording medium for storing a bitstream received and decoded by an image decoding apparatus according to the present invention and used to reconstruct an image.

According to the present invention, it is possible to provide an image encoding/decoding method and apparatus capable of easily being optimized when software and hardware is implemented using a single down-sampling filter for valid samples or virtual samples regardless of down-sampling position and neighboring sample validity when down-sampling is performed in inter component prediction.

According to the present invention, it is possible to provide an image encoding/decoding method and apparatus for always performing intra prediction after generating neighboring samples as valid samples or virtual samples for all intra prediction modes.

DESCRIPTION OF DRAWINGS

FIG. 12 is a view illustrating an embodiment of availability information used to generate neighboring samples of a first component block according to an embodiment of the present invention.

FIG. 13 is a view illustrating an example of generating a neighboring sample line according to a color format, according to an embodiment of the present invention.

FIG. 25 is a view showing an embodiment in which a syntax element related to multiple reference lines (MRLs) is simplified, according to an embodiment of the present invention.

FIGS. 26 to 31 are views illustrating an embodiment of a process of performing cross-component prediction according to the present invention.

FIGS. 32 to 57 show various variations of a process of performing cross-component prediction according to the present invention.

MODE FOR INVENTION

Figure 1:
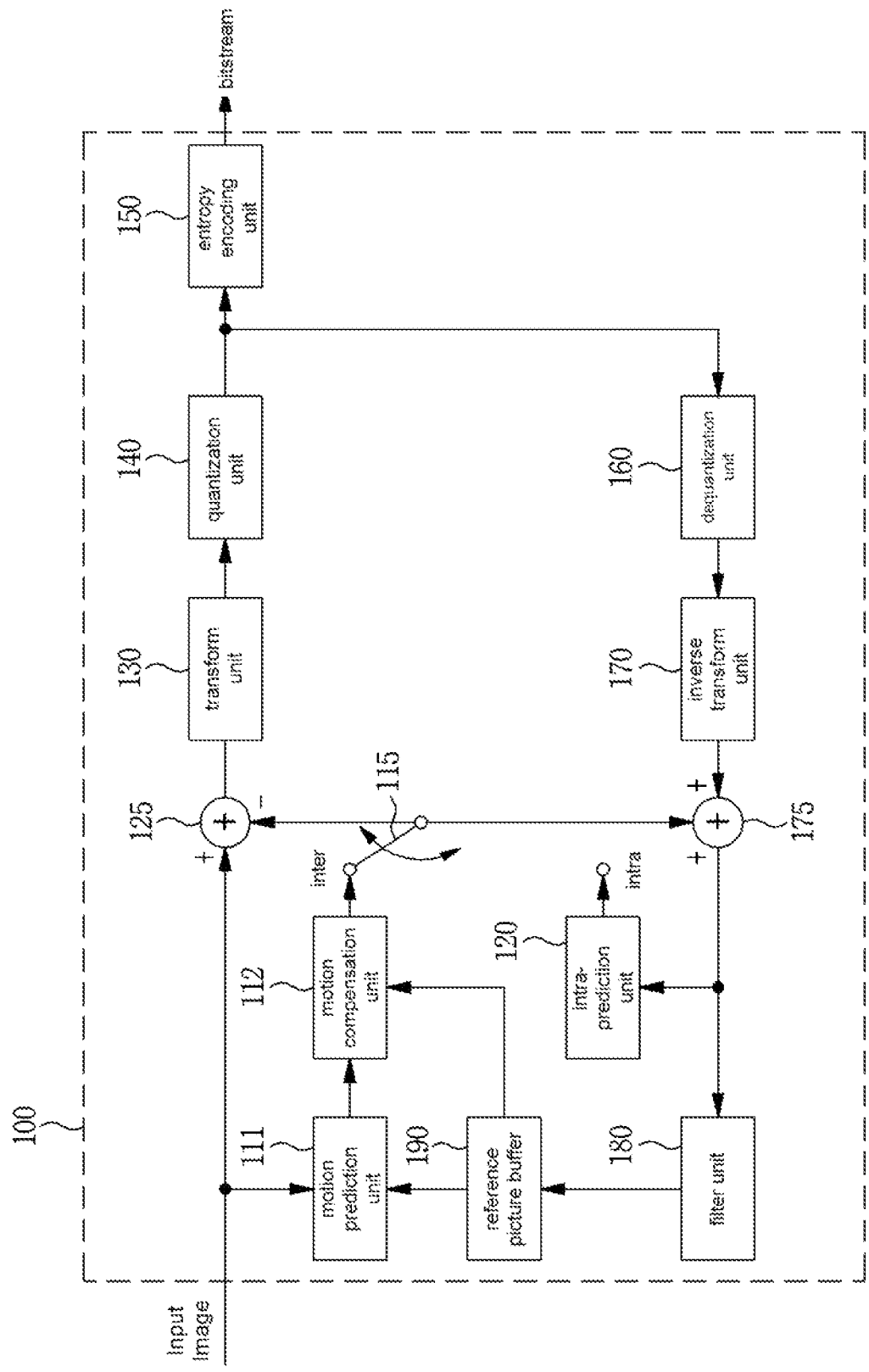
FIG. 1 is a block diagram showing a configuration of an encoding apparatus according to an embodiment to which the present invention is applied.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

Hereinafter, an image may mean a picture configuring a video, or may mean the video itself. For example, "encoding or decoding or both of an image" may mean "encoding or decoding or both of a moving picture", and may mean "encoding or decoding or both of one image among images of a moving picture."

Hereinafter, terms "moving picture" and "video" may be used as the same meaning and be replaced with each other.

Hereinafter, a target image may be an encoding target image which is a target of encoding and/or a decoding target image which is a target of decoding. Also, a target image may be an input image inputted to an encoding apparatus, and an input image inputted to a decoding apparatus. Here, a target image may have the same meaning with the current image.

Hereinafter, terms "image", "picture, "frame" and "screen" may be used as the same meaning and be replaced with each other.

Hereinafter, a target block may be an encoding target block which is a target of encoding and/or a decoding target block which is a target of decoding. Also, a target block may be the current block which is a target of current encoding and/or decoding. For example, terms "target block" and "current block" may be used as the same meaning and be replaced with each other.

Hereinafter, terms "block" and "unit" may be used as the same meaning and be replaced with each other. Or a "block" may represent a specific unit.

Hereinafter, terms "region" and "segment" may be replaced with each other.

Hereinafter, a specific signal may be a signal representing a specific block. For example, an original signal may be a signal representing a target block. A prediction signal may be a signal representing a prediction block. A residual signal may be a signal representing a residual block.

In embodiments, each of specific information, data, flag, index, element and attribute, etc. may have a value. A value of information, data, flag, index, element and attribute equal to "0" may represent a logical false or the first predefined value. In other words, a value "0", a false, a logical false and the first predefined value may be replaced with each other. A value of information, data, flag, index, element and attribute equal to "1" may represent a logical true or the second predefined value. In other words, a value "1", a true, a logical true and the second predefined value may be replaced with each other.

When a variable i or j is used for representing a column, a row or an index, a value of i may be an integer equal to or greater than 0, or equal to or greater than 1. That is, the column, the row, the index, etc. may be counted from 0 or may be counted from 1.

Description of Terms

Encoder: means an apparatus performing encoding. That is, means an encoding apparatus.

Decoder: means an apparatus performing decoding. That is, means a decoding apparatus.

Block: is an M×N array of a sample. Herein, M and N may mean positive integers, and the block may mean a sample array of a two-dimensional form. The block may refer to a unit. A current block my mean an encoding target block that becomes a target when encoding, or a decoding target block that becomes a target when decoding. In addition, the current block may be at least one of an encode block, a prediction block, a residual block, and a transform block.

Sample: is a basic unit constituting a block. It may be expressed as a value from 0 to $2^{Bd}-1$ according to a bit depth ($B_d$). In the present invention, the sample may be used as a meaning of a pixel. That is, a sample, a pel, a pixel may have the same meaning with each other.

Unit: may refer to an encoding and decoding unit. When encoding and decoding an image, the unit may be a region generated by partitioning a single image. In addition, the unit may mean a subdivided unit when a single image is partitioned into subdivided units during encoding or decoding. That is, an image may be partitioned into a plurality of units. When encoding and decoding an image, a predetermined process for each unit may be performed. A single unit may be partitioned into sub-units that have sizes smaller than the size of the unit. Depending on functions, the unit may mean a block, a macroblock, a coding tree unit, a code tree block, a coding unit, a coding block), a prediction unit, a prediction block, a residual unit), a residual block, a transform unit, a transform block, etc. In addition, in order to distinguish a unit from a block, the unit may include a luma component block, a chroma component block associated with the luma component block, and a syntax element of each color component block. The unit may have various sizes and forms, and particularly, the form of the unit may be a two-dimensional geometrical figure such as a square shape, a rectangular shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Coding Tree Unit: is configured with a single coding tree block of a luma component Y, and two coding tree blocks related to chroma components Cb and Cr. In addition, it may mean that including the blocks and a syntax element of each block. Each coding tree unit may be partitioned by using at least one of a quad-tree partitioning method, a binary-tree partitioning method and ternary-tree partitioning method to configure a lower unit such as coding unit, prediction unit, transform unit, etc. It may be used as a term for designating a sample block that becomes a process unit when encoding/decoding an image as an input image. Here, the quad-tree may mean a quaternary-tree.

When the size of the coding block is within a predetermined range, the division is possible using only quad-tree partitioning. Here, the predetermined range may be defined as at least one of a maximum size and a minimum size of a coding block in which the division is possible using only quad-tree partitioning. Information indicating a maximum/minimum size of a coding block in which quad-tree partitioning is allowed may be signaled through a bitstream, and the information may be signaled in at least one unit of a sequence, a picture parameter, a tile group, or a slice (segment). Alternatively, the maximum/minimum size of the coding block may be a fixed size predetermined in the coder/decoder. For example, when the size of the coding block corresponds to 256×256 to 64×64, the division is possible only using quad-tree partitioning. Alternatively, when the size of the coding block is larger than the size of the maximum conversion block, the division is possible only using quad-tree partitioning. Herein, the block to be divided may be at least one of a coding block and a transform block. In this case, information indicating the division of the coded block (for example, split_flag) may be a flag indicating whether or not to perform the quad-tree partitioning. When the size of the coding block falls within a predetermined range, the division is possible only using binary tree or ternary tree partitioning. In this case, the above description of the quad-tree partitioning may be applied to binary tree partitioning or ternary tree partitioning in the same manner.

Coding Tree Block: may be used as a term for designating any one of a Y coding tree block, Cb coding tree block, and Cr coding tree block.

Neighbor Block: may mean a block adjacent to a current block. The block adjacent to the current block may mean a block that comes into contact with a boundary of the current block, or a block positioned within a predetermined distance from the current block. The neighbor block may mean a block adjacent to a vertex of the current block. Herein, the block adjacent to the vertex of the current block may mean a block vertically adjacent to a neighbor block that is horizontally adjacent to the current block, or a block horizontally adjacent to a neighbor block that is vertically adjacent to the current block.

Reconstructed Neighbor block: may mean a neighbor block adjacent to a current block and which has been already spatially/temporally encoded or decoded. Herein, the reconstructed neighbor block may mean a reconstructed neighbor unit. A reconstructed spatial neighbor block may be a block within a current picture and which has been already reconstructed through encoding or decoding or both. A reconstructed temporal neighbor block is a block at a corresponding position as the current block of the current picture within a reference image, or a neighbor block thereof.

Unit Depth: may mean a partitioned degree of a unit. In a tree structure, the highest node (Root Node) may correspond to the first unit which is not partitioned. Also, the highest node may have the least depth value. In this case, the highest node may have a depth of level 0. A node having a depth of level 1 may represent a unit generated by partitioning once the first unit. A node having a depth of level 2 may represent a unit generated by partitioning twice the first unit. A node having a depth of level n may represent a unit generated by partitioning n-times the first unit. A Leaf Node may be the lowest node and a node which cannot be partitioned further. A depth of a Leaf Node may be the maximum level. For example, a predefined value of the maximum level may be 3. A depth of a root node may be the lowest and a depth of a leaf node may be the deepest. In addition, when a unit is expressed as a tree structure, a level in which a unit is present may mean a unit depth.

Bitstream: may mean a bitstream including encoding image information.

Parameter Set: corresponds to header information among a configuration within a bitstream. At least one of a video parameter set, a sequence parameter set, a picture parameter set, and an adaptation parameter set may be included in a parameter set. In addition, a parameter set may include a slice header, a tile group header, and tile header information. The term "tile group" means a group of tiles and has the same meaning as a slice.

An adaptation parameter set may mean a parameter set that can be shared by being referred to in different pictures, subpictures, slices, tile groups, tiles, or bricks. In addition, information in an adaptation parameter set may be used by referring to different adaptation parameter sets for a subpicture, a slice, a tile group, a tile, or a brick inside a picture.

In addition, regarding the adaptation parameter set, different adaptation parameter sets may be referred to by using identifiers of different adaptation parameter sets for a subpicture, a slice, a tile group, a tile, or a brick inside a picture.

In addition, regarding the adaptation parameter set, different adaptation parameter sets may be referred to by using identifiers of different adaptation parameter sets for a slice, a tile group, a tile, or a brick inside a subpicture.

In addition, regarding the adaptation parameter set, different adaptation parameter sets may be referred to by using identifiers of different adaptation parameter sets for a tile or a brick inside a slice.

In addition, regarding the adaptation parameter set, different adaptation parameter sets may be referred to by using identifiers of different adaptation parameter sets for a brick inside a tile.

Information on an adaptation parameter set identifier may be included in a parameter set or a header of the subpicture, and an adaptation parameter set corresponding to the adaptation parameter set identifier may be used for the subpicture.

The information on the adaptation parameter set identifier may be included in a parameter set or a header of the tile, and an adaptation parameter set corresponding to the adaptation parameter set identifier may be used for the tile.

The information on the adaptation parameter set identifier may be included in a header of the brick, and an adaptation parameter set corresponding to the adaptation parameter set identifier may be used for the brick.

The picture may be partitioned into one or more tile rows and one or more tile columns.

The subpicture may be partitioned into one or more tile rows and one or more tile columns within a picture. The subpicture may be a region having the form of a rectangle/square within a picture and may include one or more CTUs. In addition, at least one or more tiles/bricks/slices may be included within one subpicture.

The tile may be a region having the form of a rectangle/square within a picture and may include one or more CTUs. In addition, the tile may be partitioned into one or more bricks.

The brick may mean one or more CTU rows within a tile. The tile may be partitioned into one or more bricks, and each brick may have at least one or more CTU rows. A tile that is not partitioned into two or more may mean a brick.

The slice may include one or more tiles within a picture and may include one or more bricks within a tile.

Parsing: may mean determination of a value of a syntax element by performing entropy decoding, or may mean the entropy decoding itself.

Symbol: may mean at least one of a syntax element, a coding parameter, and a transform coefficient value of an encoding/decoding target unit. In addition, the symbol may mean an entropy encoding target or an entropy decoding result.

Prediction Mode: may be information indicating a mode encoded/decoded with intra prediction or a mode encoded/decoded with inter prediction.

Prediction Unit: may mean a basic unit when performing prediction such as inter-prediction, intra-prediction, inter-compensation, intra-compensation, and motion compensation. A single prediction unit may be partitioned into a plurality of partitions having a smaller size, or may be partitioned into a plurality of lower prediction units. A plurality of partitions may be a basic unit in performing prediction or compensation. A partition which is generated by dividing a prediction unit may also be a prediction unit.

Prediction Unit Partition: may mean a form obtained by partitioning a prediction unit.

Reference picture list may refer to a list including one or more reference pictures used for inter prediction or motion compensation. There are several types of usable reference picture lists, including LC (List combined), L0 (List 0), L1 (List 1), L2 (List 2), L3 (List 3).

Inter prediction indicator may refer to a direction of inter prediction (unidirectional prediction, bidirectional prediction, etc.) of a current block. Alternatively, it may refer to the number of reference pictures used to generate a prediction block of a current block. Alternatively, it may refer to the number of prediction blocks used at the time of performing inter prediction or motion compensation on a current block.

Prediction list utilization flag indicates whether a prediction block is generated using at least one reference picture in a specific reference picture list. An inter prediction indicator can be derived using a prediction list utilization flag, and conversely, a prediction list utilization flag can be derived using an inter prediction indicator. For example, when the prediction list utilization flag has a first value of zero (0), it means that a reference picture in a reference picture list is not used to generate a prediction block. On the other hand, when the prediction list utilization flag has a second value of one (1), it means that a reference picture list is used to generate a prediction block.

Reference picture index may refer to an index indicating a specific reference picture in a reference picture list.

Reference picture may mean a reference picture which is referred to by a specific block for the purposes of inter prediction or motion compensation of the specific block. Alternatively, the reference picture may be a picture including a reference block referred to by a current block for inter prediction or motion compensation. Hereinafter, the terms "reference picture" and "reference image" have the same meaning and can be interchangeably.

Motion vector may be a two-dimensional vector used for inter prediction or motion compensation. The motion vector may mean an offset between an encoding/decoding target block and a reference block. For example, (mvX, mvY) may represent a motion vector. Here, mvX may represent a horizontal component and mvY may represent a vertical component.

Search range may be a two-dimensional region which is searched to retrieve a motion vector during inter prediction. For example, the size of the search range may be M×N. Here, M and N are both integers.

Motion vector candidate may refer to a prediction candidate block or a motion vector of the prediction candidate block when predicting a motion vector. In addition, a motion vector candidate may be included in a motion vector candidate list.

Motion vector candidate list may mean a list composed of one or more motion vector candidates.

Motion vector candidate index may mean an indicator indicating a motion vector candidate in a motion vector candidate list. Alternatively, it may be an index of a motion vector predictor.

Motion information may mean information including at least one of the items including a motion vector, a reference picture index, an inter prediction indicator, a prediction list utilization flag, reference picture list information, a reference picture, a motion vector candidate, a motion vector candidate index, a merge candidate, and a merge index.

Merge candidate list may mean a list composed of one or more merge candidates.

Merge candidate may mean a spatial merge candidate, a temporal merge candidate, a combined merge candidate, a combined bi-predictive merge candidate, or a zero merge candidate. The merge candidate may include motion information such as an inter prediction indicator, a reference picture index for each list, a motion vector, a prediction list utilization flag, and an inter prediction indicator.

Merge index may mean an indicator indicating a merge candidate in a merge candidate list. Alternatively, the merge index may indicate a block from which a merge candidate has been derived, among reconstructed blocks spatially/temporally adjacent to a current block. Alternatively, the merge index may indicate at least one piece of motion information of a merge candidate.

Transform Unit: may mean a basic unit when performing encoding/decoding such as transform, inverse-transform, quantization, dequantization, transform coefficient encoding/decoding of a residual signal. A single transform unit may be partitioned into a plurality of lower-level transform units having a smaller size. Here, transformation/inverse-transformation may comprise at least one among the first transformation/the first inverse-transformation and the second transformation/the second inverse-transformation.

Scaling: may mean a process of multiplying a quantized level by a factor. A transform coefficient may be generated by scaling a quantized level. The scaling also may be referred to as dequantization.

Quantization Parameter: may mean a value used when generating a quantized level using a transform coefficient during quantization. The quantization parameter also may mean a value used when generating a transform coefficient by scaling a quantized level during dequantization. The quantization parameter may be a value mapped on a quantization step size.

Delta Quantization Parameter: may mean a difference value between a predicted quantization parameter and a quantization parameter of an encoding/decoding target unit.

Scan: may mean a method of sequencing coefficients within a unit, a block or a matrix. For example, changing a two-dimensional matrix of coefficients into a one-dimensional matrix may be referred to as scanning, and changing a one-dimensional matrix of coefficients into a two-dimensional matrix may be referred to as scanning or inverse scanning.

Transform Coefficient: may mean a coefficient value generated after transform is performed in an encoder. It may mean a coefficient value generated after at least one of entropy decoding and dequantization is performed in a decoder. A quantized level obtained by quantizing a transform coefficient or a residual signal, or a quantized transform coefficient level also may fall within the meaning of the transform coefficient.

Quantized Level: may mean a value generated by quantizing a transform coefficient or a residual signal in an encoder. Alternatively, the quantized level may mean a value that is a dequantization target to undergo dequantization in a decoder. Similarly, a quantized transform coefficient level that is a result of transform and quantization also may fall within the meaning of the quantized level.

Non-zero Transform Coefficient: may mean a transform coefficient having a value other than zero, or a transform coefficient level or a quantized level having a value other than zero.

Quantization Matrix: may mean a matrix used in a quantization process or a dequantization process performed to improve subjective or objective image quality. The quantization matrix also may be referred to as a scaling list.

Quantization Matrix Coefficient: may mean each element within a quantization matrix. The quantization matrix coefficient also may be referred to as a matrix coefficient.

Default Matrix: may mean a predetermined quantization matrix preliminarily defined in an encoder or a decoder.

Non-default Matrix: may mean a quantization matrix that is not preliminarily defined in an encoder or a decoder but is signaled by a user.

Statistic Value: a statistic value for at least one among a variable, a coding parameter, a constant value, etc. which have a computable specific value may be one or more among an average value, a sum value, a weighted average value, a weighted sum value, the minimum value, the maximum value, the most frequent value, a median value, an interpolated value of the corresponding specific values.

FIG. 1 is a block diagram showing a configuration of an encoding apparatus according to an embodiment to which the present invention is applied.

An encoding apparatus 100 may be an encoder, a video encoding apparatus, or an image encoding apparatus. A video may include at least one image. The encoding apparatus 100 may sequentially encode at least one image.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, an inverse-transform unit 170, an adder 175, a filter unit 180, and a reference picture buffer 190.

The encoding apparatus 100 may perform encoding of an input image by using an intra mode or an inter mode or both. In addition, encoding apparatus 100 may generate a bitstream including encoded information through encoding the input image, and output the generated bitstream. The generated bitstream may be stored in a computer readable recording medium, or may be streamed through a wired/wireless transmission medium. When an intra mode is used as a prediction mode, the switch 115 may be switched to an intra. Alternatively, when an inter mode is used as a prediction mode, the switch 115 may be switched to an inter mode. Herein, the intra mode may mean an intra-prediction mode, and the inter mode may mean an inter-prediction mode. The encoding apparatus 100 may generate a prediction block for an input block of the input image. In addition, the encoding apparatus 100 may encode a residual block using a residual of the input block and the prediction block after the prediction block being generated. The input image may be called as a current image that is a current encoding target. The input block may be called as a current block that is current encoding target, or as an encoding target block.

When a prediction mode is an intra mode, the intra-prediction unit 120 may use a sample of a block that has been already encoded/decoded and is adjacent to a current block as a reference sample. The intra-prediction unit 120 may perform spatial prediction for the current block by using a reference sample, or generate prediction samples of an input block by performing spatial prediction. Herein, the intra prediction may mean intra-prediction, When a prediction mode is an inter mode, the motion prediction unit 111 may retrieve a region that best matches with an input block from a reference image when performing motion prediction, and deduce a motion vector by using the retrieved region. In this case, a search region may be used as the region. The reference image may be stored in the reference picture buffer 190. Here, when encoding/decoding for the reference image is performed, it may be stored in the reference picture buffer 190.

The motion compensation unit 112 may generate a prediction block by performing motion compensation for the current block using a motion vector. Herein, inter-prediction may mean inter-prediction or motion compensation.

When the value of the motion vector is not an integer, the motion prediction unit 111 and the motion compensation unit 112 may generate the prediction block by applying an interpolation filter to a partial region of the reference picture. In order to perform inter-picture prediction or motion compensation on a coding unit, it may be determined that which mode among a skip mode, a merge mode, an advanced motion vector prediction (AMVP) mode, and a current picture referring mode is used for motion prediction and motion compensation of a prediction unit included in the corresponding coding unit. Then, inter-picture prediction or motion compensation may be differently performed depending on the determined mode.

The subtractor 125 may generate a residual block by using a difference of an input block and a prediction block. The residual block may be called as a residual signal. The residual signal may mean a difference between an original signal and a prediction signal. In addition, the residual signal may be a signal generated by transforming or quantizing, or transforming and quantizing a difference between the original signal and the prediction signal. The residual block may be a residual signal of a block unit.

The transform unit 130 may generate a transform coefficient by performing transform of a residual block, and output the generated transform coefficient. Herein, the transform coefficient may be a coefficient value generated by performing transform of the residual block. When a transform skip mode is applied, the transform unit 130 may skip transform of the residual block.

A quantized level may be generated by applying quantization to the transform coefficient or to the residual signal. Hereinafter, the quantized level may be also called as a transform coefficient in embodiments.

The quantization unit 140 may generate a quantized level by quantizing the transform coefficient or the residual signal according to a parameter, and output the generated quantized level. Herein, the quantization unit 140 may quantize the transform coefficient by using a quantization matrix.

The entropy encoding unit 150 may generate a bitstream by performing entropy encoding according to a probability distribution on values calculated by the quantization unit 140 or on coding parameter values calculated when performing encoding, and output the generated bitstream. The entropy encoding unit 150 may perform entropy encoding of sample information of an image and information for decoding an image. For example, the information for decoding the image may include a syntax element.

When entropy encoding is applied, symbols are represented so that a smaller number of bits are assigned to a symbol having a high chance of being generated and a larger number of bits are assigned to a symbol having a low chance of being generated, and thus, the size of bit stream for symbols to be encoded may be decreased. The entropy encoding unit 150 may use an encoding method for entropy encoding such as exponential Golomb, context-adaptive variable length coding (CAVLC), context-adaptive binary arithmetic coding (CABAC), etc. For example, the entropy encoding unit 150 may perform entropy encoding by using a variable length coding/code (VLC) table. In addition, the entropy encoding unit 150 may deduce a binarization method of a target symbol and a probability model of a target symbol/bin, and perform arithmetic coding by using the deduced binarization method, and a context model.

In order to encode a transform coefficient level(quantized level), the entropy encoding unit 150 may change a two-dimensional block form coefficient into a one-dimensional vector form by using a transform coefficient scanning method.

A coding parameter may include information (flag, index, etc.) such as syntax element that is encoded in an encoder and signaled to a decoder, and information derived when performing encoding or decoding. The coding parameter may mean information required when encoding or decoding an image. For example, at least one value or a combination form of a unit/block size, a unit/block depth, unit/block partition information, unit/block shape, unit/block partition structure, whether to partition of a quad-tree form, whether to partition of a binary-tree form, a partition direction of a binary-tree form (horizontal direction or vertical direction), a partition form of a binary-tree form (symmetric partition or asymmetric partition), whether or not a current coding unit is partitioned by ternary tree partitioning, direction (horizontal or vertical direction) of the ternary tree partitioning, type (symmetric or asymmetric type) of the ternary tree partitioning, whether a current coding unit is partitioned by multi-type tree partitioning, direction (horizontal or vertical direction) of the multi-type three partitioning, type (symmetric or asymmetric type) of the multi-type tree partitioning, and a tree (binary tree or ternary tree) structure of the multi-type tree partitioning, a prediction mode (intra prediction or inter prediction), a luma intra-prediction mode/direction, a chroma intra-prediction mode/direction, intra partition information, inter partition information, a coding block partition flag, a prediction block partition flag, a transform block partition flag, a reference sample filtering method, a reference sample filter tab, a reference sample filter coefficient, a prediction block filtering method, a prediction block filter tap, a prediction block filter coefficient, a prediction block boundary filtering method, a prediction block boundary filter tab, a prediction block boundary filter coefficient, an intra-prediction mode, an inter-prediction mode, motion information, a motion vector, a motion vector difference, a reference picture index, a inter-prediction angle, an inter-prediction indicator, a prediction list utilization flag, a reference picture list, a reference picture, a motion vector predictor index, a motion vector predictor candidate, a motion vector candidate list, whether to use a merge mode, a merge index, a merge candidate, a merge candidate list, whether to use a skip mode, an interpolation filter type, an interpolation filter tab, an interpolation filter coefficient, a motion vector size, a presentation accuracy of a motion vector, a transform type, a transform size, information of whether or not a primary (first) transform is used, information of whether or not a secondary transform is used, a primary transform index, a secondary transform index, information of whether or not a residual signal is present, a coded block pattern, a coded block flag (CBF), a quantization parameter, a quantization parameter residue, a quantization matrix, whether to apply an intra loop filter, an intra loop filter coefficient, an intra loop filter tab, an intra loop filter shape/form, whether to apply a deblocking filter, a deblocking filter coefficient, a deblocking filter tab, a deblocking filter strength, a deblocking filter shape/form, whether to apply an adaptive sample offset, an adaptive sample offset value, an adaptive sample offset category, an adaptive sample offset type, whether to apply an adaptive loop filter, an adaptive loop filter coefficient, an adaptive loop filter tab, an adaptive loop filter shape/form, a binarization/inverse-binarization method, a context model determining method, a context model updating method, whether to perform a regular mode, whether to perform a bypass mode, a context bin, a bypass bin, a significant coefficient flag, a last significant coefficient flag, a coded flag for a unit of a coefficient group, a position of the last significant coefficient, a flag for whether a value of a coefficient is larger than 1, a flag for whether a value of a coefficient is larger than 2, a flag for whether a value of a coefficient is larger than 3, information on a remaining coefficient value, a sign information, a reconstructed luma sample, a reconstructed chroma sample, a residual luma sample, a residual chroma sample, a luma transform coefficient, a chroma transform coefficient, a quantized luma level, a quantized chroma level, a transform coefficient level scanning method, a size of a motion vector search area at a decoder side, a shape of a motion vector search area at a decoder side, a number of time of a motion vector search at a decoder side, information on a CTU size, information on a minimum block size, information on a maximum block size, information on a maximum block depth, information on a minimum block depth, an image displaying/outputting sequence, slice identification information, a slice type, slice partition information, tile identification information, a tile type, tile partition information, tile group identification information, a tile group type, tile group partition information, a picture type, a bit depth of an input sample, a bit depth of a reconstruction sample, a bit depth of a residual sample, a bit depth of a transform coefficient, a bit depth of a quantized level, and information on a luma signal or information on a chroma signal may be included in the coding parameter.

Herein, signaling the flag or index may mean that a corresponding flag or index is entropy encoded and included in a bitstream by an encoder, and may mean that the corresponding flag or index is entropy decoded from a bitstream by a decoder.

When the encoding apparatus 100 performs encoding through inter-prediction, an encoded current image may be used as a reference image for another image that is processed afterwards. Accordingly, the encoding apparatus 100 may reconstruct or decode the encoded current image, or store the reconstructed or decoded image as a reference image in reference picture buffer 190.

A quantized level may be dequantized in the dequantization unit 160, or may be inverse-transformed in the inverse-transform unit 170. A dequantized or inverse-transformed coefficient or both may be added with a prediction block by the adder 175. By adding the dequantized or inverse-transformed coefficient or both with the prediction block, a reconstructed block may be generated. Herein, the dequantized or inverse-transformed coefficient or both may mean a coefficient on which at least one of dequantization and inverse-transform is performed, and may mean a reconstructed residual block.

A reconstructed block may pass through the filter unit 180. The filter unit 180 may apply at least one of a deblocking filter, a sample adaptive offset (SAO), and an adaptive loop filter (ALF) to a reconstructed sample, a reconstructed block or a reconstructed image. The filter unit 180 may be called as an in-loop filter.

The deblocking filter may remove block distortion generated in boundaries between blocks. In order to determine whether or not to apply a deblocking filter, whether or not to apply a deblocking filter to a current block may be determined based samples included in several rows or columns which are included in the block. When a deblocking filter is applied to a block, another filter may be applied according to a required deblocking filtering strength.

In order to compensate an encoding error, a proper offset value may be added to a sample value by using a sample adaptive offset. The sample adaptive offset may correct an offset of a deblocked image from an original image by a sample unit. A method of partitioning samples of an image into a predetermined number of regions, determining a region to which an offset is applied, and applying the offset to the determined region, or a method of applying an offset in consideration of edge information on each sample may be used.

The adaptive loop filter may perform filtering based on a comparison result of the filtered reconstructed image and the original image. Samples included in an image may be partitioned into predetermined groups, a filter to be applied to each group may be determined, and differential filtering may be performed for each group. Information of whether or not to apply the ALF may be signaled by coding units (CUs), and a form and coefficient of the ALF to be applied to each block may vary.

The reconstructed block or the reconstructed image having passed through the filter unit 180 may be stored in the reference picture buffer 190. A reconstructed block processed by the filter unit 180 may be a part of a reference image. That is, a reference image is a reconstructed image composed of reconstructed blocks processed by the filter unit 180. The stored reference image may be used later in inter prediction or motion compensation.

Figure 2:
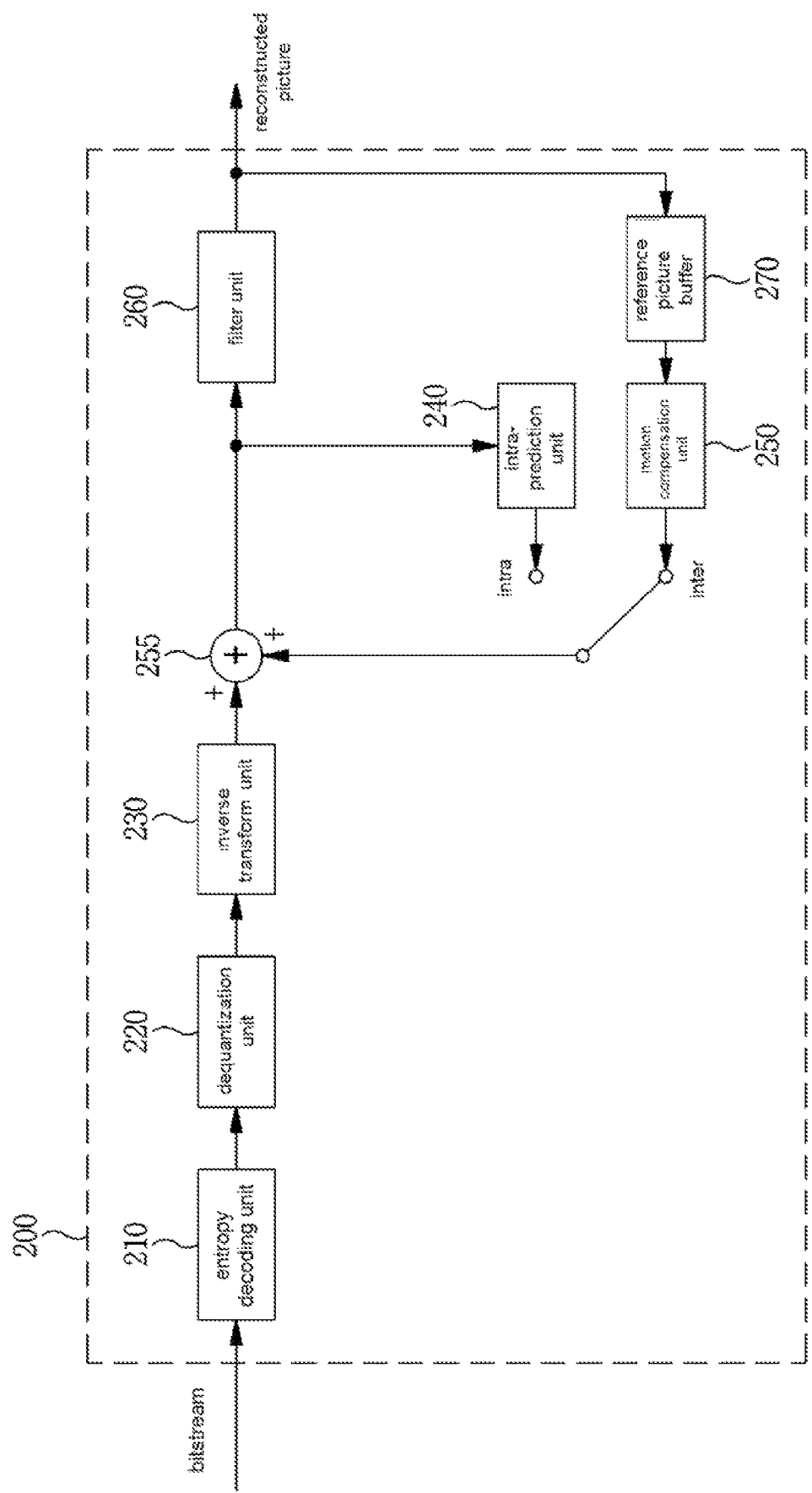
FIG. 2 is a block diagram showing a configuration of a decoding apparatus according to an embodiment and to which the present invention is applied.

FIG. 2 is a block diagram showing a configuration of a decoding apparatus according to an embodiment and to which the present invention is applied.

A decoding apparatus 200 may a decoder, a video decoding apparatus, or an image decoding apparatus.

Referring to FIG. 2, the decoding apparatus 200 may include an entropy decoding unit 210, a dequantization unit 220, an inverse-transform unit 230, an intra-prediction unit 240, a motion compensation unit 250, an adder 255, a filter unit 260, and a reference picture buffer 270.

The decoding apparatus 200 may receive a bitstream output from the encoding apparatus 100. The decoding apparatus 200 may receive a bitstream stored in a computer readable recording medium, or may receive a bitstream that is streamed through a wired/wireless transmission medium. The decoding apparatus 200 may decode the bitstream by using an intra mode or an inter mode. In addition, the decoding apparatus 200 may generate a reconstructed image generated through decoding or a decoded image, and output the reconstructed image or decoded image.

When a prediction mode used when decoding is an intra mode, a switch may be switched to an intra. Alternatively, when a prediction mode used when decoding is an inter mode, a switch may be switched to an inter mode.

The decoding apparatus 200 may obtain a reconstructed residual block by decoding the input bitstream, and generate a prediction block. When the reconstructed residual block and the prediction block are obtained, the decoding apparatus 200 may generate a reconstructed block that becomes a decoding target by adding the reconstructed residual block with the prediction block. The decoding target block may be called a current block.

The entropy decoding unit 210 may generate symbols by entropy decoding the bitstream according to a probability distribution. The generated symbols may include a symbol of a quantized level form. Herein, an entropy decoding method may be an inverse-process of the entropy encoding method described above.

In order to decode a transform coefficient level (quantized level), the entropy decoding unit 210 may change a one-directional vector form coefficient into a two-dimensional block form by using a transform coefficient scanning method.

A quantized level may be dequantized in the dequantization unit 220, or inverse-transformed in the inverse-transform unit 230. The quantized level may be a result of dequantizing or inverse-transforming or both, and may be generated as a reconstructed residual block. Herein, the dequantization unit 220 may apply a quantization matrix to the quantized level.

When an intra mode is used, the intra-prediction unit 240 may generate a prediction block by performing, for the current block, spatial prediction that uses a sample value of a block adjacent to a decoding target block and which has been already decoded.

When an inter mode is used, the motion compensation unit 250 may generate a prediction block by performing, for the current block, motion compensation that uses a motion vector and a reference image stored in the reference picture buffer 270.

The adder 255 may generate a reconstructed block by adding the reconstructed residual block with the prediction block. The filter unit 260 may apply at least one of a deblocking filter, a sample adaptive offset, and an adaptive loop filter to the reconstructed block or reconstructed image. The filter unit 260 may output the reconstructed image. The reconstructed block or reconstructed image may be stored in the reference picture buffer 270 and used when performing inter-prediction. A reconstructed block processed by the filter unit 260 may be a part of a reference image. That is, a reference image is a reconstructed image composed of reconstructed blocks processed by the filter unit 260. The stored reference image may be used later in inter prediction or motion compensation.

Figure 3:
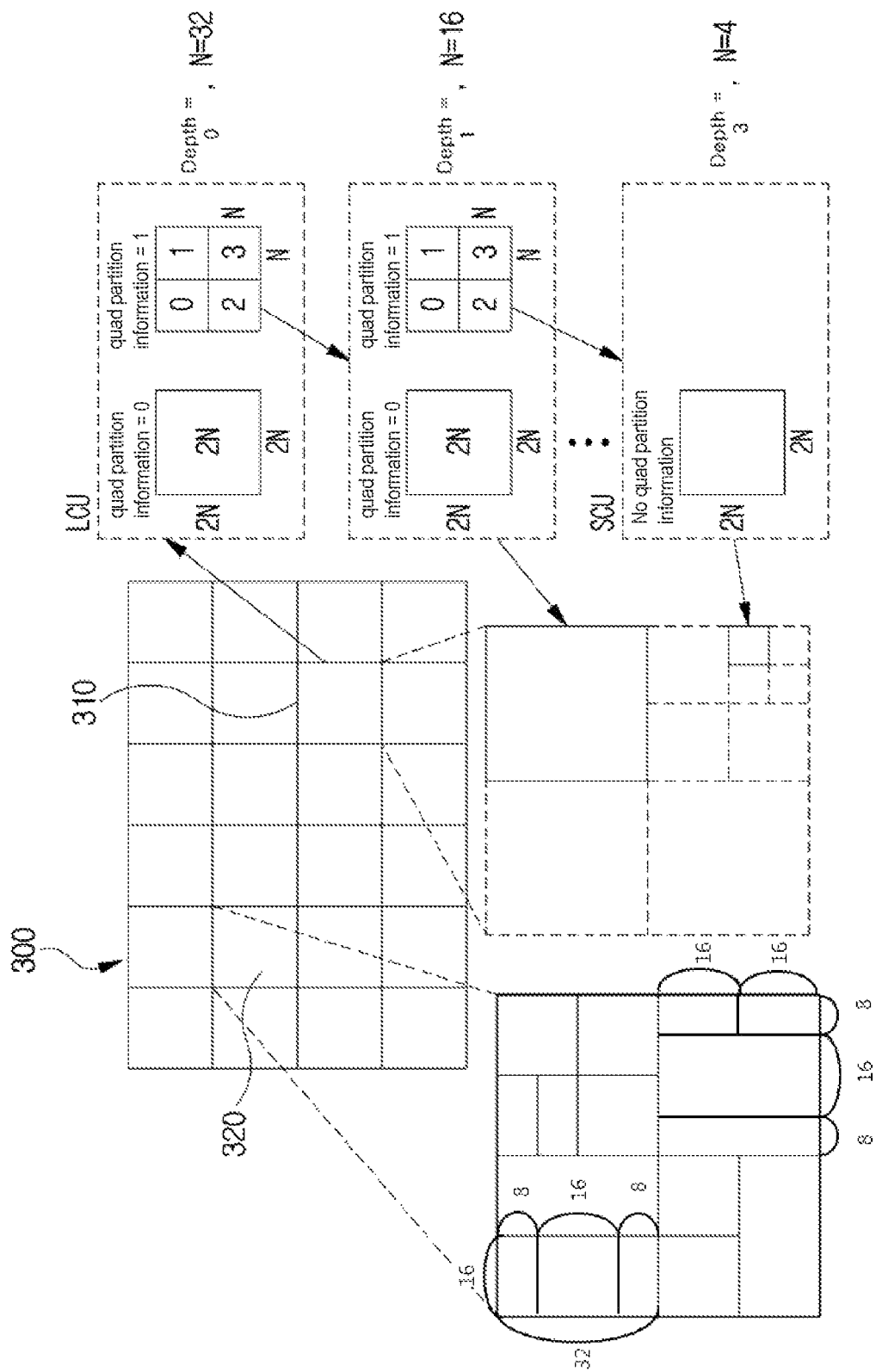
FIG. 3 is a view schematically showing a partition structure of an image when encoding and decoding the image.

FIG. 3 is a view schematically showing a partition structure of an image when encoding and decoding the image.

FIG. 3 schematically shows an example of partitioning a single unit into a plurality of lower units.

In order to efficiently partition an image, when encoding and decoding, a coding unit (CU) may be used. The coding unit may be used as a basic unit when encoding/decoding the image. In addition, the coding unit may be used as a unit for distinguishing an intra prediction mode and an inter prediction mode when encoding/decoding the image. The coding unit may be a basic unit used for prediction, transform, quantization, inverse-transform, dequantization, or an encoding/decoding process of a transform coefficient.

Referring to FIG. 3, an image 300 is sequentially partitioned in a largest coding unit (LCU), and a LCU unit is determined as a partition structure. Herein, the LCU may be used in the same meaning as a coding tree unit (CTU). A unit partitioning may mean partitioning a block associated with to the unit. In block partition information, information of a unit depth may be included. Depth information may represent a number of times or a degree or both in which a unit is partitioned. A single unit may be partitioned into a plurality of lower level units hierarchically associated with depth information based on a tree structure. In other words, a unit and a lower level unit generated by partitioning the unit may correspond to a node and a child node of the node, respectively. Each of partitioned lower unit may have depth information. Depth information may be information representing a size of a CU, and may be stored in each CU. Unit depth represents times and/or degrees related to partitioning a unit. Therefore, partitioning information of a lower-level unit may comprise information on a size of the lower-level unit.

A partition structure may mean a distribution of a coding unit (CU) within an LCU 310. Such a distribution may be determined according to whether or not to partition a single CU into a plurality (positive integer equal to or greater than 2 including 2, 4, 8, 16, etc.) of CUs. A horizontal size and a vertical size of the CU generated by partitioning may respectively be half of a horizontal size and a vertical size of the CU before partitioning, or may respectively have sizes smaller than a horizontal size and a vertical size before partitioning according to a number of times of partitioning. The CU may be recursively partitioned into a plurality of CUs. By the recursive partitioning, at least one among a height and a width of a CU after partitioning may decrease comparing with at least one among a height and a width of a CU before partitioning. Partitioning of the CU may be recursively performed until to a predefined depth or predefined size. For example, a depth of an LCU may be 0, and a depth of a smallest coding unit (SCU) may be a predefined maximum depth. Herein, the LCU may be a coding unit having a maximum coding unit size, and the SCU may be a coding unit having a minimum coding unit size as described above. Partitioning is started from the LCU 310, a CU depth increases by 1 as a horizontal size or a vertical size or both of the CU decreases by partitioning. For example, for each depth, a CU which is not partitioned may have a size of 2N×2N. Also, in case of a CU which is partitioned, a CU with a size of 2N×2N may be partitioned into four CUs with a size of N×N. A size of N may decrease to half as a depth increase by 1.

In addition, information whether or not the CU is partitioned may be represented by using partition information of the CU. The partition information may be 1-bit information. All CUs, except for a SCU, may include partition information. For example, when a value of partition information is a first value, the CU may not be partitioned, when a value of partition information is a second value, the CU may be partitioned Referring to FIG. 3, an LCU having a depth 0 may be a 64×64 block. 0 may be a minimum depth. A SCU having a depth 3 may be an 8×8 block. 3 may be a maximum depth. A CU of a 32×32 block and a 16×16 block may be respectively represented as a depth 1 and a depth 2.

For example, when a single coding unit is partitioned into four coding units, a horizontal size and a vertical size of the four partitioned coding units may be a half size of a horizontal and vertical size of the CU before being partitioned. In one embodiment, when a coding unit having a 32×32 size is partitioned into four coding units, each of the four partitioned coding units may have a 16×16 size. When a single coding unit is partitioned into four coding units, it may be called that the coding unit may be partitioned into a quad-tree form.

For example, when one coding unit is partitioned into two sub-coding units, the horizontal or vertical size (width or height) of each of the two sub-coding units may be half the horizontal or vertical size of the original coding unit. For example, when a coding unit having a size of 32×32 is vertically partitioned into two sub-coding units, each of the two sub-coding units may have a size of 16×32. For example, when a coding unit having a size of 8×32 is horizontally partitioned into two sub-coding units, each of the two sub-coding units may have a size of 8×16. When one coding unit is partitioned into two sub-coding units, it can be said that the coding unit is binary-partitioned or is partitioned by a binary tree partition structure.

For example, when one coding unit is partitioned into three sub-coding units, the horizontal or vertical size of the coding unit can be partitioned with a ratio of 1:2:1, thereby producing three sub-coding units whose horizontal or vertical sizes are in a ratio of 1:2:1. For example, when a coding unit having a size of 16×32 is horizontally partitioned into three sub-coding units, the three sub-coding units may have sizes of 16×8, 16×16, and 16×8 respectively, in the order from the uppermost to the lowermost sub-coding unit. For example, when a coding unit having a size of 32×32 is vertically split into three sub-coding units, the three sub-coding units may have sizes of 8×32, 16×32, and 8×32, respectively in the order from the left to the right sub-coding unit. When one coding unit is partitioned into three sub-coding units, it can be said that the coding unit is ternary-partitioned or partitioned by a ternary tree partition structure.

In FIG. 3, a coding tree unit (CTU) 320 is an example of a CTU to which a quad tree partition structure, a binary tree partition structure, and a ternary tree partition structure are all applied.

As described above, in order to partition the CTU, at least one of a quad tree partition structure, a binary tree partition structure, and a ternary tree partition structure may be applied. Various tree partition structures may be sequentially applied to the CTU, according to a predetermined priority order. For example, the quad tree partition structure may be preferentially applied to the CTU. A coding unit that cannot be partitioned any longer using a quad tree partition structure may correspond to a leaf node of a quad tree. A coding unit corresponding to a leaf node of a quad tree may serve as a root node of a binary and/or ternary tree partition structure. That is, a coding unit corresponding to a leaf node of a quad tree may be further partitioned by a binary tree partition structure or a ternary tree partition structure, or may not be further partitioned. Therefore, by preventing a coding unit that results from binary tree partitioning or ternary tree partitioning of a coding unit corresponding to a leaf node of a quad tree from undergoing further quad tree partitioning, block partitioning and/or signaling of partition information can be effectively performed.

The fact that a coding unit corresponding to a node of a quad tree is partitioned may be signaled using quad partition information. The quad partition information having a first value (e.g., "1") may indicate that a current coding unit is partitioned by the quad tree partition structure. The quad partition information having a second value (e.g., "0") may indicate that a current coding unit is not partitioned by the quad tree partition structure. The quad partition information may be a flag having a predetermined length (e.g., one bit).

There may not be a priority between the binary tree partitioning and the ternary tree partitioning. That is, a coding unit corresponding to a leaf node of a quad tree may further undergo arbitrary partitioning among the binary tree partitioning and the ternary tree partitioning. In addition, a coding unit generated through the binary tree partitioning or the ternary tree partitioning may undergo a further binary tree partitioning or a further ternary tree partitioning, or may not be further partitioned.

A tree structure in which there is no priority among the binary tree partitioning and the ternary tree partitioning is referred to as a multi-type tree structure. A coding unit corresponding to a leaf node of a quad tree may serve as a root node of a multi-type tree. Whether to partition a coding unit which corresponds to a node of a multi-type tree may be signaled using at least one of multi-type tree partition indication information, partition direction information, and partition tree information. For partitioning of a coding unit corresponding to a node of a multi-type tree, the multi-type tree partition indication information, the partition direction, and the partition tree information may be sequentially signaled.

The multi-type tree partition indication information having a first value (e.g., "1") may indicate that a current coding unit is to undergo a multi-type tree partitioning. The multi-type tree partition indication information having a second value (e.g., "0") may indicate that a current coding unit is not to undergo a multi-type tree partitioning.

When a coding unit corresponding to a node of a multi-type tree is further partitioned by a multi-type tree partition structure, the coding unit may include partition direction information. The partition direction information may indicate in which direction a current coding unit is to be partitioned for the multi-type tree partitioning. The partition direction information having a first value (e.g., "1") may indicate that a current coding unit is to be vertically partitioned. The partition direction information having a second value (e.g., "0") may indicate that a current coding unit is to be horizontally partitioned.

When a coding unit corresponding to a node of a multi-type tree is further partitioned by a multi-type tree partition structure, the current coding unit may include partition tree information. The partition tree information may indicate a tree partition structure which is to be used for partitioning of a node of a multi-type tree. The partition tree information having a first value (e.g., "1") may indicate that a current coding unit is to be partitioned by a binary tree partition structure. The partition tree information having a second value (e.g., "0") may indicate that a current coding unit is to be partitioned by a ternary tree partition structure.

The partition indication information, the partition tree information, and the partition direction information may each be a flag having a predetermined length (e.g., one bit).

At least any one of the quadtree partition indication information, the multi-type tree partition indication information, the partition direction information, and the partition tree information may be entropy encoded/decoded. For the entropy-encoding/decoding of those types of information, information on a neighboring coding unit adjacent to the current coding unit may be used. For example, there is a high probability that the partition type (the partitioned or non-partitioned, the partition tree, and/or the partition direction) of a left neighboring coding unit and/or an upper neighboring coding unit of a current coding unit is similar to that of the current coding unit. Therefore, context information for entropy encoding/decoding of the information on the current coding unit may be derived from the information on the neighboring coding units. The information on the neighboring coding units may include at least any one of quad partition information, multi-type tree partition indication information, partition direction information, and partition tree information.

As another example, among binary tree partitioning and ternary tree partitioning, binary tree partitioning may be preferentially performed. That is, a current coding unit may primarily undergo binary tree partitioning, and then a coding unit corresponding to a leaf node of a binary tree may be set as a root node for ternary tree partitioning. In this case, neither quad tree partitioning nor binary tree partitioning may not be performed on the coding unit corresponding to a node of a ternary tree.

A coding unit that cannot be partitioned by a quad tree partition structure, a binary tree partition structure, and/or a ternary tree partition structure becomes a basic unit for coding, prediction and/or transformation. That is, the coding unit cannot be further partitioned for prediction and/or transformation. Therefore, the partition structure information and the partition information used for partitioning a coding unit into prediction units and/or transformation units may not be present in a bit stream.

However, when the size of a coding unit (i.e., a basic unit for partitioning) is larger than the size of a maximum transformation block, the coding unit may be recursively partitioned until the size of the coding unit is reduced to be equal to or smaller than the size of the maximum transformation block. For example, when the size of a coding unit is 64×64 and when the size of a maximum transformation block is 32×32, the coding unit may be partitioned into four 32×32 blocks for transformation. For example, when the size of a coding unit is 32×64 and the size of a maximum transformation block is 32×32, the coding unit may be partitioned into two 32×32 blocks for the transformation. In this case, the partitioning of the coding unit for transformation is not signaled separately, and may be determined through comparison between the horizontal or vertical size of the coding unit and the horizontal or vertical size of the maximum transformation block. For example, when the horizontal size (width) of the coding unit is larger than the horizontal size (width) of the maximum transformation block, the coding unit may be vertically bisected. For example, when the vertical size (height) of the coding unit is larger than the vertical size (height) of the maximum transformation block, the coding unit may be horizontally bisected.

Information of the maximum and/or minimum size of the coding unit and information of the maximum and/or minimum size of the transformation block may be signaled or determined at an upper level of the coding unit. The upper level may be, for example, a sequence level, a picture level, a slice level, a tile group level, a tile level, or the like. For example, the minimum size of the coding unit may be determined to be 4×4. For example, the maximum size of the transformation block may be determined to be 64×64. For example, the minimum size of the transformation block may be determined to be 4×4.

Information of the minimum size (quad tree minimum size) of a coding unit corresponding to a leaf node of a quad tree and/or information of the maximum depth (the maximum tree depth of a multi-type tree) from a root node to a leaf node of the multi-type tree may be signaled or determined at an upper level of the coding unit. For example, the upper level may be a sequence level, a picture level, a slice level, a tile group level, a tile level, or the like. Information of the minimum size of a quad tree and/or information of the maximum depth of a multi-type tree may be signaled or determined for each of an intra-picture slice and an inter-picture slice.

Difference information between the size of a CTU and the maximum size of a transformation block may be signaled or determined at an upper level of the coding unit. For example, the upper level may be a sequence level, a picture level, a slice level, a tile group level, a tile level, or the like. Information of the maximum size of the coding units corresponding to the respective nodes of a binary tree (hereinafter, referred to as a maximum size of a binary tree) may be determined based on the size of the coding tree unit and the difference information. The maximum size of the coding units corresponding to the respective nodes of a ternary tree (hereinafter, referred to as a maximum size of a ternary tree) may vary depending on the type of slice. For example, for an intra-picture slice, the maximum size of a ternary tree may be 32×32. For example, for an inter-picture slice, the maximum size of a ternary tree may be 128×128. For example, the minimum size of the coding units corresponding to the respective nodes of a binary tree (hereinafter, referred to as a minimum size of a binary tree) and/or the minimum size of the coding units corresponding to the respective nodes of a ternary tree (hereinafter, referred to as a minimum size of a ternary tree) may be set as the minimum size of a coding block.

As another example, the maximum size of a binary tree and/or the maximum size of a ternary tree may be signaled or determined at the slice level. Alternatively, the minimum size of the binary tree and/or the minimum size of the ternary tree may be signaled or determined at the slice level.

Depending on size and depth information of the above-described various blocks, quad partition information, multi-type tree partition indication information, partition tree information and/or partition direction information may be included or may not be included in a bit stream.

For example, when the size of the coding unit is not larger than the minimum size of a quad tree, the coding unit does not contain quad partition information. The, the quad partition information may be deduced as a second value.

For example, when the sizes (horizontal and vertical sizes) of a coding unit corresponding to a node of a multi-type tree are larger than the maximum sizes (horizontal and vertical sizes) of a binary tree and/or the maximum sizes (horizontal and vertical sizes) of a ternary tree, the coding unit may not be binary-partitioned or ternary-partitioned. Accordingly, the multi-type tree partition indication information may not be signaled but may be deduced as a second value.

Alternatively, when the sizes (horizontal and vertical sizes) of a coding unit corresponding to a node of a multi-type tree are the same as the maximum sizes (horizontal and vertical sizes) of a binary tree and/or are two times as large as the maximum sizes (horizontal and vertical sizes) of a ternary tree, the coding unit may not be further binary-partitioned or ternary-partitioned. Accordingly, the multi-type tree partition indication information may not be signaled but be derived from a second value. This is because when a coding unit is partitioned by a binary tree partition structure and/or a ternary tree partition structure, a coding unit smaller than the minimum size of a binary tree and/or the minimum size of a ternary tree is generated.

Alternatively, the binary tree partitioning or the ternary tree partitioning may be limited on the basis of the size of a virtual pipeline data unit (hereinafter, a pipeline buffer size). For example, when the coding unit is divided into sub-coding units which do not fit the pipeline buffer size by the binary tree partitioning or the ternary tree partitioning, the corresponding binary tree partitioning or ternary tree partitioning may be limited. The pipeline buffer size may be the size of the maximum transform block (e.g., 64×64). For example, when the pipeline buffer size is 64×64, the division below may be limited.

N×M (N and/or M is 128) Ternary tree partitioning for coding units

128×N (N<=64) Binary tree partitioning in horizontal direction for coding units

N×128 (N<=64) Binary tree partitioning in vertical direction for coding units

Alternatively, when the depth of a coding unit corresponding to a node of a multi-type tree is equal to the maximum depth of the multi-type tree, the coding unit may not be further binary-partitioned and/or ternary-partitioned. Accordingly, the multi-type tree partition indication information may not be signaled but may be deduced as a second value.

Alternatively, only when at least one of vertical direction binary tree partitioning, horizontal direction binary tree partitioning, vertical direction ternary tree partitioning, and horizontal direction ternary tree partitioning is possible for a coding unit corresponding to a node of a multi-type tree, the multi-type tree partition indication information may be signaled. Otherwise, the coding unit may not be binary-partitioned and/or ternary-partitioned. Accordingly, the multi-type tree partition indication information may not be signaled but may be deduced as a second value.

Alternatively, only when both of the vertical direction binary tree partitioning and the horizontal direction binary tree partitioning or both of the vertical direction ternary tree partitioning and the horizontal direction ternary tree partitioning are possible for a coding unit corresponding to a node of a multi-type tree, the partition direction information may be signaled. Otherwise, the partition direction information may not be signaled but may be derived from a value indicating possible partitioning directions.

Alternatively, only when both of the vertical direction binary tree partitioning and the vertical direction ternary tree partitioning or both of the horizontal direction binary tree partitioning and the horizontal direction ternary tree partitioning are possible for a coding tree corresponding to a node of a multi-type tree, the partition tree information may be signaled. Otherwise, the partition tree information may not be signaled but be deduced as a value indicating a possible partitioning tree structure.

Figure 4:
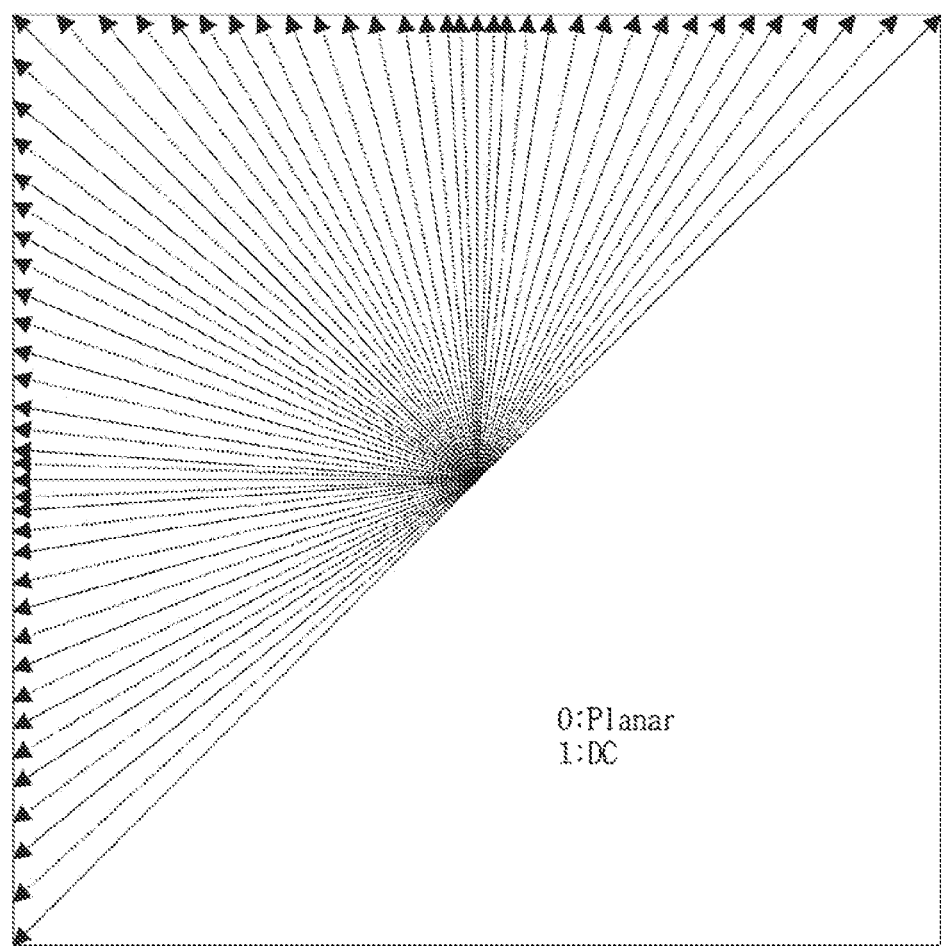
FIG. 4 is a view showing an intra-prediction process.

FIG. 4 is a view showing an intra-prediction process.

Arrows from center to outside in FIG. 4 may represent prediction directions of intra prediction modes.

Intra encoding and/or decoding may be performed by using a reference sample of a neighbor block of the current block. A neighbor block may be a reconstructed neighbor block. For example, intra encoding and/or decoding may be performed by using a coding parameter or a value of a reference sample included in a reconstructed neighbor block.

A prediction block may mean a block generated by performing intra prediction. A prediction block may correspond to at least one among CU, PU and TU. A unit of a prediction block may have a size of one among CU, PU and TU. A prediction block may be a square block having a size of 2×2, 4×4, 16×16, 32×32 or 64×64 etc. or may be a rectangular block having a size of 2×8, 4×8, 2×16, 4×16 and 8×16 etc.

Intra prediction may be performed according to intra prediction mode for the current block. The number of intra prediction modes which the current block may have may be a fixed value and may be a value determined differently according to an attribute of a prediction block. For example, an attribute of a prediction block may comprise a size of a prediction block and a shape of a prediction block, etc.

The number of intra-prediction modes may be fixed to N regardless of a block size. Or, the number of intra prediction modes may be 3, 5, 9, 17, 34, 35, 36, 65, or 67 etc. Alternatively, the number of intra-prediction modes may vary according to a block size or a color component type or both. For example, the number of intra prediction modes may vary according to whether the color component is a luma signal or a chroma signal. For example, as a block size becomes large, a number of intra-prediction modes may increase. Alternatively, a number of intra-prediction modes of a luma component block may be larger than a number of intra-prediction modes of a chroma component block.

An intra-prediction mode may be a non-angular mode or an angular mode. The non-angular mode may be a DC mode or a planar mode, and the angular mode may be a prediction mode having a specific direction or angle. The intra-prediction mode may be expressed by at least one of a mode number, a mode value, a mode numeral, a mode angle, and mode direction. A number of intra-prediction modes may be M, which is larger than 1, including the non-angular and the angular mode. In order to intra-predict a current block, a step of determining whether or not samples included in a reconstructed neighbor block may be used as reference samples of the current block may be performed. When a sample that is not usable as a reference sample of the current block is present, a value obtained by duplicating or performing interpolation on at least one sample value among samples included in the reconstructed neighbor block or both may be used to replace with a non-usable sample value of a sample, thus the replaced sample value is used as a reference sample of the current block.

Figure 7:
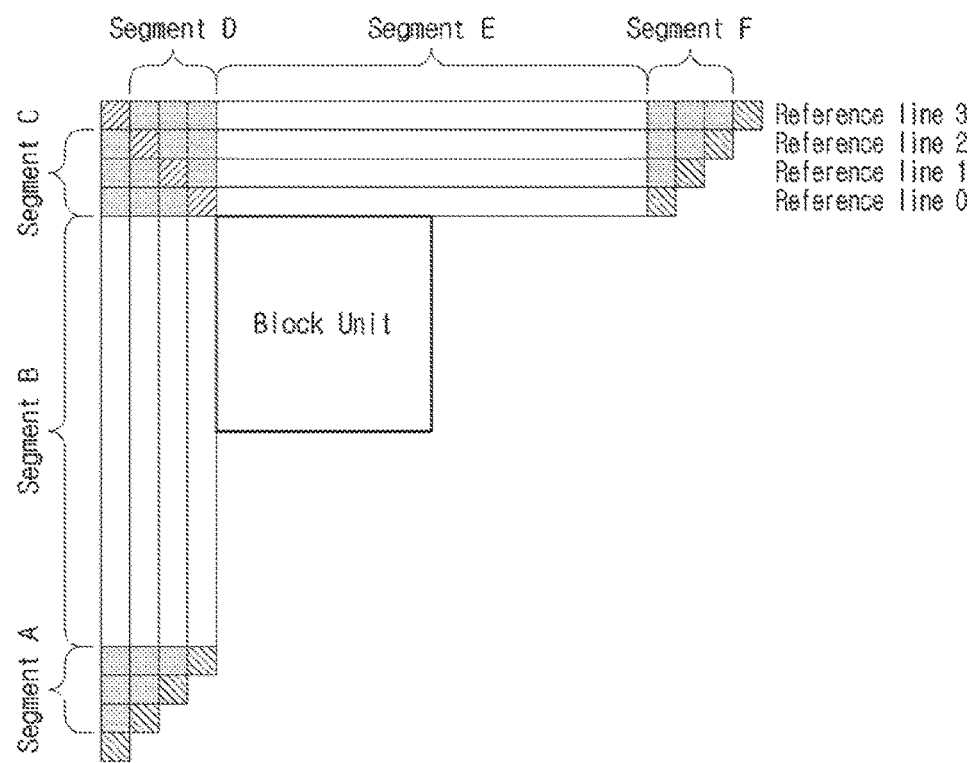
FIG. 7 is a diagram illustrating reference samples capable of being used for intra prediction.

FIG. 7 is a diagram illustrating reference samples capable of being used for intra prediction.

As shown in FIG. 7, at least one of the reference sample line 0 to the reference sample line 3 may be used for intra prediction of the current block. In FIG. 7, the samples of a segment A and a segment F may be padded with the samples closest to a segment B and a segment E, respectively, instead of retrieving from the reconstructed neighboring block. Index information indicating the reference sample line to be used for intra prediction of the current block may be signaled. For example, in FIG. 7, reference sample line indicators 0, 1, and 2 may be signaled as index information indicating reference sample lines 0, 1 and 2. When the upper boundary of the current block is the boundary of the CTU, only the reference sample line 0 may be available. Therefore, in this case, the index information may not be signaled. When a reference sample line other than the reference sample line 0 is used, filtering for a prediction block, which will be described later, may not be performed.

When intra-predicting, a filter may be applied to at least one of a reference sample and a prediction sample based on an intra-prediction mode and a current block size.

In case of a planar mode, when generating a prediction block of a current block, according to a position of a prediction target sample within a prediction block, a sample value of the prediction target sample may be generated by using a weighted sum of an upper and left side reference sample of a current block, and a right upper side and left lower side reference sample of the current block. In addition, in case of a DC mode, when generating a prediction block of a current block, an average value of upper side and left side reference samples of the current block may be used. In addition, in case of an angular mode, a prediction block may be generated by using an upper side, a left side, a right upper side, and/or a left lower side reference sample of the current block. In order to generate a prediction sample value, interpolation of a real number unit may be performed.

In the case of intra prediction between color components, a prediction block for the current block of the second color component may be generated on the basis of the corresponding reconstructed block of the first color component. For example, the first color component may be a luma component, and the second color component may be a chroma component. For intra prediction between color components, the parameters of the linear model between the first color component and the second color component may be derived on the basis of the template. The template may include upper and/or left neighboring samples of the current block and upper and/or left neighboring samples of the reconstructed block of the first color component corresponding thereto. For example, the parameters of the linear model may be derived using a sample value of a first color component having a maximum value among samples in a template and a sample value of a second color component corresponding thereto, and a sample value of a first color component having a minimum value among samples in the template and a sample value of a second color component corresponding thereto. When the parameters of the linear model are derived, a corresponding reconstructed block may be applied to the linear model to generate a prediction block for the current block. According to a video format, sub-sampling may be performed on the neighboring samples of the reconstructed block of the first color component and the corresponding reconstructed block. For example, when one sample of the second color component corresponds to four samples of the first color component, four samples of the first color component may be sub-sampled to compute one corresponding sample. In this case, the parameter derivation of the linear model and intra prediction between color components may be performed on the basis of the corresponding sub-sampled samples. Whether or not to perform intra prediction between color components and/or the range of the template may be signaled as the intra prediction mode.

The current block may be partitioned into two or four sub-blocks in the horizontal or vertical direction. The partitioned sub-blocks may be sequentially reconstructed. That is, the intra prediction may be performed on the sub-block to generate the sub-prediction block. In addition, dequantization and/or inverse transform may be performed on the sub-blocks to generate sub-residual blocks. A reconstructed sub-block may be generated by adding the sub-prediction block to the sub-residual block. The reconstructed sub-block may be used as a reference sample for intra prediction of the sub-sub-blocks. The sub-block may be a block including a predetermined number (for example, 16) or more samples. Accordingly, for example, when the current block is an 8×4 block or a 4×8 block, the current block may be partitioned into two sub-blocks. Also, when the current block is a 4×4 block, the current block may not be partitioned into sub-blocks. When the current block has other sizes, the current block may be partitioned into four sub-blocks. Information on whether or not to perform the intra prediction based on the sub-blocks and/or the partitioning direction (horizontal or vertical) may be signaled. The intra prediction based on the sub-blocks may be limited to be performed only when reference sample line 0 is used. When the intra prediction based on the sub-block is performed, filtering for the prediction block, which will be described later, may not be performed.

The final prediction block may be generated by performing filtering on the prediction block that is intra-predicted. The filtering may be performed by applying predetermined weights to the filtering target sample, the left reference sample, the upper reference sample, and/or the upper left reference sample. The weight and/or the reference sample (range, position, etc.) used for the filtering may be determined on the basis of at least one of a block size, an intra prediction mode, and a position of the filtering target sample in the prediction block. The filtering may be performed only in the case of a predetermined intra prediction mode (e.g., DC, planar, vertical, horizontal, diagonal, and/or adjacent diagonal modes). The adjacent diagonal mode may be a mode in which k is added to or subtracted from the diagonal mode. For example, k may be a positive integer of 8 or less.

An intra-prediction mode of a current block may be entropy encoded/decoded by predicting an intra-prediction mode of a block present adjacent to the current block. When intra-prediction modes of the current block and the neighbor block are identical, information that the intra-prediction modes of the current block and the neighbor block are identical may be signaled by using predetermined flag information. In addition, indicator information of an intra-prediction mode that is identical to the intra-prediction mode of the current block among intra-prediction modes of a plurality of neighbor blocks may be signaled. When intra-prediction modes of the current block and the neighbor block are different, intra-prediction mode information of the current block may be entropy encoded/decoded by performing entropy encoding/decoding based on the intra-prediction mode of the neighbor block.

Figure 5:
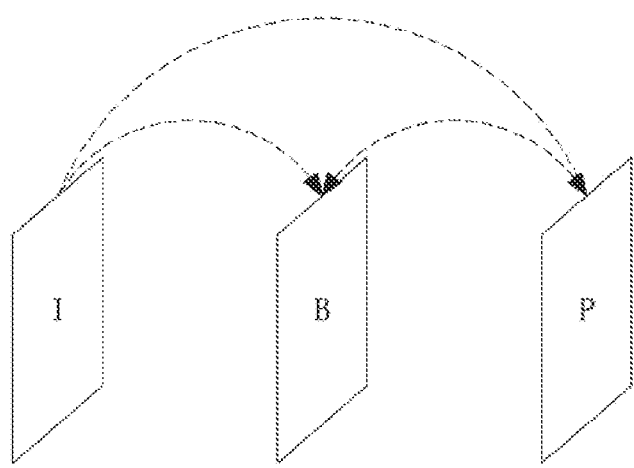
FIG. 5 is a diagram illustrating an embodiment of an inter-picture prediction process.

FIG. 5 is a diagram illustrating an embodiment of an inter-picture prediction process.

In FIG. 5, a rectangle may represent a picture. In FIG. 5, an arrow represents a prediction direction. Pictures may be categorized into intra pictures (I pictures), predictive pictures (P pictures), and Bi-predictive pictures (B pictures) according to the encoding type thereof.

The I picture may be encoded through intra-prediction without requiring inter-picture prediction. The P picture may be encoded through inter-picture prediction by using a reference picture that is present in one direction (i.e., forward direction or backward direction) with respect to a current block. The B picture may be encoded through inter-picture prediction by using reference pictures that are preset in two directions (i.e., forward direction and backward direction) with respect to a current block. When the inter-picture prediction is used, the encoder may perform inter-picture prediction or motion compensation and the decoder may perform the corresponding motion compensation.

Hereinbelow, an embodiment of the inter-picture prediction will be described in detail.

The inter-picture prediction or motion compensation may be performed using a reference picture and motion information.

Motion information of a current block may be derived during inter-picture prediction by each of the encoding apparatus 100 and the decoding apparatus 200. The motion information of the current block may be derived by using motion information of a reconstructed neighboring block, motion information of a collocated block (also referred to as a col block or a co-located block), and/or a block adjacent to the co-located block. The co-located block may mean a block that is located spatially at the same position as the current block, within a previously reconstructed collocated picture (also referred to as a col picture or a co-located picture). The co-located picture may be one picture among one or more reference pictures included in a reference picture list.

The derivation method of the motion information may be different depending on the prediction mode of the current block. For example, a prediction mode applied for inter prediction includes an AMVP mode, a merge mode, a skip mode, a merge mode with a motion vector difference, a subblock merge mode, a geometric partitioning mode, an combined inter intra prediction mode, affine mode, and the like. Herein, the merge mode may be referred to as a motion merge mode.

For example, when the AMVP is used as the prediction mode, at least one of motion vectors of the reconstructed neighboring blocks, motion vectors of the co-located blocks, motion vectors of blocks adjacent to the co-located blocks, and a (0, 0) motion vector may be determined as motion vector candidates for the current block, and a motion vector candidate list is generated by using the emotion vector candidates. The motion vector candidate of the current block can be derived by using the generated motion vector candidate list. The motion information of the current block may be determined based on the derived motion vector candidate. The motion vectors of the collocated blocks or the motion vectors of the blocks adjacent to the collocated blocks may be referred to as temporal motion vector candidates, and the motion vectors of the reconstructed neighboring blocks may be referred to as spatial motion vector candidates.

The encoding apparatus 100 may calculate a motion vector difference (MVD) between the motion vector of the current block and the motion vector candidate and may perform entropy encoding on the motion vector difference (MVD). In addition, the encoding apparatus 100 may perform entropy encoding on a motion vector candidate index and generate a bitstream. The motion vector candidate index may indicate an optimum motion vector candidate among the motion vector candidates included in the motion vector candidate list. The decoding apparatus may perform entropy decoding on the motion vector candidate index included in the bitstream and may select a motion vector candidate of a decoding target block from among the motion vector candidates included in the motion vector candidate list by using the entropy-decoded motion vector candidate index. In addition, the decoding apparatus 200 may add the entropy-decoded MVD and the motion vector candidate extracted through the entropy decoding, thereby deriving the motion vector of the decoding target block.

Meanwhile, the coding apparatus 100 may perform entropy-coding on resolution information of the calculated MVD. The decoding apparatus 200 may adjust the resolution of the entropy-decoded MVD using the MVD resolution information.

Meanwhile, the coding apparatus 100 calculates a motion vector difference (MVD) between a motion vector and a motion vector candidate in the current block on the basis of an affine model, and performs entropy-coding on the MVD. The decoding apparatus 200 derives a motion vector on a per sub-block basis by deriving an affine control motion vector of a decoding target block through the sum of the entropy-decoded MVD and an affine control motion vector candidate.

The bitstream may include a reference picture index indicating a reference picture. The reference picture index may be entropy-encoded by the encoding apparatus 100 and then signaled as a bitstream to the decoding apparatus 200. The decoding apparatus 200 may generate a prediction block of the decoding target block based on the derived motion vector and the reference picture index information.

Another example of the method of deriving the motion information of the current may be the merge mode. The merge mode may mean a method of merging motion of a plurality of blocks. The merge mode may mean a mode of deriving the motion information of the current block from the motion information of the neighboring blocks. When the merge mode is applied, the merge candidate list may be generated using the motion information of the reconstructed neighboring blocks and/or the motion information of the collocated blocks. The motion information may include at least one of a motion vector, a reference picture index, and an inter-picture prediction indicator. The prediction indicator may indicate one-direction prediction (L0 prediction or L1 prediction) or two-direction predictions (L0 prediction and L1 prediction).

The merge candidate list may be a list of motion information stored. The motion information included in the merge candidate list may be at least one of motion information (spatial merge candidate) of a neighboring block adjacent to the current block, motion information (temporal merge candidate) of the collocated block of the current block in the reference picture, new motion information generated by a combination of the motion information exiting in the merge candidate list, motion information (history-based merge candidate) of the block that is encoded/decoded before the current block, and zero merge candidate.

The encoding apparatus 100 may generate a bitstream by performing entropy encoding on at least one of a merge flag and a merge index and may signal the bitstream to the decoding apparatus 200. The merge flag may be information indicating whether or not to perform the merge mode for each block, and the merge index may be information indicating that which neighboring block, among the neighboring blocks of the current block, is a merge target block. For example, the neighboring blocks of the current block may include a left neighboring block on the left of the current block, an upper neighboring block disposed above the current block, and a temporal neighboring block temporally adjacent to the current block.

Meanwhile, the coding apparatus 100 performs entropy-coding on the correction information for correcting the motion vector among the motion information of the merge candidate and signals the same to the decoding apparatus 200. The decoding apparatus 200 can correct the motion vector of the merge candidate selected by the merge index on the basis of the correction information. Here, the correction information may include at least one of information on whether or not to perform the correction, correction direction information, and correction size information. As described above, the prediction mode that corrects the motion vector of the merge candidate on the basis of the signaled correction information may be referred to as a merge mode having the motion vector difference.

The skip mode may be a mode in which the motion information of the neighboring block is applied to the current block as it is. When the skip mode is applied, the encoding apparatus 100 may perform entropy encoding on information of the fact that the motion information of which block is to be used as the motion information of the current block to generate a bit stream, and may signal the bitstream to the decoding apparatus 200. The encoding apparatus 100 may not signal a syntax element regarding at least any one of the motion vector difference information, the encoding block flag, and the transform coefficient level to the decoding apparatus 200.

The subblock merge mode may mean a mode that derives the motion information in units of sub-blocks of a coding block (CU). When the subblock merge mode is applied, a subblock merge candidate list may be generated using motion information (sub-block based temporal merge candidate) of the sub-block collocated to the current sub-block in the reference image and/or an affine control point motion vector merge candidate.

The geometric partitioning mode may mean a mode that derives motion information by partitioning the current block into the predefined directions, derives each prediction sample using each of the derived motion information, and derives the prediction sample of the current block by weighting each of the derived prediction samples.

The inter-intra combined prediction mode may mean a mode that derives a prediction sample of the current block by weighting a prediction sample generated by inter prediction and a prediction sample generated by intra prediction.

The decoding apparatus 200 may correct the derived motion information by itself. The decoding apparatus 200 may search the predetermined region on the basis of the reference block indicated by the derived motion information and derive the motion information having the minimum SAD as the corrected motion information.

The decoding apparatus 200 may compensate a prediction sample derived via inter prediction using an optical flow.

Figure 6:
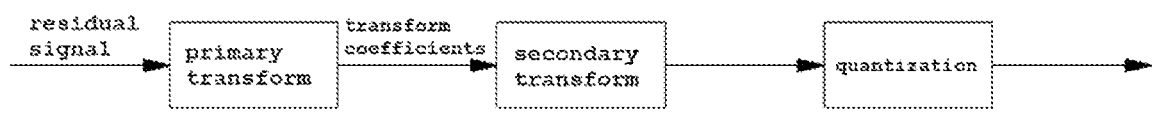
FIG. 6 is a diagram illustrating a transform and quantization process.

FIG. 6 is a diagram illustrating a transform and quantization process.

As illustrated in FIG. 6, a transform and/or quantization process is performed on a residual signal to generate a quantized level signal. The residual signal is a difference between an original block and a prediction block (i.e., an intra prediction block or an inter prediction block). The prediction block is a block generated through intra prediction or inter prediction. The transform may be a primary transform, a secondary transform, or both. The primary transform of the residual signal results in transform coefficients, and the secondary transform of the transform coefficients results in secondary transform coefficients.

At least one scheme selected from among various transform schemes which are preliminarily defined is used to perform the primary transform. For example, examples of the predefined transform schemes include discrete cosine transform (DCT), discrete sine transform (DST), and Karhunen-Loeve transform (KLT). The transform coefficients generated through the primary transform may undergo the secondary transform. The transform schemes used for the primary transform and/or the secondary transform may be determined according to coding parameters of the current block and/or neighboring blocks of the current block. Alternatively, transform information indicating the transform scheme may be signaled. The DCT-based transform may include, for example, DCT-2, DCT-8, and the like. The DST-based transform may include, for example, DST-7.

A quantized-level signal (quantization coefficients) may be generated by performing quantization on the residual signal or a result of performing the primary transform and/or the secondary transform. The quantized level signal may be scanned according to at least one of a diagonal up-right scan, a vertical scan, and a horizontal scan, depending on an intra prediction mode of a block or a block size/shape. For example, as the coefficients are scanned in a diagonal up-right scan, the coefficients in a block form change into a one-dimensional vector form. Aside from the diagonal up-right scan, the horizontal scan of horizontally scanning a two-dimensional block form of coefficients or the vertical scan of vertically scanning a two-dimensional block form of coefficients may be used depending on the intra prediction mode and/or the size of a transform block. The scanned quantized-level coefficients may be entropy-encoded to be inserted into a bitstream.

A decoder entropy-decodes the bitstream to obtain the quantized-level coefficients. The quantized-level coefficients may be arranged in a two-dimensional block form through inverse scanning. For the inverse scanning, at least one of a diagonal up-right scan, a vertical scan, and a horizontal scan may be used.

The quantized-level coefficients may then be dequantized, then be secondary-inverse-transformed as necessary, and finally be primary-inverse-transformed as necessary to generate a reconstructed residual signal.

Inverse mapping in a dynamic range may be performed for a luma component reconstructed through intra prediction or inter prediction before in-loop filtering. The dynamic range may be divided into 16 equal pieces and the mapping function for each piece may be signaled. The mapping function may be signaled at a slice level or a tile group level. An inverse mapping function for performing the inverse mapping may be derived on the basis of the mapping function. In-loop filtering, reference picture storage, and motion compensation are performed in an inverse mapped region, and a prediction block generated through inter prediction is converted into a mapped region via mapping using the mapping function, and then used for generating the reconstructed block. However, since the intra prediction is performed in the mapped region, the prediction block generated via the intra prediction may be used for generating the reconstructed block without mapping/inverse mapping.

When the current block is a residual block of a chroma component, the residual block may be converted into an inverse mapped region by performing scaling on the chroma component of the mapped region. The availability of the scaling may be signaled at the slice level or the tile group level. The scaling may be applied only when the mapping for the luma component is available and the division of the luma component and the division of the chroma component follow the same tree structure. The scaling may be performed on the basis of an average of sample values of a luma prediction block corresponding to the color difference block. In this case, when the current block uses inter prediction, the luma prediction block may mean a mapped luma prediction block. A value necessary for the scaling may be derived by referring to a lookup table using an index of a piece to which an average of sample values of a luma prediction block belongs. Finally, by scaling the residual block using the derived value, the residual block may be switched to the inverse mapped region. Then, chroma component block restoration, intra prediction, inter prediction, in-loop filtering, and reference picture storage may be performed in the inverse mapped area.

Information indicating whether the mapping/inverse mapping of the luma component and chroma component is available may be signaled through a set of sequence parameters.

The prediction block of the current block may be generated on the basis of a block vector indicating a displacement between the current block and the reference block in the current picture. In this way, a prediction mode for generating a prediction block with reference to the current picture is referred to as an intra block copy (IBC) mode. The IBC mode may be applied to M×N (M<=64, N<=64) coding units. The IBC mode may include a skip mode, a merge mode, an AMVP mode, and the like. In the case of a skip mode or a merge mode, a merge candidate list is constructed, and the merge index is signaled so that one merge candidate may be specified. The block vector of the specified merge candidate may be used as a block vector of the current block. The merge candidate list may include at least one of a spatial candidate, a history-based candidate, a candidate based on an average of two candidates, and a zero-merge candidate. In the case of an AMVP mode, the difference block vector may be signaled. In addition, the prediction block vector may be derived from the left neighboring block and the upper neighboring block of the current block. The index on which neighboring block to use may be signaled. The prediction block in the IBC mode is included in the current CTU or the left CTU and limited to a block in the already reconstructed area. For example, a value of the block vector may be limited such that the prediction block of the current block is positioned in an area of three 64×64 blocks preceding the 64×64 block to which the current block belongs in the coding/decoding order. By limiting the value of the block vector in this way, memory consumption and device complexity according to the IBC mode implementation may be reduced.

Hereinafter, an image encoding/decoding method according to an embodiment of the present invention will be described with reference to FIGS. 8 to 57.

Cross-component prediction may mean a process of performing predetermined down-sampling with respect to reconstructed first component samples and generating a prediction sample of a second component block using first reconstructed component samples subjected to down-sampling and a predefined linear or nonlinear relational expression.

At this time, cross-component prediction may be used as the same meaning as inter color component prediction or inter component prediction. Here, the component may mean a color component.

In this specification, a cross-component prediction mode may be used as the same mode as a cross-component linear Model (CCLM) mode.

Figure 8:
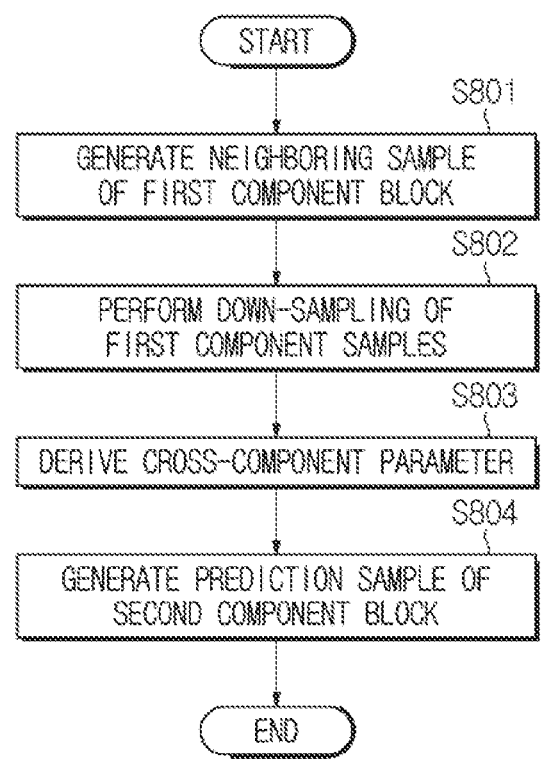
FIG. 8 is a view illustrating a process of performing cross-component prediction according to an embodiment of the present invention.

FIG. 8 is a view illustrating a process of performing cross-component prediction according to an embodiment of the present invention.

Referring to FIG. 8, the process of performing cross-component prediction may include step S801 of generating a neighboring sample of a first component block, step S802 of performing down-sampling of first component samples, step S803 of deriving a cross-component parameter and step S804 of generating a prediction sample of a second component block.

Here, in step S801 of generating the neighboring sample of the first component block, the neighboring sample of the reconstructed first component block may be generated. In addition, in step S802 of performing down-sampling of the first component samples, down-sampling of at least one of the generated neighboring samples and the reconstructed first component samples may be performed. In addition, in step S803 of deriving the cross-component parameter, the cross-component parameter may be derived using the down-sampled sample. In addition, in step S804 of generating the prediction sample of the second component block, the prediction sample of the second component block may be generated.

Hereinafter, the embodiments of the present invention for the above steps will be described in detail.

At this time, the second component may mean at least one component. For example, in case of a YUV color format, the first component may mean a luma component Y and the second component may mean chroma components U and V. As another example, in case of an RGB color format, the first component may mean G and the second component may mean R and B.

At this time, step S803 of deriving the cross-component parameter and step S804 of generating the prediction sample of the second component block may be independently performed with respect to at least one second component.

Hereinafter, step S801 of generating the neighboring sample of the first component block will be described.

In step S801 of generating the neighboring sample of the first component block according to the embodiment of the present invention, for cross-component prediction of the second component block, neighboring samples having at least one line may be generated with respect to a first component block region corresponding to the same location of a second component block region.

For example, neighboring samples having at least one line may be generated at a top, a top right, a left, a top left and/or a bottom left of the first component block.

A method of generating a reference sample used for intra prediction is applicable to the process of generating the neighboring sample. At this time, the length or number of reference sample lines to be generated may be different from that of the method of generating the reference sample used for intra prediction, but the process of generating the reference sample may be the same.

In addition, when cross-component prediction is performed with respect to a current block, the filtering process of the reference sample in the process of generating the reference sample may be omitted.

At this time, when the neighboring samples to be generated are present in an available region, a reconstructed value before a deblocking filter may be applied may be used without change, thereby generating at least one neighboring sample. In this disclosure, a sample being present in the available region may mean that the sample is available. In addition, a sample being present in an unavailable region may mean that the sample is not available. In addition, a sample being available may mean that the sample is valid and may be used in at least one of an encoding/decoding process.

In contrast, when neighboring samples to be generated is present in an unavailable region, at least one virtual neighboring sample may be generated by padding a closest sample value present in the available region. At this time, at least one of the virtual neighboring samples is generated in the unavailable region, but may be determined and used as an available sample in an intra prediction process. At this time, the same down-sampling filter may be applied to a region in which an available neighboring sample is present and a region in which virtual neighboring samples are present.

For example, when the first component block is a luma block and the second component block is a chroma block, for cross-component prediction of the chroma block, neighboring samples having at least one line for the luma block may be generated. At this time, when the top neighboring samples of the luma block are present in the unavailable region, at least one virtual top neighboring sample may be generated by padding a top inner sample value in a luma block, which is a closest sample value present in the available region. Alternatively, when left neighboring samples of the luma block are present in the unavailable region, at least one virtual left neighboring sample may be generated by padding a left inner sample value in the luma block, which is a closest sample value present in the available region. Alternatively, when neighboring samples of all luma blocks are present in the unavailable region, all virtual neighboring samples may be generated using a median value according to bit depth. The virtual neighboring samples may be generated in a region in which the neighboring samples are not available.

At this time, a neighboring region which is included in at least one of the same slice, the same tile and the same subpicture as the current block based on the second component block, is present in the same picture and is included in the same coding tree unit (CTU) row as the current block when wavefront parallel processing (WPP) is used may be referred to as an available region.

In contrast, a neighboring region which is included in a slice, a tile and a subpicture different from that of the current block based on the second component block, is present outside the picture and is included in a CTU row different from that of the current block when wavefront parallel processing (WPP) is used may be referred to as an unavailable region.

Alternatively, when constrained intra prediction is used, a neighboring region which is not encoded/decoded in an intra prediction mode may be referred to as an unavailable region.

The process of determining the available region is equally applicable to the neighboring region of the first component block.

Figure 9:
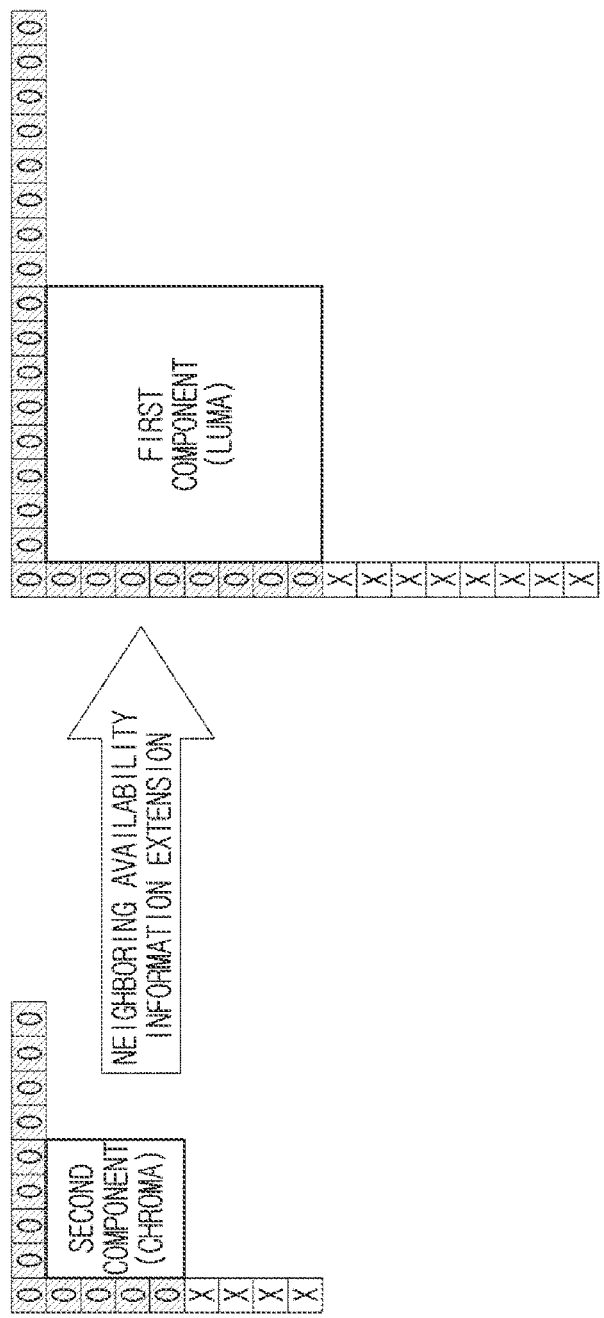
FIGS. 9 and 10 are views illustrating a process of extending derived neighboring availability information of a first component block using neighboring availability information of a second component block according to an embodiment of the present invention.
Figure 10:
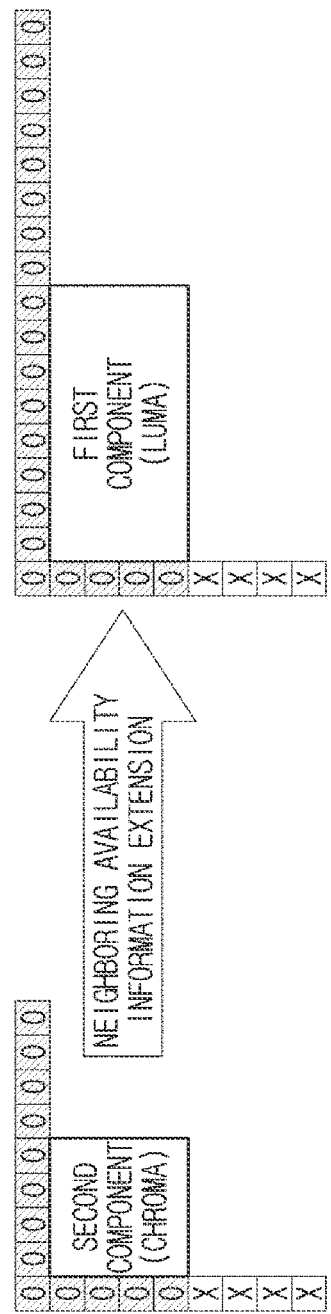

FIGS. 9 and 10 are views illustrating a process of extending derived neighboring availability information of a first component block using neighboring availability information of a second component block according to an embodiment of the present invention. At this time, availability information may mean validity information.

Hereinafter, in FIGS. 9 and 10, a symbol "O" may mean an available neighboring sample and a symbol "X" may mean an unavailable neighboring sample. In addition, the neighboring availability information may be information indicating whether a neighboring sample is available. the length of the neighboring availability information may mean the length of a neighboring sample including neighboring availability information.

The neighboring availability information of the second component block may be used to derive the neighboring availability information of the first component block region corresponding to the second component block region. At this time, the unit of availability information may be defined as the size of a minimum coding unit (CU) defined in the encoder/decoder or the size of one sample. Alternatively, the unit of availability information may be signaled or may be determined based on at least one of the encoding parameters of the current block.

For example, when the second component block is a chroma block and the first component block is a luma block, the neighboring availability information of the chroma block may be used to generate the neighboring sample of the luma block.

For example, referring to FIG. 9, when the color format is YUV 4:2:0, since the width and height of the neighboring availability information of the chroma block is ½ of those of the luma block, the width and height of the neighboring availability information of the chroma block may double to generate the neighboring sample of the luma block. At this time, the length of the availability information of the top left may not extend.

As another example, referring to FIG. 10, when the color format is YUV 4:2:2, since the width of the neighboring availability information of the chroma block is ½ of that of the luma block and the height thereof is equal to that of the luma block, only the width of the neighboring availability information of the chroma block may double to generate the neighboring sample of the luma block. At this time, the length of the availability information of the top left may not extend.

As another example, when the color format is YUV 4:4:4, since the width and height of the neighboring availability information of the chroma block are equal to those of the luma block, the length of the neighboring availability information of the chroma block may be used for the luma block without extending.

When the neighboring sample having at least one line is generated, the left and bottom left neighboring samples may use availability information of the same y coordinate and the top and top right neighboring samples may use availability information of the same x coordinate. In addition, the top left neighboring samples may use top left neighboring availability information.

Figure 11:
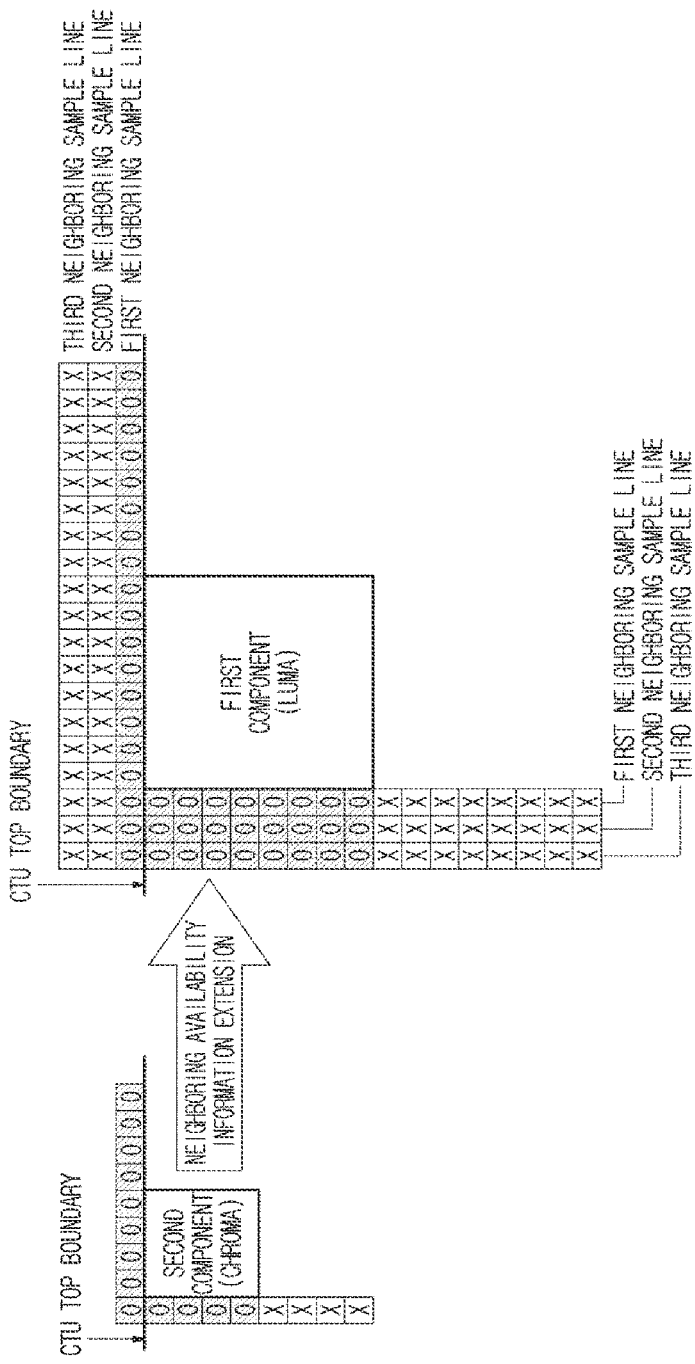
FIG. 11 is a view illustrating a process of extending the derived neighboring availability information of the first component block using the neighboring availability information of the second component block when the uppermost location of a current block is equal to a CTU top boundary, according to an embodiment of the present invention.

FIG. 11 is a view illustrating a process of extending the derived neighboring availability information of the first component block using the neighboring availability information of the second component block when the uppermost location of a current block is equal to a CTU top boundary, according to an embodiment of the present invention.

The neighboring availability information of the second component block may be used to derive the neighboring availability information of the first component block corresponding to the second component block. When the neighboring availability information of the first component block region is derived, if the uppermost location of the current block is equal to the CTU top boundary, the neighboring samples having two or more lines may be generated on the assumption that all top, top left and top right neighboring samples present on an N-th neighboring sample line (where, N being an integer of 2 or more) are not available. Unavailable neighboring samples may be generated by padding a closest available sample present on the same line or using a median value according to bit depth. Accordingly, a line buffer may store only reconstructed samples of up to one line at the top of a picture.

For example, referring to FIG. 11, the derived neighboring availability information of the first component block may extend using the neighboring availability information of the chroma block which is the second component block. At this time, when the uppermost location of the second component block is equal to the CTU top boundary, the neighboring samples may be generated on the assumption that the bottom left, top and top right neighboring samples present on the second and third neighboring sample lines of the first component block are always unavailable regardless of the neighboring availability information of the second component block.

In step S801 of generating the neighboring sample of the first component block according to the embodiment of the present invention, the neighboring availability information of the first component block region corresponding to the second component block region may be derived using the neighboring availability information of the second component block.

For example, when the first component block and the second component block use the same encoding/decoding tree structure, the neighboring availability information of the first component block may be derived using the neighboring availability information of the second component block.

As another example, when the first component block and the second component block use independent encoding/decoding tree structures, it may be assumed that all blocks in a coding tree block (CTB) including the first component block region corresponding to the second component block region have been encoded/decoded. Accordingly, in this case, when a neighboring region is inside a current CTB, the neighboring region may be determined as an available region and, when the neighboring region is outside the CTB, the neighboring region may be determined as an unavailable region.

When a neighboring sample to be generated is included in an available region, reconstructed samples before applying a deblocking filter may be used without change, thereby generating at least one neighboring sample.

In contrast, when a neighboring sample is included in an unavailable region, at least one virtual neighboring sample may be generated in an unavailable region, by padding the reconstructed samples present in an available region. At this time, the same down-sampling filter may be applied to a region in which the available neighboring sample is present and a region in which virtual neighboring samples are present.

For example, when the first component block is a luma block and the second component block is a chroma block, neighboring samples having at least one line for the luma block may be generated for cross-component prediction of the chroma block. At this time, when top neighboring samples of the luma block are present in an unavailable region, at least one virtual top neighboring sample may be generated by padding a top inner sample value in a luma block which is a closest sample value present in an available region. Alternatively, when the left neighboring samples of the luma block is present in an unavailable region, at least one virtual left neighboring samples may be generated by padding the left inner sample value in the luma block which is a closest sample value present in an available region. At this time, the sample present in the available region may mean not only the reconstructed neighboring sample but also the top or left sample in the current block. The virtual neighboring samples may be generated in a region in which the neighboring samples are not available.

At this time, when all neighboring regions are not available, the virtual neighboring samples may be generated using a median value that the sample may have. Here, the median value that the sample may have may be defined as $1<(bit\_depth-1)$ according to the bit depth bit_depth of the first component. Alternatively, the virtual neighboring samples may be generated by padding the top sample or the left sample in the current block.

Figure 12:
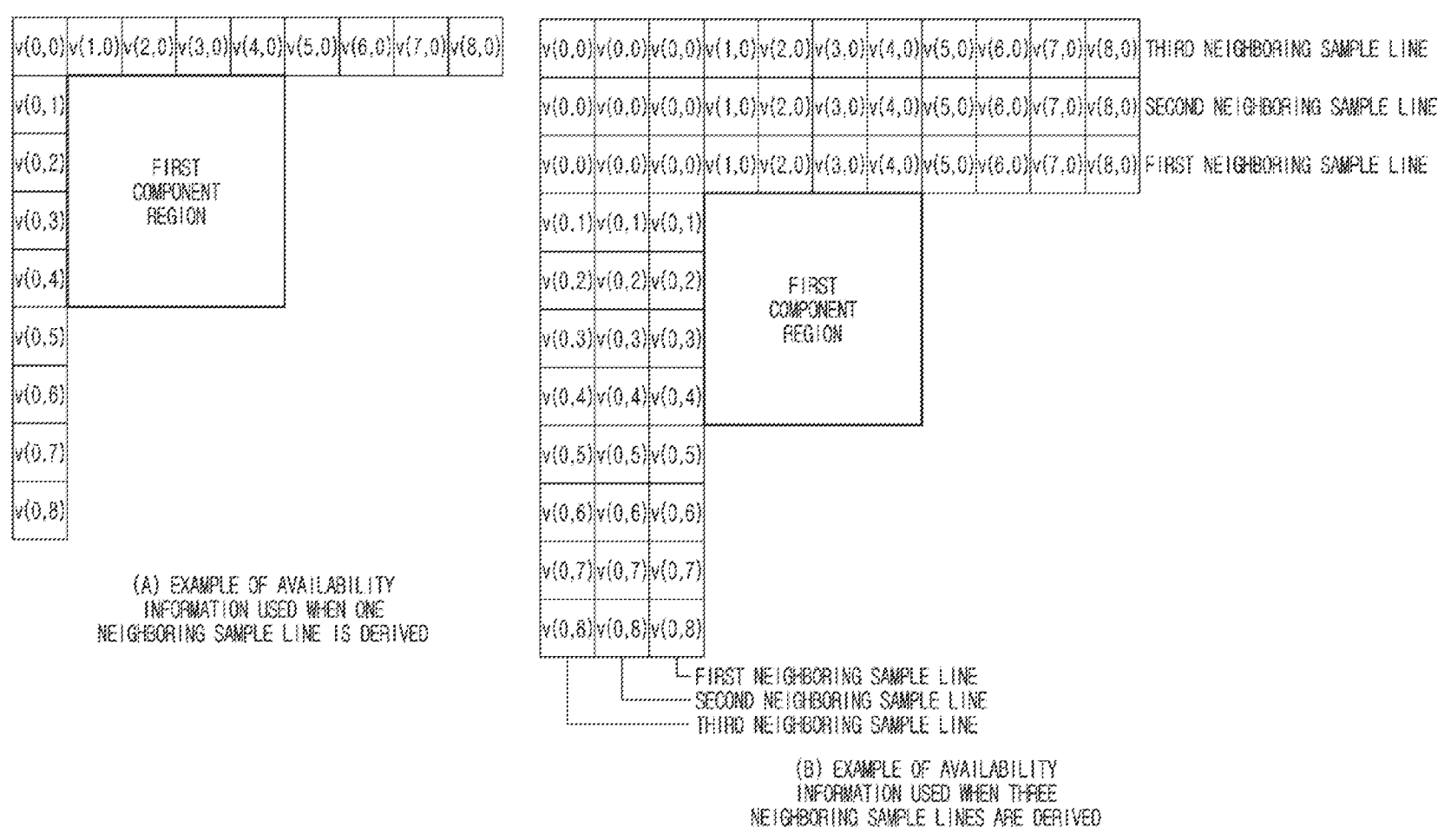

FIG. 12 is a view illustrating an embodiment of availability information used to generate neighboring samples of a first component block according to an embodiment of the present invention.

In FIG. 12(a), v(i, j) represents arrangement of availability information corresponding to the first component block derived using the neighboring availability information of the second component block. Referring to FIG. 12(a), neighboring availability information having one line around the first component block corresponding to the second component block may be derived using the neighboring availability information of the second component block.

FIG. 12(b) shows an example in which arrangement of neighboring availability information derived in FIG. 12(a) is used to derive neighboring availability information having three lines around the first component block.

FIG. 13 is a view illustrating an example of generating a neighboring sample line according to a color format, according to an embodiment of the present invention.

Figure 14:
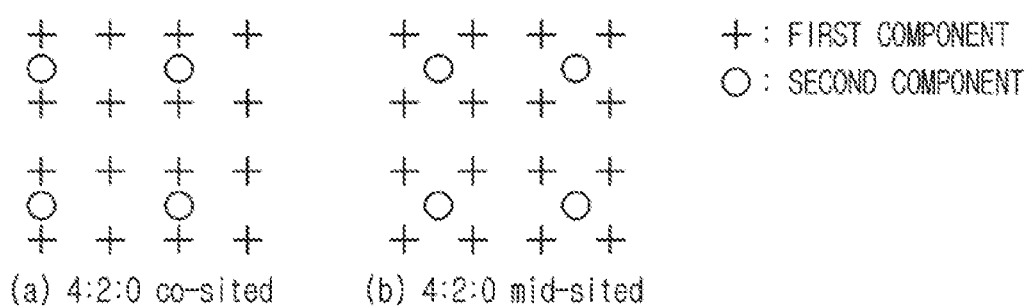
FIG. 14 is a view showing an example of generating a neighboring sample line according to syntax elements meaning a sub-sampling method for a chroma block, according to an embodiment of the present invention.

FIG. 14 is a view showing an example of generating a neighboring sample line according to a syntax element meaning a sub-sampling method for a chroma block, according to an embodiment of the present invention.

The number of neighboring sample lines to be generated may be determined by the color format. Alternatively, the number of neighboring sample lines to be generated may be determined according to the syntax element meaning the sub-sampling method for the chroma block.

For example, referring to FIG. 13(a), when the color format is YUV 4:4:4, since a ratio between the resolutions of the first component and the second component is 1:1, neighboring samples having one line may be generated at the top, top right, top left and left and/or bottom left locations of the first component block.

As another example, referring to FIG. 13(b), when the color format is YUV 4:2:2, since a ratio between the horizontal resolutions of the first component and the second component is 2:1, neighboring samples having at least two lines may be generated at the top, top right, top left and left and/or bottom left locations of the first component block, for down-sampling.

As another example, when the color format is YUV 4:2:0, since a ratio between the horizontal and vertical resolutions of the first component and the second component is 2:1, neighboring samples having at least two lines may be generated at the top, top right, top left and left and/or bottom left locations of the first component block, for down-sampling.

As another example, referring to FIG. 14(a), when the color format is YUV 4:2:0 and the syntax element (e.g., sps_cclm_colocated_chroma_flag or sps_chroma_vertical_collocated_flag) meaning the sub-sampling method for the chroma block is a value meaning 4:2:0 co-sited, for down-sampling, neighboring samples having at least two lines may be generated at the top and/or top right locations of the first component block and neighboring samples having at least three lines may be generated at the top left, left and/or bottom left locations of the first component block. The sps_cclm_colocated_chroma_flag may mean the same syntax element as the sps_chroma_vertical_collocated_flag.

For example, sps_cclm_colocated_chroma_flag may be signaled in a predetermined direction (vertical direction or horizontal direction). When sps_cclm_colocated_chroma_flag has a value "1" (or a first value), this may mean that the location of the chroma sample and the location of the luma sample may be the same (co-sited) in the predetermined direction. In addition, when sps_cclm_colocated_chroma_flag has a value "0" (or a second value), this may mean that the location of the chroma sample and the location of the luma sample may not be the same in the predetermined direction. When the location of the chroma sample and the location of the luma sample are not the same in the predetermined direction, the chroma sample may be mid-sited between two adjacent luma samples in the predetermined direction.

As another example, referring to FIG. 14(b), when the color format is YUV 4:2:0 and the syntax element (e.g., sps_cclm_colocated_chroma_flag or sps_chroma_vertical_collocated_flag) meaning the sub-sampling method for the chroma block is a value meaning 4:2:0 mid-sited, neighboring samples having at least three lines may be generated at the top, top right, top left, left and/or bottom left locations of the first component block.

For each neighboring sample line to be generated, the width and height of the neighboring sample may be determined by the size of a second component transform block (or a second component coding block), a neighboring sample line index and/or the sub-sampling method for the chroma block.

For example, the width numSampT of the neighboring sample to be generated may be derived as follows.

$$\text{numSampT} = nTbW * \text{sub\_width\_c}$$

At this time, nTbW may denote the width of the second component transform block, and sub_width_c may denote a sub-sampling factor of the second component block and the first component block and may mean the value defined in Table 1 below. In this specification, sub_width_c may be used as the same meaning as SubWidthC and may be a value representing a ratio between the widths of the first component block and the second component block.

As another example, the width numSampT of the neighboring sample to be generated may be derived as follows.

$$\text{numSampT} = (nTbW + \min(nTbW, nTbH)) * \text{sub\_width\_c}$$

At this time, nTbW may denote the width of the second component transform block, nTbH may denote the height of the second component transform block, and min(nTbW, nTbH) may mean the smaller value between two input values nTbW and nTbH.

As another example, the width numSampT of the neighboring sample to be generated may be derived as follows.

$$\text{numSampT} = (nTbW << 1)) * \text{sub\_width\_c}$$

As another example, when the horizontal neighboring samples of an N-th top neighboring sample line are generated, the width numSampT of the neighboring sample to be generated may be derived as follows.

$$\text{numSampT} = (nTbW << 1) * \text{sub\_width\_c} + \max(1, nTbW/nTbH) * (N-1) * \text{sub\_width\_c}$$

In addition, the height numSampL of the neighboring sample to be generated may be derived as follows.

$$\text{numSampL} = nTbH * \text{sub\_height\_c}$$

At this time, nTbH may denote the height of a second component transform block, and sub_height_c may denote a sub-sampling factor of the second component block and the first component block and mean a value defined in Table 1 below. In this specification, sub_height_c may be used as the same meaning as SubHeightC and may be a value representing a ratio between the heights of the first component block and the second component block.

As another example, the height numSampL of the neighboring sample to be generated may be derived as follows.

numSampL=(nTbH+min(nTbW,nTbH))*sub_height_c

As another example, the height numSampL of the neighboring sample to be generated may be derived as follows.

numSampL=(nTbH<<1)*sub_height_c

As another example, when vertical neighboring samples of an N-th left neighboring sample line are generated, the height numSampL of the neighboring sample to be generated may be derived as follows.

numSampL=(nTbH<<1)*sub_height_c+max(1,nTbH/nTbW)*(N−1)*sub_height_c

At this time, max(1, nTbH/nTbW) may mean the larger value between two input values 1 and nTbH/nTbW.

At this time, the sub_width_c and the sub_height_c may be defined according to the color format as shown in Table 1 below.

TABLE 1

| COLOR FORMAT | sub_width_c | sub_height_c |
|---|---|---|
| Monochrome | 1 | 1 |
| 4:2:0 | 2 | 2 |
| 4:2:2 | 2 | 1 |
| 4:4:4 | 1 | 1 |

In step S801 of generating the neighboring sample of the first component block according to the embodiment of the present invention, the width and height of the neighboring sample to be generated may be determined by the size of the second component block (e.g., the second component transform block) and the type of a cross-component prediction mode. The type of the cross-component prediction mode may mean at least one of an INTRA_LT_CCLM mode, an INTRA_T_CCLM mode or an INTRA_L_CCLM mode.

For example, when a mode which may be used for both the top and left samples (e.g., the INTRA_LT_CCLM mode) among the cross-component prediction modes is used for the current block, the width numSampT of the neighboring sample to be generated may be calculated using the width nTbW of the second component transform block and the sub-sampling factor (e.g., sub_width_c) of the second component and the first component.

numSampT=nTbW*sub_width_c

As another example, when a mode which may be used for both the top and left samples (e.g., the INTRA_LT_CCLM mode) among the cross-component prediction modes is used for the current block, the height numSampL of the neighboring sample to be generated may be calculated as follows using the height nTbH of the second component transform block and the sub-sampling factor (e.g., sub_height_c) of the second component and the first component.

numSampL=nTbH*sub_height_c

As another example, when a mode which may be used for both the top and top right samples (e.g., the INTRA_T_CCLM mode) among the cross-component prediction modes is used for the current block, the width numSampT of the neighboring sample to be generated may be calculated as follows using the width nTbW of the second component transform block and the sub-sampling factor (e.g., sub_width_c) of the second component and the first component.

numSampT=(nTbW<<1)*sub_width_c

Alternatively, the following calculation is possible.

numSampT=(nTbW+min(nTbW,nTbH))*sub_width_c

As another example, when a mode which may be used for both the left and bottom left samples (e.g., the INTRA_L_CCLM mode) among the cross-component prediction modes is used for the current block, the height numSampL of the neighboring sample to be generated may be calculated as follows using the height nTbH of the second component transform block and the sub-sampling factor (e.g., sub_height_c) of the second component and the first component.

numSampL=(nTbH<<1)*sub_height_c

Alternatively, the following calculation is possible.

numSampL=(nTbH+min(nTbW,nTbH))*sub_height_c

The width and height of the neighboring sample to be generated may be determined by the size of the second component block (e.g., the second component transform block), the type of the cross-component prediction mode and/or neighboring availability information.

For example, when a mode which may be used for both the top and left samples (e.g., the INTRA_LT_CCLM mode) among the cross-component prediction modes is used for the current block, the width numSampT of the neighboring sample to be generated may be calculated as follows using the width nTbW of the second component transform block, the sub-sampling factor (e.g., sub_width_c) of the second component and the first component and availability information availTop of the top neighboring sample.

numSampT=availTop?nTbW*sub_width_c: 0

At this time, availTop is a variable having a value of "1" when a top neighboring block region is available based on the second component block and having a value of "0" when the top neighboring block region is not available.

As another example, when a mode which may be used for both the top and left samples (e.g., the INTRA_LT_CCLM mode) among the cross-component prediction modes is used for the current block, the height numSampL of the neighboring sample to be generated may be calculated as follows using the height nTbH of the second component transform block, the sub-sampling factor (e.g., sub_height_c) of the second component and the first component and availability information availLeft of the left neighboring sample.

numSampL=availLeft?nTbH*sub_height_c: 0

At this time, availLeft is a variable having a value of "1" when the left neighboring block region is currently available based on the second component block and having a value of "0" when the left neighboring block region is not available.

As another example, when a mode which may be used for both the top and top right samples (e.g., the INTRA_T_CCLM mode) among the cross-component prediction modes is used for the current block, the width numSampT of the neighboring sample to be generated may be calculated as follows using the width nTbW of the second component transform block, the sub-sampling factor (e.g., sub_width_c) of the second component and the first component and the number numAvailTopRightSamples of available samples among the neighboring samples located at the top right.

numSampT=availTop?(tu_width+min(numAvailTopRightSamples,tu_height))*sub_width_c: 0

At this time, numAvailTopRightSamples may indicate the number of available samples currently located at the top right of the second component block.

As another example, when a mode which may be used for both the left and bottom left samples (e.g., the INTRA_L_CCLM mode) among the cross-component prediction modes is used for the current block, the height numSampL of the neighboring sample to be generated may be calculated as follows using the height nTbH of the second component transform block, the sub-sampling factor (e.g., sub_height_c) of the second component and the first component and the number numAvailLeftBotSamples of available samples among neighboring samples located at the bottom left.

numSamp$L$=availLeft?($tu$_height+min(numAvailLeftBotSamples,$tu$_width))*sub_height_$c$: 0

At this time, numAvailLeftBotSamples may indicate the number of available samples currently located at the bottom left of the second component block.

When the value of numSampT is "0" as the result of the equation of numSampT, the process of generating the neighboring sample at the top may be omitted. In addition, when the value of numSampL is "0" as the result of the equation of numSampL, the process of generating the neighboring sample at the left may be omitted.

As a modified example of the above-described embodiment, numSampT indicates the number of available samples among the top and top right neighboring samples of the second component block and numSampL indicates the number of available samples among the left and bottom left neighboring samples of the second component block, both of which may be derived as follows. At this time, numSampT and numSampL may be differently derived depending on whether the prediction mode predModeIntra of the current block is in an INTRA_LT_CCLM mode.

When the prediction mode of the current block is an INTRA_LT_CCLM mode, numSamp$T$=avail$T$?$nTbW$:0 numSamp$L$=avail$L$?$nTbH$:0

When the prediction mode of the current block is not an INTRA_LT_CCLM mode, that is, is an INTRA_L_CCLM mode or an INTRA_T_CCLM mode, numSamp$T$=
(avail$T$&&predModeIntra==INTRA_$T$_CCLM)?
($nTbW$+min(numTopRight,$nTbH$)):0 numSamp$L$=
(avail$L$&&predModeIntra==INTRA_$L$_CCLM)?
($nTbH$+min(numLeftBelow,$nTbW$)):0

At this time, availT and availL may be information indicating whether the top (or top right) and left (or bottom left) neighboring samples of the second component block are available. In addition, numTopRight may indicate the number of available samples among the top right neighboring samples of the second component block, and numLeftBelow may be information indicating the number of available samples of the bottom left neighboring samples of the second component block.

In step S801 of generating the neighboring sample of the first component block according to the embodiment of the present invention, when at least one of the neighboring samples of the first component block is not available, the neighboring samples may be generated through padding of at least one of the inner samples of the first component block.

For example, when the left neighboring sample of the first component block is available, the left neighboring sample may be used as the neighboring sample without change and, when the left neighboring sample is not available, the left neighboring sample may be generated by padding a neighboring sample closest to the neighboring sample, padding an inner sample located at the leftmost side of the first component block to the left or using the closest neighboring sample and the inner sample located at the leftmost side of the first component block.

As another example, when the top neighboring sample of the first component block is available, the top neighboring sample may be used as the neighboring sample without change and, when the top neighboring sample is not available, the top neighboring sample may be generated by padding a neighboring sample closest to the neighboring sample, padding an inner sample located at the uppermost side of the first component block to the top or using the closest neighboring sample and the inner sample located at the uppermost side of the first component block.

At this time, the same down-sampling filter may be applied to a region in which the available neighboring sample is present and a region in which virtual neighboring samples are present.

As another example, when the top left neighboring sample of the first component block is available, the top left neighboring sample may be used as the neighboring sample without change and, when the top left neighboring sample is not available, the top left neighboring sample may be generated by padding a neighboring sample closest to the neighboring sample, padding an inner sample located at the top-leftmost side of the first component block to the top left or using the closest neighboring sample and the inner sample located at the top-leftmost side of the first component block.

As another example, when the top right neighboring sample of the first component block is available, the top right neighboring sample may be used as the neighboring sample without change and, when the top right neighboring sample is not available, the top right neighboring sample may be generated by padding a neighboring sample closest to the neighboring sample, padding an inner sample located at the top-rightmost side of the first component block to the top right or using the closest neighboring sample and the inner sample located at the top-rightmost side of the first component block.

As another example, when the bottom left neighboring sample of the first component block is available, the bottom left neighboring sample may be used as the neighboring sample without change and, when the bottom left neighboring sample is not available, the bottom left neighboring sample may be generated by padding neighboring samples closest to the neighboring sample, padding an inner sample located at the bottom-leftmost side of the first component block to the bottom left or using the closest neighboring sample and the inner sample located at the bottom-leftmost side of the first component block.

When down-sampling of the neighboring sample of the first component block is omitted in step S802 of performing down-sampling of the first component samples, only one or two neighboring samples may be generated according to the sampling factor for the second component.

For example, when both sub_width_c and sub_height_c have a value of 1, only a first neighboring sample line may be generated and the first neighboring sample line may be used when down-sampling is performed with respect to the inner sample of the first component block. In addition, at least one sample of the first neighboring sample line may be used in step S803 of deriving the cross-component parameter.

As another example, when both sub_width_c and sub_height_c have a value of 2, a first neighboring sample line and a second neighboring sample line may be generated and the first neighboring sample line may be used when down-sampling is performed with respect to the inner sample of the first component block. In addition, at least one sample of the second neighboring sample line may be used in step S803 of deriving the cross-component parameter.

As another example, when sub_width_c has a value of 2 and sub_height_c has a value of 1, a first neighboring sample line and a second neighboring sample line may be generated for left or bottom left neighboring samples and the first neighboring sample line may be used when down-sampling is performed with respect to the inner sample of the first component block. In addition, at least one sample of the second neighboring sample line may be used in step S803 of deriving the cross-component parameter.

As another example, when sub_width_c has a value of 2 and sub_height_c has a value of 1, only a first neighboring sample line may be generated for top or top right neighboring samples and the first neighboring sample line may be used when down-sampling is performed with respect to the inner sample of the first component block. In addition, at least one sample of the first neighboring sample line may be used in step S803 of deriving the cross-component parameter.

As another example, when sub_width_c has a value of 1 and sub_height_c has a value of 2, a first neighboring sample line and a second neighboring sample line may be generated for top or top right neighboring samples and the first neighboring sample line may be used when down-sampling is performed with respect to the inner sample of the first component block. In addition, at least one sample of the second neighboring sample line may be used in step S803 of deriving the cross-component parameter.

As another example, when sub_width_c has a value of 1 and sub_height_c has a value of 2, only a first neighboring sample line may be generated for left or bottom left neighboring samples and the first neighboring sample line may be used when down-sampling is performed with respect to the inner sample of the first component block. In addition, at least one sample of the first neighboring sample line may be used in step S803 of deriving the cross-component parameter.

Hereinafter, step 3802 of performing down-sampling of the first component samples will be described.

In step S802 of performing down-sampling of the first component samples according to the embodiment of the present invention, on the assumption that all neighboring samples necessary for down-sampling are available, simplified down-sampling of the first component samples may be performed as follows without neighboring availability determination. At this time, a single down-sampling filter may be used as a down-sampling filter without neighboring availability determination.

Different down-sampling filter may be used depending on the sub-sampling factor sub_width_c or sub_height_c of the color format and the sub-sampling method.

For example, when the color format is YUV 4:4:4, down-sampling may not be performed as shown in the following equation. That is, when the color format is YUV 4:4:4, since both sub_width_c and sub_height_c have a value of 1, a sample value to be down-sampled may be used as a down-sampled result value without separate down-sampling.

$$outY[x][y]=inY[x][y], \text{ with } x=-1 \ldots tu\_width-1, y=-1 \ldots tu\_height-1$$

At this time, outY may mean a first component sample array subjected to down-sampling, and x and y may mean the location of a first component sample when it is assumed that the top left inner sample location of the second component block is (0, 0).

In addition, inY[x][y], with x=0 . . . tu_width−1, y=0 . . . tu_height−1 may mean a reconstructed first component sample array before deblocking filtering, and inY[−1][y], with y=−1 . . . tu_height−1, and inY[x][−1], with x=0 . . . tu_width−1, may mean neighboring samples generated in step S801 of generating the neighboring sample of the first component block. Here, tu_width (or tuWidth) may mean the width of the second component transform block, and tu_height (or tuHeight) may mean the height of the second component transform block.

As another example, when the color format is YUV 4:2:2 or YUV 4:2:0 and the syntax element (e.g., sps_cclm_colocated_chroma_flag, sps_chroma_vertical_collocated_flag, etc.) meaning the sub-sampling method for the chroma block has a value meaning co-sited (e.g., sps_cclm_colocated_chroma_flag has a value of "1"), filtering may be performed using a cross-shaped down-sampling filter having a very high weight at the center location of the filter as follows.

$$outY[x][y]=(w[0]*inY[sub\_width\_c*x][sub\_height\_c*(y-1)]+w[1]*inY[sub\_width\_c*(x-1)][sub\_height\_c*y]+w[2]*inY[sub\_width\_c*x][sub\_height\_c*y]+w[3]*inY[sub\_width\_c*(x+1)][sub\_height\_c*y]+w[4]*inY[sub\_width\_c*x][sub\_height\_c*(y+1)]+a)>>b$$

At this time, x=−1 . . . tu_width−1 and y=−1 . . . tu_height−1.

At this time, inY[x][y] with x=0 . . . tu_width*sub_width_c−1 and y=0 . . . tu_height*sub_height_c−1 may be a reconstructed first component sample array before deblocking filtering, and inY[−1][y], with y=−1 . . . tu_height*sub_height_c−1, and inY[x][−1], with x=0 . . . tu_width*sub_width_c−1, may be neighboring samples generated in step S801 of generating the neighboring sample of the first component block.

At this time, the weight w may be defined as w[0]=1, w[1]=1, w[2]=4, w[3]=1, and w[4]=1. In addition, a and b are values for averaging and rounding and may be determined according to the sum of values w. For example, in the above equation, a may be defined as 4, and b may be defined as 3.

Alternatively, decimation down-sampling filtering in which a sample value corresponding to the center location of filtering is used without change may be performed as follows.

$$outY[x][y]=(w[0]*inY[sub\_width\_c*x][sub\_height\_c*y]+a)>>b$$

At this time, x=−1 . . . tu_width−1 and y=−1 . . . tu_height−1.

At this time, inY[x][y] with x=0 . . . tu_width*sub_width_c−1 and y=0 . . . tu_height*sub_height_c−1 may be a reconstructed first component sample array before deblocking filtering, and inY[−1][y], with y=−1 . . . tu_height*sub_height_c−1, and inY[x][−1], with x=0 . . . tu_width*sub_width_c−1, may be neighboring samples generated in step S801 of generating the neighboring sample of the first component block.

At this time, a weight w[0] may be defined as 8, and, in the above equation, a may be defined as 4 and b may be defined as 3. Alternatively, a weight w[0] may be defined as 1, and a and b may be defined as 0.

According to one embodiment of the present invention, when the syntax element (e.g., sps_cclm_colocated_chroma_flag, sps_chroma_vertical_collocated_flag, etc.) meaning the sub-sampling method for the chroma block has a value meaning mid-sited (e.g., when sps_cclm_colocated_chroma_flag has a value of "0"), filtering may be performed using a down-sampling filter of an N×M window considering the neighboring samples as follows.

$$outY[x][y]=(w[0]*inY[sub\_width\_c*x][sub\_height\_c*(y-1)]+w[1]*inY[sub\_width\_c*(x-1)][sub\_height\_c*(y+1)]+w[2]*inY[sub\_width\_c*x][sub\_height\_c*y]+w[3]*inY[sub\_width\_c\ x][sub\_height\_c*(y+1)]+w[4]*inY[sub\_width\_c*(x+1)][sub\_height\_c*y]+w[5]*inY[sub\_width\_c(x+1)][sub\_height\_c*(y+1)]+a)>>b$$

At this time, x=−1 . . . tu_width−1 and y=−1 . . . tu_height−1.

At this time, inY[x][y] with x=0 . . . tu_width sub_width_c−1 and y=0 . . . tu_height*sub_height_c−1 may be a reconstructed first component sample array before deblocking filtering, and inY[−1][y], with y=−1 . . . tu_height*sub_height_c−1, and inY[x][−1], with x=0 . . . tu_width*sub_width_c−1, may be the neighboring samples generated in step S801 of generating the neighboring sample of the first component block.

At this time, when the color format is YUV 4:2:0, the weight w may be defined as w[0]=1, w[1]=2, w[2]=1, w[3]=1, w[4]=2 and w[5]=1, and, when the color format is YUV 4:2:2, the weight w may be defined as w[0]=2, w[1]=4, w[2]=2, w[3]=0, w[4]=0 and w[5]=0. In addition, a and b are values for rounding and may be determined by the sum of values w. For example, in the above equation, a may be defined as 4 and b may be defined as 3.

Alternatively, when the color format is YUV 4:2:2, filtering may be performed using a down-sampling filter of an N×1 window as follows.

$$outY[x][y]=(w[0]*inY[sub\_width\_c*(x-1)][sub\_height\_c*y)]+w[1]*inY[sub\_width\_c*x)][sub\_height\_c*y]+w[2]*inY[sub\_width\_c*(x+1)][sub\_height\_c*y]+a)>>b$$

At this time, w[0], w[1] and w[2] may be 2, 4 and 2, respectively. In addition, a and b may be 4 and 3, respectively.

The down-sampling methods may be performed only with respect to the inner samples except for the neighboring samples, that is, inY[x][y] with x=0 . . . tu_width*sub_width_c−1 and y=0 . . . tu_height*sub_height_c−1. In addition, down-sampling may be performed only with respect to a specific location of the neighboring sample, in order to reduce the amount of computation.

The embodiments of the YUV color format is similarly applicable to color formats such as RGB or ICtCP.

Figure 15:
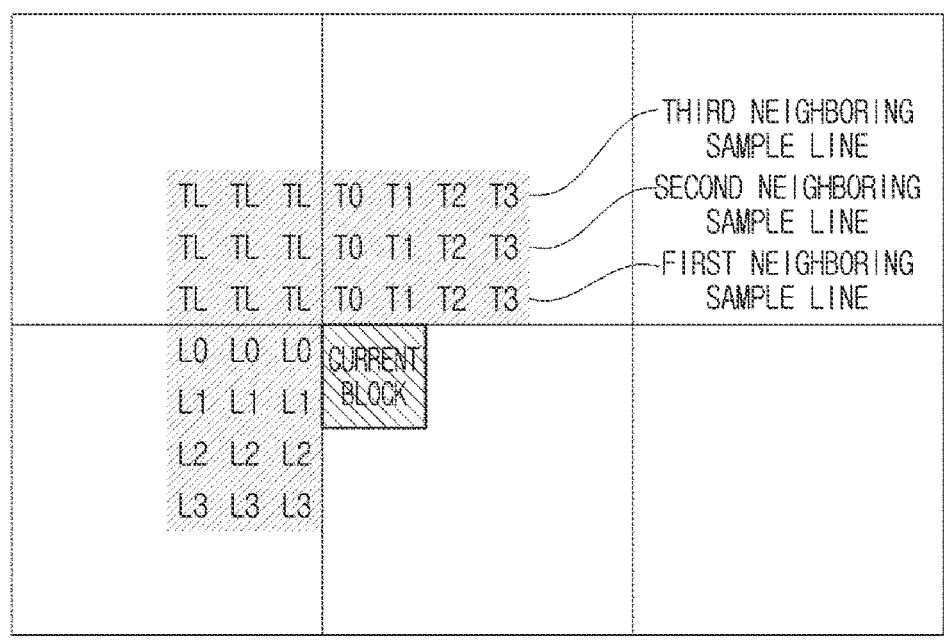
FIG. 15 is a view illustrating a process of performing down-sampling when the top and left boundaries of the current block are equal to a CTU boundary, according to an embodiment of the present invention.

FIG. 15 is a view illustrating a process of performing down-sampling when the top and left boundaries of the current block are equal to a CTU boundary, according to an embodiment of the present invention.

Down-sampling may be performed by using a smaller number of lines than the above-described example, in order to reduce a line buffer size, when neighboring samples located at the top, top left and top right of the current block are included in a different CTU from the current block. Alternatively, down-sampling may be performed by padding the sample values of a first neighboring sample line to a second or third neighboring sample line.

For example, as shown in FIG. 15, when the top and left boundaries of the current block are the same as a CTU boundary, down-sampling may be performed by padding the sample values of the first neighboring sample line to the second and third neighboring sample lines. At this time, since the left and bottom left neighboring samples are not included in the line buffer, the actual neighboring value may be used without padding.

In addition, when the top and left boundaries of the current block are the same as a CTU boundary, only the first neighboring sample line may be used for deriving a cross-component parameter without performing down-sampling.

According to one embodiment of the present invention, only a sample at a specific location among neighboring samples may be down-sampled and used to derive at least one cross-component parameter.

At this time, the number of neighboring samples to be down-sampled may always be fixed to N for all cross-component prediction modes. At this time, N may be a non-zero positive integer.

At this time, the specific location may be calculated based on the second component block, and may be determined as follows according to the type of the cross-component prediction mode, neighboring availability information, the size of a transform block or a chroma sub-sampling factor.

Among top and top right neighboring samples, an array pickPosT of x-axis location information of a sample to be down-sampled may be derived as follows.

pickPosT[pos]=startPosT+pos*pickStepT, with pos=0 . . . cntT−1 numIs4N=(the prediction mode of the current block==INTRA_LT_CCLM)?0:1 startPosT=numC2SampT>>(2+numIs4N)

pickStepT=max(1,numC2SampT>>(1+numIs4N))

cntT=min(numC2SampT,(1+numIs4N)<<1))

At this time, numC2SampT may mean a value obtained by dividing the value numSampT derived in step S801 of generating the neighboring sample of the first component block by sub_width_c. If constrained intra prediction is used, when the top block is not in an intra prediction mode, numC2sampT may be regarded as 0 or cntT may be regarded as 0.

Accordingly, the locations of top and top right neighboring samples samplePosTopC2 of cntT second component blocks used to derive the cross-component parameter may be determined as follows.

x coordinate: samplePosTopC2[n]·x=pickPosT[n] with n=0 . . . cntT−1 y coordinate: samplePosTopC2[n]·y=−1

Down-sampling center locations samplePosTopC1 of cntT first component blocks corresponding thereto may be determined as follows.

x coordinate: samplePosTopC1[n]·x=pickPosT[n]*sub_width_c, with n=0 . . . cntT−1 y coordinate: samplePosTopC1[n]·y=−1*sub_height_c

An array pickPosL of y-axis location information of a sample to be down-sampled among left and bottom left neighboring samples may be derived as follows.

pickPosL[pos]=startPosL+pos*pickStepL, with pos=0 . . . cntL−1 numIs4N=(the prediction mode of the current block==INTRA_LT_CCLM)?0:1 startPosL=numC2SampL>>(2+numIs4N)

pickStepL=max(1,numC2SampL>>(1+numIs4N))

cntL=min(numC2SampL,(1+numIs4N)<<1))

At this time, numC2SampL may mean a value obtained by dividing the value numSampL derived in step S801 of generating the neighboring sample of the first component block by sub_height_c. If constrained intra prediction is used, when the left block is not in an intra prediction mode, numC2sampL may be regarded as 0 or cntL may be regarded as 0.

Accordingly, the locations of top and left and bottom left right neighboring samples samplePosLeftC2 of cntL second component blocks used to derive the cross-component parameter may be determined as follows.

x coordinate: samplePosLeftC2[n]·x=−1 y coordinate: samplePosLeftC2[n]·y=pickPosL[n]
    with n=0 . . . cntL−1

Down-sampling center locations samplePosLeftC1 of cntL first component blocks corresponding thereto may be determined as follows.

x coordinate: samplePosLeftC1[n]·x=−1*sub_width_c y coordinate: samplePosLeftC1[n]·y=pickPosL[n]
    *sub_width_c, with n=0 . . . cntL−1

Figure 16:
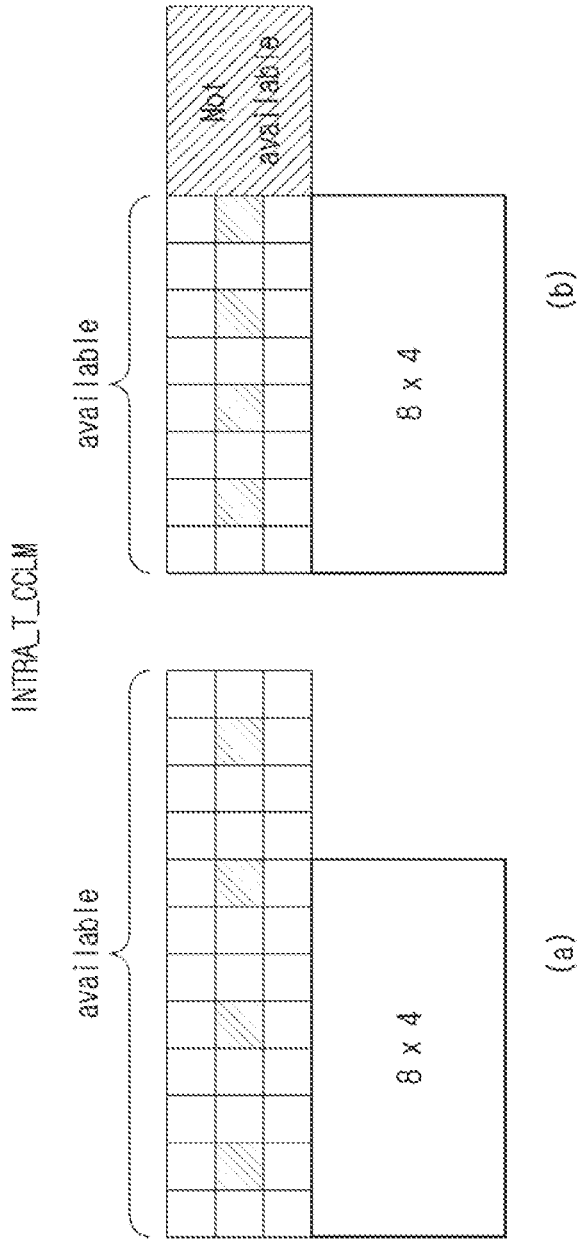
FIGS. 16 and 17 are views illustrating down-sampling center locations of a first component block according to neighboring availability information when down-sampling of a neighboring sample at a specific location is performed, according to an embodiment of the present invention.
Figure 17:
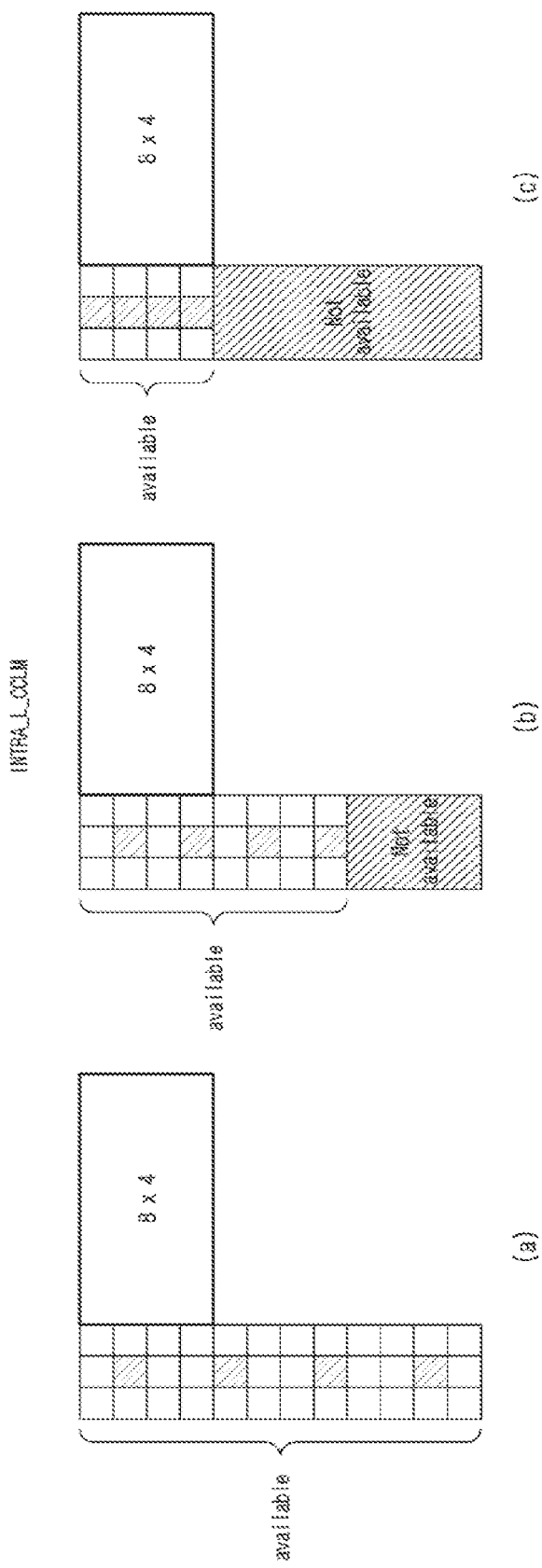

FIGS. 16 and 17 are views illustrating down-sampling center locations of a first component block according to neighboring availability information when down-sampling of a neighboring sample at a specific location is performed, according to an embodiment of the present invention. In this specification, the down-sampling center location may mean the center sample location corresponding to the center of a down-sampling filter when down-sampling is performed using the down-sampling filter.

Referring to FIGS. 16 and 17, down-sampling center locations of the first component block (e.g., a luma block) according to the neighboring availability information is shown in gray.

FIG. 16 shows the case where the first component block has a size of 8×4 and an INTRA_T_CCLM mode is used as a cross-component prediction mode. At this time, FIG. 16(*a*) shows the down-sampling center locations when all top and top right neighboring samples are available and FIG. 16(*b*) shows the down-sampling center locations (shown in gray) when only the top neighboring samples are available.

FIG. 17 shows the case where the first component block has a size of 8×4 and an INTRA_L_CCLM mode is used as a cross-component prediction mode. At this time, FIG. 17(*a*) shows the down-sampling center locations when all left and bottom left samples are available, FIG. 17(*b*) shows the down-sampling center locations when all the left neighboring samples are available and only some of the bottom left neighboring samples are available, and FIG. 17(*c*) shows the down-sampling center locations (shown in gray) when only the left neighboring samples are available.

As shown in FIGS. 16 and 17, the down-sampling center locations may vary according to the number of available neighboring samples. However, if it is assumed that the first component block has a size of 8×4 and neighboring samples are all available, when an INTRA_T_CCLM mode is used as a prediction mode, only the case of FIG. 16(*a*) always occurs and, when an INTRA_L_CCLM mode is used as a prediction mode, only the case of FIG. 17(*a*) always occurs. Therefore, the down-sampling center locations may be fixed.

At this time, the same method as the down-sampling method used in down-sampling of inner samples may be used for the neighboring samples at the specific locations selected as described above. That is, the down-sampling method of the neighboring sample may also be determined by the sub-sampling method and the sub-sampling factor of the color format.

In step S802 of performing down-sampling of the first component samples according to the embodiment of the present invention, when down-sampling is performed only with respect to the specific location of the neighboring sample, since it is assumed that a neighboring region is always available, the process of deriving the specific location may be simplified as follows.

For example, when the cross-component prediction mode of the second component block is an INTRA_LT_CCLM mode, an array pickPosT of x-axis location information of a sample to be down-sampled among top neighboring samples and an array pickPosL of y-axis location information of a sample to be down-sampled among left neighboring samples may be derived as follows.

pickPosT[pos]=startPosT+pos*pickStepT, with pos=0
    . . . cntT−1 startPosT=(nTbW>>2)

pickStepT=(nTbW>>1)

cntT=2 pickPosL[pos]=startPosL+pos*pickStepL, with pos=0
    . . . cntL−1 startPosL=(nTbH>>2)

pickStepL=(nTbH>>1)

cntL=2

As another example, when the cross-component prediction mode of the second component block is an INTRA_L_CCLM mode, an array pickPosL of y-axis location information of a sample to be down-sampled among left and bottom left neighboring samples may be derived as follows.

pickPosL[pos]=startPosL+pos*pickStepL, with pos=0
    . . . cntL−1 startPosL=(nTbH+min(nTbW,nTbH))>>3 or
    (nTbH>>2)

pickStepL=(nTbH+min(nTbW,nTbH))>>2 or
    (nTbH>>1)

cntL=4

As another example, when the cross-component prediction mode of the second component block is an INTRA_T_CCLM mode, an array pickPosT of x-axis location information of a sample to be down-sampled among top and top right neighboring samples may be derived as follows.

pickPosT[pos]=startPosT+pos*pickStepT, with pos=0
    . . . cntT−1 startPosT=(nTbW+min(nTbW,nTbH))>>3 or
    (nTbW>>2)

pickStepT=(nTbW+min(nTbW,nTbH))>>2 or
    (nTbW>1)

cntT=4

Accordingly, the locations of the top and top right samples samplePosTopC2 of cntT second component blocks used to derive the cross-component parameter may be determined as follows.

x coordinate: samplePosTopC2[$n$]·x=pickPosT[$n$]
    with $n=0 \ldots cntT-1$ y coordinate: samplePosTopC2[$n$]·y=−1

Down-sampling center locations samplePosTopC1 of cntT first component blocks corresponding thereto may be determined as follows.

x coordinate: samplePosTopC1[$n$]·x=pickPosT[$n$]
    *sub_width_c, with $n=0 \ldots cntT-1$ y coordinate: samplePosTopC1[$n$]·y=−1*sub_height_c In addition, the locations of the left and bottom left samples samplePosLeftC2 of cntL second component blocks used to derive the cross-component parameter may be determined as follows.

x coordinate: samplePosLeftC2[$n$]·x=pickPosL[$n$]
    with $n=0 \ldots cntL-1$ y coordinate: samplePosLeftC2[$n$]·y=−1

Down-sampling center locations samplePosLeftC1 of cntL first component blocks corresponding thereto may be determined as follows.

x coordinate: samplePosLeftC1[$n$]·x=pickPosL[$n$]
    sub_width_c, with $n=0 \ldots cntL-1$ y coordinate: samplePosLeftC1[$n$]·y=−1*sub_height_c Accordingly, since the locations of the neighboring samples to be down-sampled are fixed according to the type of the cross-component prediction mode or the size of the transform block, when a table is generated based on precalculated values, the sample location information may be derived using a table-driven method without performing calculation for each block.

In step S802 of performing down-sampling of the first component samples according to the embodiment of the present invention, only samples located at specific locations among the neighboring samples may be used to derive the cross-component parameter. Alternatively, a result of performing down-sampling based on the specific locations may be used to derive the cross-component parameter.

At this time, the number of specific locations may vary according to the size of the second component block. As the size of the second component block increases, the larger number of neighboring samples located at the specific locations may be used.

For example, when the number of samples of the second component block is equal to or less than 16, the number of neighboring samples located at the specific locations may be 4 and, when the number of samples of the second component block exceeds 16, the number of neighboring samples located at the specific locations may be 8.

Alternatively, syntax elements meaning the number of specific locations are transmitted as high-level syntax elements such as SPS, PPS or slice header, such that the encoder and the decoder may use the same number.

At this time, the specific locations may be calculated based on the second component block and determined as follows according to the type of the cross-component prediction mode, the neighboring availability information, the size of the transform block and/or the chroma sub-sampling factor.

An array pickPosT of x-axis location information of a sample to be down-sampled among top and top right neighboring samples may be derived as follows.

pickPosT[pos]=startPosT+pos*pickStepT, with pos=0 $\ldots cntT-1$ numIs4N=(the prediction mode of the current block==INTRA_LT_CCLM)?0:1 isGt4=(tuWidth>4)?1:0 startPosT=numC2SampT>>(2+numIs4N+isGt4)

pickStepT=max(1,numC2SampT>>(1+numIs4N+isGt4))

cntT=min(8,(the prediction mode of the current block==INTRA_LT_CCLM)?min(numC2SampT,tuWidth>>1):?min(numC2SampT,tuWidth))

At this time, numC2SampT may mean a value obtained by dividing the value numSampT derived in step S801 of generating the neighboring sample of the first component block by sub_width_c.

Accordingly, the locations of the top and top right neighboring samples samplePosTopC2 of cntT second component blocks used to derive the cross-component parameter may be determined as follows.

x coordinate: samplePosTopC2[$n$]·x=pickPosT[$n$]
    with $n=0 \ldots cntT-1$ y coordinate: samplePosTopC2[$n$]·y=−1

Down-sampling center locations samplePosTopC1 of cntT first component blocks corresponding thereto may be determined as follows.

x coordinate: samplePosTopC1[$n$]·x=pickPosT[$n$]
    *sub_width_c, with $n=0 \ldots cntT-1$ y coordinate: samplePosTopC1[$n$]·y=−1*sub_height_c An array pickPosL of y-axis location information of a sample to be down-sampled among left and bottom left neighboring samples may be derived as follows.

pickPosL[pos]=startPosL+pos*pickStepL, with pos=0 $\ldots cntL-1$ numIs4N=(the prediction mode of the current block==INTRA_LT_CCLM)?0:1 isGt4=(tuHeight>4)?1:0 startPosL=numC2SampL>>(2+numIs4N+isGt4)

pickStepL=max(1,numC2SampL>>(1+numIs4N+isGt4))

cntL=min(8,(the prediction mode of the current block==INTRA_LT_CCLM)?min(numC2SampL,tuHeight>>1):?min(numC2SampL,tuHeight))

At this time, numC2SampL may mean a value obtained by dividing the value numSampL derived in step S801 of generating the neighboring sample of the first component block by sub_height_c.

Accordingly, the locations of the left and bottom left samples samplePosLeftC2 of cntL second component blocks used to derive the cross-component parameter may be determined as follows.

$x$ coordinate: samplePosLeftC2[$n$]·$x$=−1

$y$ coordinate: samplePosLeftC2[$n$]·$y$=pickPosL[$n$]
   with $n$=0 . . . cntL−1

Down-sampling center locations samplePosLeftC1 of cntL first component blocks corresponding thereto may be determined as follows.

$x$ coordinate: samplePosLeftC1[$n$]·$x$=−1*sub_width_c $y$ coordinate: samplePosLeftC1[$n$]·$y$=pickPosL[$n$]
   *sub_width_c, with $n$=0 . . . cntL−1

In step S802 of performing down-sampling of the first component samples according to the embodiment of the present invention, only neighboring samples located at specific locations among the neighboring samples may be used to derive the cross-component parameter. Alternatively, when a result of performing down-sampling based on the specific locations may be used to derive the cross-component parameter, since it is assumed that the neighboring region is always valid, the process of deriving the specific locations may be simplified as follows.

For example, when the cross-component prediction mode of the second component block of the current block is an INTRA_LT_CCLM mode, an array pickPosT of x-axis location information of a sample to be down-sampled among top neighboring samples and an array pickPosL of y-axis location information of a sample to be down-sampled among left neighboring samples may be derived as follows.

pickPosT[pos]=startPosT+pos*pickStepT, with pos=0 . . . cntT−1 isGt4=($tu$Width>4)?1:0 startPosT=($nTbW$>>(2+isGt4))

pickStepT=($nTbW$>>(1+isGt4))

cntT=min(8,$tu$Width>>1)

pickPosL[pos]=startPosL+pos*pickStepL, with pos=0 . . . cntL−1 isGt4=($tu$Height>4)?1:0 startPosL=($nTbH$>>(2+isGt4))

pickStepL=($nTbH$>>(1+isGt4))

cntL=min(8,$tu$Height>>1)

As another example, when the cross-component prediction mode of the second component block of the current block is an INTRA_L_CCLM mode, an array pickPosL of y-axis location information of a sample to be down-sampled among left and bottom left neighboring samples may be derived as follows.

pickPosL[pos]=startPosL+pos*pickStepL, with pos=0 . . . cntL−1 isGt4=($tu$Height>4)?1:0 startPosL=($nTbH$+min($nTbW,nTbH$))>>(3+isGt4)) or
   ($nTbH$>>(2+isGt4))

pickStepL=($nTbH$+min($nTbW,nTbH$))>>(2+isGt4)) or
   ($nTbH$>>(1+isGt4))

cntL=min(8,$tu$Width)

As another example, when the cross-component prediction mode of the second component block of the current block is an INTRA_T_CCLM mode, an array pickPosT of x-axis location information of a sample to be down-sampled among top and top right neighboring samples may be derived as follows.

pickPosT[pos]=startPosT+pos*pickStepT, with pos=0 . . . cntT−1 isGt4=($tu$Height>4)?1:0 startPosT=($nTbW$+min($nTbW,nTbH$))>>(3+isGt4)) or
   ($nTbW$>>(2+isGt4))

pickStepT=($nTbW$+min($nTbW,nTbH$))>>(2+isGt4)) or
   ($nTbW$>>(1+isGt4))

cntT=min(8,$tu$Height)

Accordingly, the locations of the top and top right samples samplePosTopC2 of cntT second component blocks used to derive the cross-component parameter may be determined as follows.

$x$ coordinate: samplePosTopC2[$n$]·$x$=pickPosT[$n$]
   with $n$=0 . . . cntT−1

$y$ coordinate: samplePosTopC2[$n$]·$y$=−1

Down-sampling center locations samplePosTopC1 of cntT first component blocks corresponding thereto may be determined as follows.

$x$ coordinate: samplePosTopC1[$n$]·$x$=pickPosT[$n$]
   *sub_width_c, with $n$=0 . . . cntT−1

$y$ coordinate: samplePosTopC1[$n$]·$y$=−1*sub_height_c

In addition, the locations of the left and bottom left samples samplePosLeftC2 of cntL second component blocks used to derive the cross-component parameter may be determined as follows.

$x$ coordinate: samplePosLeftC2[$n$]·$x$=pickPosL[$n$]
   with $n$=0 . . . cntL−1

$y$ coordinate: samplePosLeftC2[$n$]·$y$=−1

Down-sampling center locations samplePosLeftC1 of cntL first component blocks corresponding thereto may be determined as follows.

$x$ coordinate: samplePosLeftC1[$n$]·$x$=pickPosL[$n$]
   *sub_width_c, with $n$=0 . . . cntL−1

$y$ coordinate: samplePosLeftC1[$n$]·$y$=−1*sub_height_c

Accordingly, since the locations of the neighboring samples to be down-sampled are fixed according to the type of the cross-component prediction mode or the size of the transform block, when a table is generated based on precalculated values, the sample location information may be derived using a table-driven method without performing calculation for each block.

Step S802 of performing down-sampling of the first component samples according to the embodiment of the present invention may be omitted. That is, the neighboring samples of the first component block corresponding to the locations of the derived samples to be down-sampled may be used in step S803 of deriving the cross-component parameter without the down-sampling process.

Step S802 may be omitted only when the number of samples of the relatively small block, that is, the second component block, is equal to or less than a threshold equally defined in the encoder/decoder.

That is, when the number of samples of the second component block exceeds the threshold, down-sampling of the neighboring samples of the first component block may be performed.

When down-sampling of the inner samples of the first component block is performed, if the neighboring sample are not available, down-sampling may be performed after at least one closest inner sample is used for padding to generate neighboring samples. At this time, down-sampling may be performed using a single down-sampling filter.

Hereinafter, step S803 of deriving the cross-component parameter will be described.

In step S803 of deriving the cross-component parameter according to the embodiment of the present invention, at least one neighboring sample of the second component block and at least one neighboring sample of the first component block region corresponding to the second component block region may be used to derive one or more parameters of a predefined linear or nonlinear relational expression.

For example, among the neighboring samples of the second component block, only at least one specific location samples samplePosLeftC2 may be used to derive at least one parameter. Down-sampled neighboring samples of the first component block region corresponding to the specific location may be used to derive at least one parameter.

As another example, in the previous step, on the assumption that the neighboring samples are always valid, only a fixed number (e.g., F, at this time, F is a non-zero positive integer) of neighboring samples of the second component neighboring block may be used to derive at least one parameter. In addition, a fixed number (e.g., F) of samples among the down-sampled neighboring samples of the first component block region may be used to derive at least one parameter.

As another example, only neighboring samples of the second component block located at a fixed number of specific locations may be used to derive at least one parameter. In addition, samples located at a fixed number of specific locations among the down-sampled neighboring samples of the first component block region may be used to derive at least one parameter.

As another example, among down-sampled first component samples corresponding to the neighboring samples of the second component block, a max_c1 sample set including N higher samples obtained by aligning sample values located at a fixed number of specific locations in descending order and a min_c1 sample set including M higher samples obtained by aligning sample values located at a fixed number of specific locations in ascending order may be used to derive at least one parameter. At this time, M and N may be non-zero positive integers.

In addition, a max_c2 sample set including N samples of the second component block region corresponding to the sample location of the max_c1 sample set and a min_c2 sample set including M samples of the second component block region corresponding to the sample location of the min_c1 sample set may be used to derive at least one parameter. At this time, M and N may be non-zero positive integers.

At this time, the specific location may be derived in step S802 of performing down-sampling of the first component samples and may be changed according to at least one of the width and height of the transform block (or the coding block), a color format, a sub-sampling method of a chroma signal or the type of a cross-component prediction mode.

As another example, a statistical value such as an average value, a maximum value and/or a minimum value of the samples in the sample set (e.g., max_c1, max_c2, min_c1 and min_c2) may be used to derive at least one parameter of a predefined linear or nonlinear relational expression.

As another example, at least one of the sample sets may be used to derive at least one parameter of a predefined linear or nonlinear relational expression.

As another example, when the YUV color format is used, the location information of the max_c1 and min_c1 sample sets of the Y component may be used to derive the max_c2 and min_c2 sample sets of the U component and the max_c2 and min_c2 sample sets of the V component.

As another example, among the neighboring samples of the second component block, a max_c2 sample set including N higher samples obtained by aligning sample values samplePosLeftC2 located at a fixed number of specific locations in descending order and a min_c2 sample set including M higher samples obtained by aligning sample values located at a fixed number of specific locations in ascending order may be used to derive at least one parameter. At this time, M and N may be non-zero positive integers.

In addition, a max_c1 sample set including N samples of the down-sampled first component block region corresponding to the sample location of the max_c2 sample set and a min_c1 sample set including M samples of the down-sampled first component block region corresponding to the sample location of the min_c2 sample set may be used to derive at least one parameter. At this time, M and N may be non-zero positive integers.

As another example, When the YUV color format is used, the location information of the max_c2 and min_c2 sample set of the U or V component may be used to derive the max_c1 and min_c1 sample sets of the Y component.

In step S803 of deriving the cross-component parameter according to the embodiment of the present invention, when the cross-component prediction mode is used in the current block, on the assumption that the neighboring samples are always available, one or more parameters of a predefined linear or nonlinear relational expression may be derived for a fixed number of neighboring samples.

At this time, the neighboring sample used to derive the parameter may have a location fixed according to the size of the transform coefficient and may be a virtual sample generated in step S801 of generating the neighboring sample of the first component block.

For example, the at least one sample set and the following simplified linear relational expression may be used to derive at least one of parameters k, a and b for the cross-component prediction of the second component block.

$$\text{diff} = \text{avg\_max}\_c1 - \text{avg\_min}\_c1$$

At this time, avg_max_c1 may be an average value of at least one sample of the max_c1 sample set. In addition, avg_min_c1 may be an average value of at least one sample of the min_c1 sample set.

If diff is not 0, $$\text{diffC} = \text{avg\_max}\_c2 - \text{avg\_min}\_c2$$

At this time, avg_max_c2 may be an average value of at least one sample of the max_c2 sample set. In addition, avg_min_c2 may be an average value of at least one sample of the min_c2 sample set.

$$x=\text{Floor}(\text{Log }2(\text{diff}))$$

$$\text{normDiff}=((\text{diff}<<4)>>x)\ \&\ 15$$

$$x+=(\text{normDiff}!=0)?1:0$$

$$y=\text{Floor}(\text{Log }2(\text{Abs}(\text{diffC})))+1$$

$$a=(\text{diffC}*(\text{divSigTable}[\text{normDiff}]|8)+2^{y-1})>>y$$

$$k=((3+x-y)<1)?1:3+x-y$$

$$a=((3+x-y)<1)?\text{Sign}(a)*15: a$$

$$b=\text{avg\_min\_c2}-((a*\text{avg\_min\_c1})>>k)$$

where divSigTable[ ]={0, 7, 6, 5, 5, 4, 4, 3, 3, 2, 2, 1, 1, 1, 1, 0}
If diff is 0,
k=0
a=0
b=avg_min_c2

For example, when the YUV color format is used, avg_max_c1 and avg_min_c1 sample sets corresponding to the Y component and avg_max_c2 and avg_min_c2 sample sets corresponding to the U component may be used to derive parameters for cross-component prediction of the U component block.

In addition, when the YUV color format is used, avg_max_c1 and avg_min_c1 sample sets corresponding to the Y component and avg_max_c2 and avg_min_c2 sample sets corresponding to the V component may be used to derive parameters for cross-component prediction of the V component block.

Hereinafter, step S804 of generating the prediction sample of the second component block will be described.

In step S804 of generating the prediction sample of the second component block according to the embodiment of the present invention, the cross-component parameter derived in step S803 may be used to generate the prediction samples of the second component block.

For example, at least one of the cross-component parameters k, a and b and the derived down-sampled first component sample block ds_c1 may be used to generate the prediction samples pred_samples of the second component block having a size of N×M as shown in the following equation.

$$\text{pred\_samples}[x][y]=\text{Clip1}C(((\text{ds\_c1}[x][y]*a)>>k)+b),$$
$$\text{with }x=0\ldots N-1, y=0\ldots M-1$$

At this time, Clip1C(x)=Clip3(0, (1<<bit_depth_c2)−1, x),

Here, bit_depth_c2 is a value indicating the bit depth of the second component, and Clip3(x,y,z) may be a function for clipping a z value to have a range from x to y.

Figure 18:
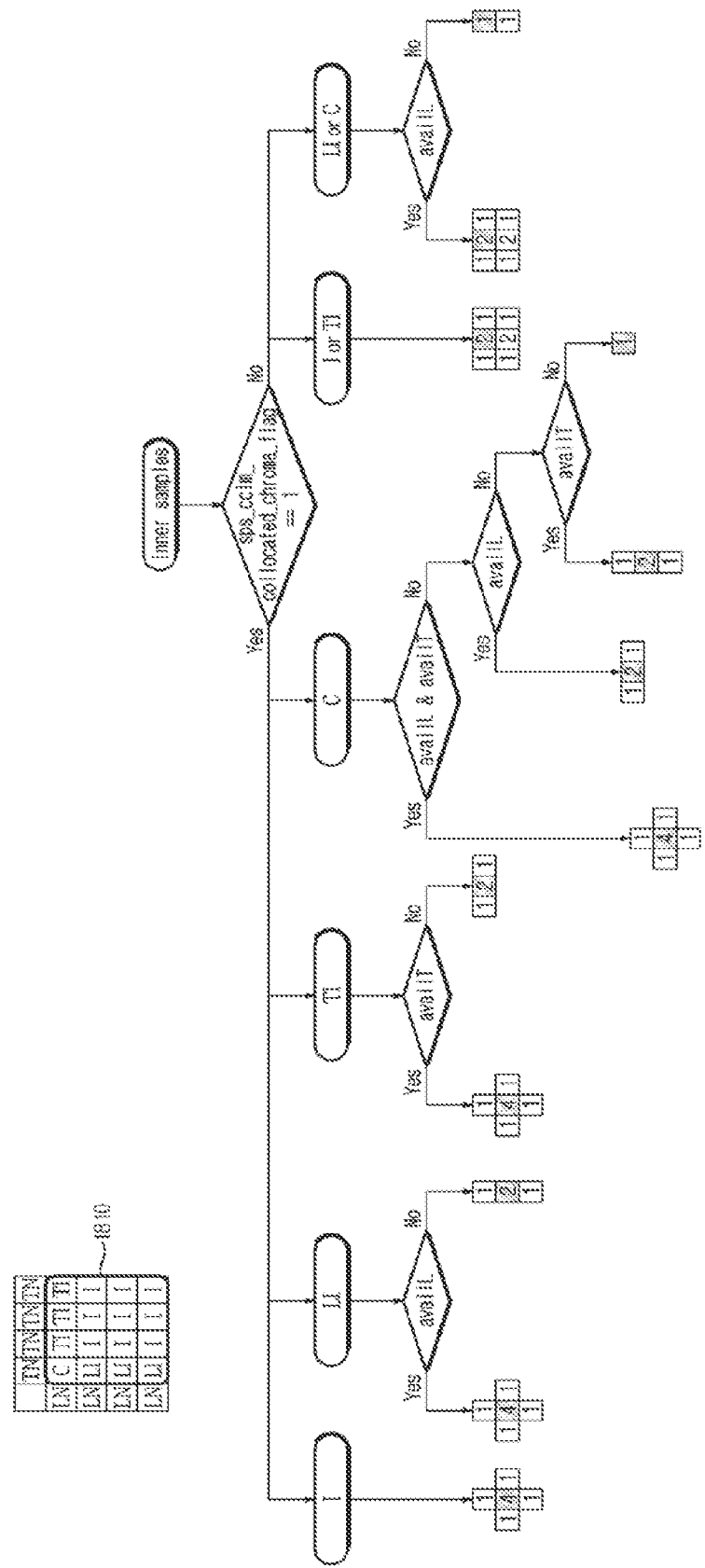
FIGS. 18 and 19 are flowcharts illustrating a down-sampling process of inner samples of a first component block according to an embodiment of the present invention.
Figure 19:
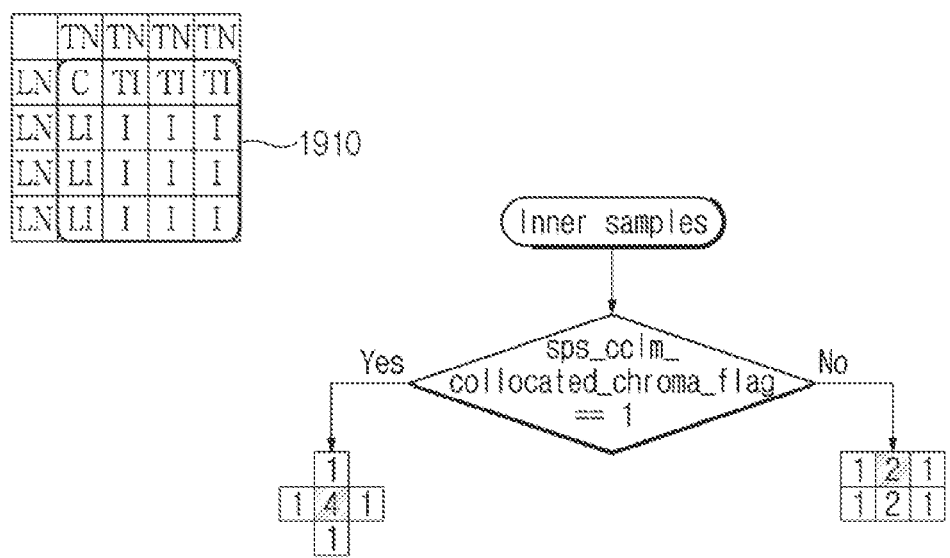

FIGS. 18 and 19 are flowcharts illustrating a down-sampling process of inner samples of a first component block according to an embodiment of the present invention.

In FIGS. 18 and 19, the center location of a sample to be down-sampled is shown in gray and a number written in each sample (e.g., 1, 2 or 4) may mean a weight. Here, the weight may mean the filter coefficient of a down-sampling filter.

Referring to FIG. 18, the locations of the inner samples of the first component block may be divided into four groups (e.g., C, TI, LI and I) (1810). At this time, TN denotes the location of a top neighboring sample and LN may indicate the location of a left neighboring sample. In addition, Inner samples of FIG. 18 mean the inner samples of the block.

In addition, the type of the filter used for down-sampling, the form of the filter, the length of the filter, the size of the filter and/or the filter coefficient may vary according to the value of the syntax element sps_cclm_colocated_chroma_flag meaning the sub-sampling method of the chroma block, the location of each inner sample, availability availL of a left sample and availability availT of a top sample. At this time, the form of the filter may be used as the same meaning as the shape of the filter.

For example, as shown in FIG. 18, when the value of sps_cclm_colocated_chroma_flag is "1" (or a first value) and the inner sample of the first component block is classified as a C group, the type of the filter used for down-sampling, the form of the filter, the length of the filter, the size of the filter and/or the filter coefficient may be changed according to the value of availL and/or availT. If the inner sample is classified as the C group and both availL and availT are "Yes", down-sampling may be performed using a value obtained by applying a weight of 4 to a center sample to be down-sampled and applying a weight of 1 to the top, left, right and bottom samples of the center sample to be down-sampled. If availL is "Yes" and availT is "No", down-sampling may be performed using a value obtained by applying a weight of 2 to a center sample to be down-sampled and applying a weight of 1 to the left and right samples of the center sample to be down-sampled. If availL is "No" and availT is "Yes", down-sampling may be performed using a value obtained by applying a weight of 2 to a center sample to be down-sampled and applying a weight of 1 to the top and bottom samples of the center sample to be down-sampled. If both availL and availT are "No", down-sampling may be performed using a value obtained by applying a weight of 1 to a center sample to be down-sampled.

In addition, referring to FIG. 19, similarly to FIG. 18, the locations of the inner samples of the first component block may be classified into four groups (e.g., C, TI, LI and I) (1910). In contrast, in FIG. 19, unlike FIG. 18, at least one of the type of the filter, the form of the filter, the length of the filter, the size of the filter and/or the filter coefficient may be changed only by the value of the syntax element sps_cclm_colocated_chroma_flag meaning the sub-sampling method of the chroma block.

For example, as shown in FIG. 19, if the value of sps_cclm_colocated_chroma_flag is "1" (or a first value), down-sampling may be performed using a value obtained by applying a weight of 4 to a center sample to be down-sampled and applying a weight of 1 to the top, left, right and bottom samples of the center sample to be down-sampled. If the value of sps_cclm_colocated_chroma_flag is "0" (or a second value), down-sampling may be performed using a value obtained by applying a weight of 2 to a center sample to be down-sampled, applying a weight of 1 to the left, right and bottom left and bottom right samples of the center sample to be down-sampled and applying a weight of 2 to the bottom sample of the center sample to be down-sampled.

Accordingly, according to the embodiment of the present invention, it is possible to simplify down-sampling of the inner samples of the first component block region. In addition, since the same down-sampling filter is applicable to all sample locations and a conditional branch condition is removed, parallel processing may be more easily implemented.

Figure 20:
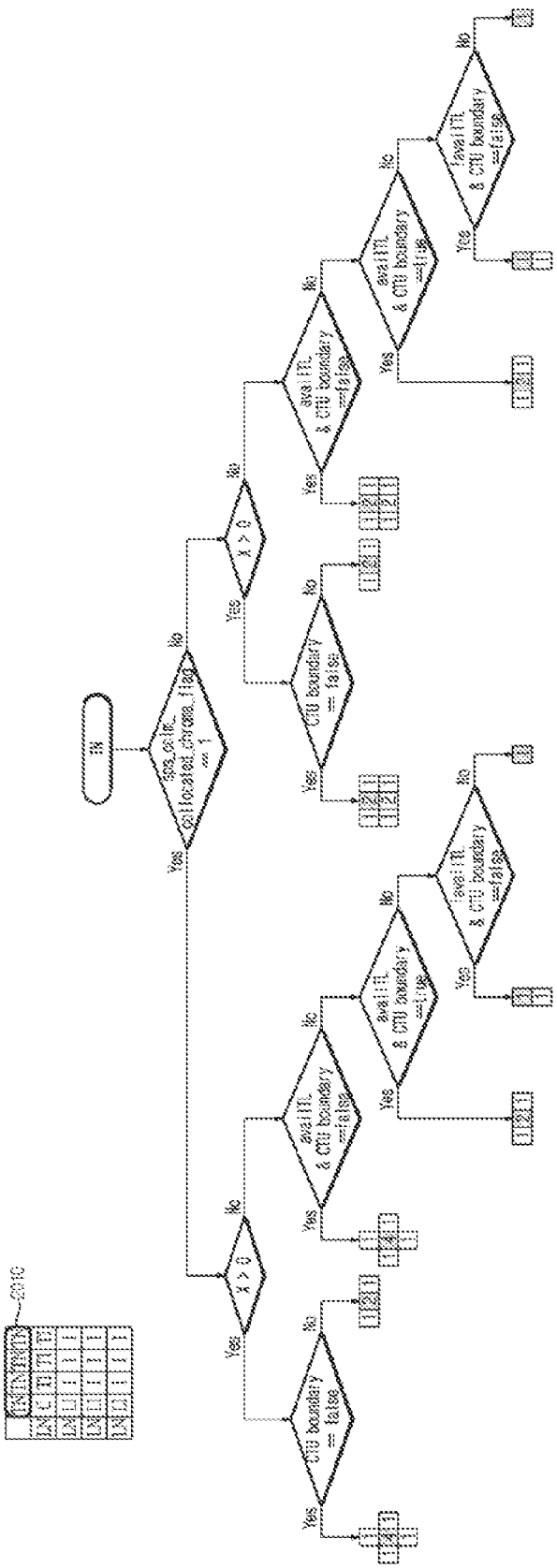
FIGS. 20 and 21 are flowcharts illustrating a down-sampling process of top neighboring samples of a first component block according to an embodiment of the present invention.
Figure 21:
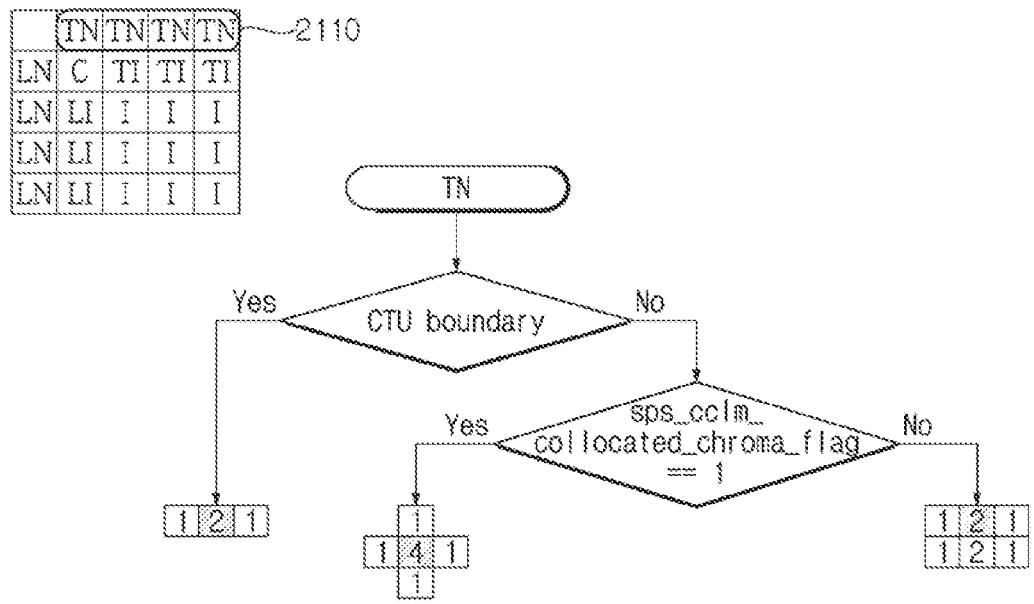

FIGS. 20 and 21 are flowcharts illustrating a down-sampling process of top neighboring samples of a first component block according to an embodiment of the present invention.

In FIGS. 20 and 21, the center location of the sample to be down-sampled is shown in gray and a number written in each sample (e.g., 1, 2 or 4) may mean a weight. Here, the weight may mean the filter coefficient of a down-sampling filter.

Referring to FIG. 20, the top neighboring sample of the first component block may be denoted by TN (2010).

In addition, the type of the filter, the form of the filter, the length of the filter, the size of the filter and/or the filter coefficient used for down-sampling may be changed according to whether the X-axis location of the location where down-sampling will be performed is greater than 0 in the first component block (X>0), the value of a syntax element sps_cclm_colocated_chroma_flag meaning the sub-sampling method of the chroma block, whether the location where down-sampling will be performed is a CTU boundary and availability availTL of the top left sample.

For example, as shown in FIG. 20, when the value of sps_cclm_colocated_chroma_flag is "1" (or a first value) and the X-axis location of the location where down-sampling will be performed is greater than 0 in the first component block (X>0), the type of the filter used for down-sampling, the form of the filter, the length of the filter, the size of the filter and/or the filter coefficient may be changed according to whether the location where down-sampling will be performed is a CTU boundary. If the location where down-sampling will be performed is not a CTU boundary (if the CTU boundary value is "FALSE"), down-sampling may be performed using a value obtained by applying a weight of 4 to a center sample to be down-sampled and applying a weight of 1 to the top, left, right and bottom samples of the center sample to be down-sampled. If the location where down-sampling will be performed is a CTU boundary (if the CTU boundary value is "TRUE"), down-sampling may be performed using a value obtained by applying a weight of 2 to a center sample to be down-sampled and applying a weight of 1 to the left and right samples of the center sample to be down-sampled.

In contrast, referring to FIG. 21, unlike FIG. 20, at least one of the type of the filter, the form of the filter, the length of the filter, the size of the filter and/or the filter coefficient may be changed only by the value of the syntax element sps_cclm_colocated_chroma_flag meaning the sub-sampling method of the chroma block and/or whether the location where down-sampling will be performed is a CTU boundary.

For example, as shown in FIG. 21, if the location where down-sampling will be performed is a CTU boundary (if the CTU boundary value is "TRUE"), down-sampling may be performed using a value obtained by applying a weight of 2 to a center sample to be down-sampled and applying a weight of 1 to the left and right samples of the center sample to be down-sampled. If the location where down-sampling will be performed is not a CTU boundary (if the CTU boundary value is "FALSE") and the value of sps_cclm_colocated_chroma_flag is "1" (or a first value), down-sampling may be performed using a value obtained by applying a weight of 4 to a center sample to be down-sampled and applying a weight of 1 to the top, left, right and bottom samples of the center sample to be down-sampled. If the location where down-sampling will be performed is not a CTU boundary (if the CTU boundary value is "FALSE") and the value of sps_cclm_colocated_chroma_flag is "0" (or a second value), down-sampling may be performed using a value obtained by applying a weight of 2 to a center sample to be down-sampled, applying a weight of 1 to the left, right, bottom left and bottom right samples of the center sample to be down-sampled and applying a weight of 2 to the bottom sample of the center sample to be down-sampled.

According to the embodiment of the present invention, it is possible to simplify down-sampling of the top neighboring samples of the first component block region. In addition, since the same down-sampling filter is applicable to all sample locations and a conditional branch condition is removed, parallel processing may be more easily implemented.

Figure 22:
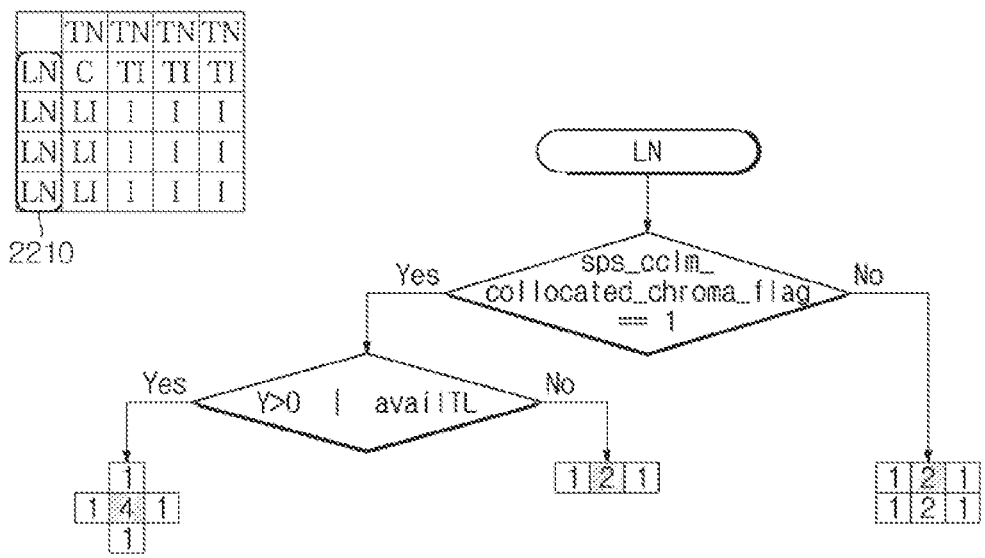
FIGS. 22 and 23 are flowcharts illustrating a down-sampling process of a left neighboring sample of a first component block according to an embodiment of the present invention.
Figure 23:
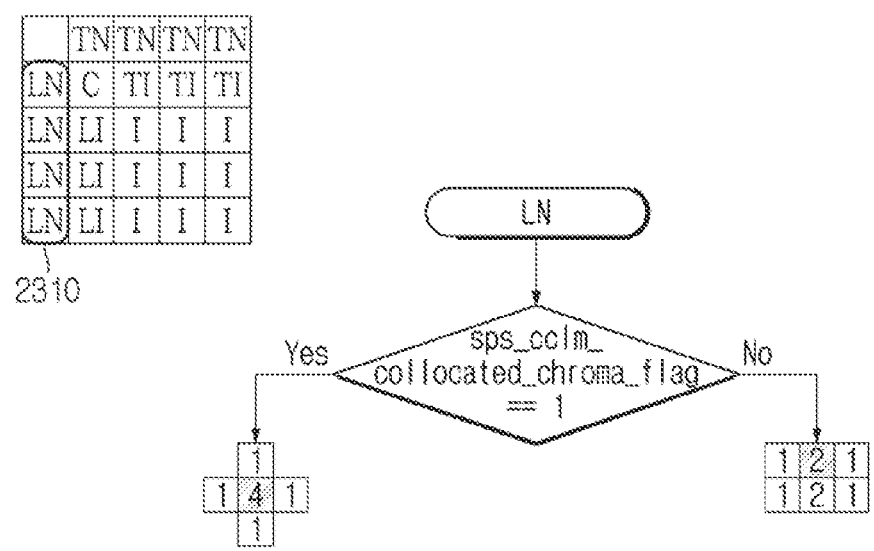

FIGS. 22 and 23 are flowcharts illustrating a down-sampling process of a left neighboring sample of a first component block according to an embodiment of the present invention.

In FIGS. 22 and 23, the center location of the sample to be down-sampled is shown in gray and a number written in each sample (e.g., 1, 2 or 4) may mean a weight. Here, the weight may mean the filter coefficient of a down-sampling filter.

Referring to FIG. 22, the left neighboring sample of the first component block may be denoted by LN (2210).

In addition, the type of the filter, the form of the filter, the length of the filter, the size of the filter and/or the filter coefficient used for down-sampling may be changed according to whether the Y-axis location of the location where down-sampling will be performed is greater than 0 in the first component block (Y>0), the value of a syntax element sps_cclm_colocated_chroma_flag meaning the sub-sampling method of the chroma block and availability availTL of the top left sample.

For example, as shown in FIG. 22, when the value of sps_cclm_colocated_chroma_flag is "0" (or a second value), that is, when the value of sps_cclm_colocated_chroma_flag is not "1", down-sampling may be performed using a value obtained by applying a weight of 2 to a center sample to be down-sampled, applying a weight of 1 to the left, right, bottom left and bottom right samples of the center sample to be down-sampled and applying a weight of 2 to the bottom sample of the center sample to be down-sampled. If the value of sps_cclm_colocated_chroma_flag is "1" (or a first value), the type of the filter used for down-sampling, the form of the filter, the length of the filter, the size of the filter and/or the filter coefficient may be changed according to whether the Y-axis location of the location where down-sampling will be performed is greater than 0 in the first component block (Y>0) and availability availTL of the top left neighboring sample.

In contrast, referring to FIG. 23, unlike FIG. 22, at least one of the type of the filter, the form of the filter, the length of the filter, the size of the filter and/or the filter coefficient may be changed only by the value of the syntax element sps_cclm_colocated_chroma_flag meaning the sub-sampling method of the chroma block.

For example, as shown in FIG. 23, if the value of sps_cclm_colocated_chroma_flag is "1" (or a first value), down-sampling may be performed using a value obtained by applying a weight of 4 to a center sample to be down-sampled and applying a weight of 1 to the top, left, right and bottom samples of the center sample to be down-sampled. If the value of sps_cclm_colocated_chroma_flag is "0" (or a second value), that is, if the value of sps_cclm_colocated_chroma_flag is not "1", down-sampling may be performed using a value obtained by applying a weight of 2 to a center sample to be down-sampled, applying a weight of 1 to the left, right, bottom left and bottom right samples of the center sample to be down-sampled, and applying a weight of 2 to the bottom sample of the center sample to be down-sampled.

According to the embodiment of the present invention, it is possible to simplify down-sampling of the left neighboring samples of the first component block region. In addition, since the same down-sampling filter is applicable to all sample locations and a conditional branch condition is removed, parallel processing may be more easily implemented.

At least one of the embodiments of the present invention may be applied to all types of intra prediction modes, thereby simplifying the processes of the intra prediction modes. For example, one embodiment of the present invention is applicable to a matrix-based intra prediction (MIP) mode.

The MIP mode is a method of generating a prediction sample of a current block by multiplying pre-decoded neighboring samples and a predefined or pre-transmitted matrix.

However, even in the MIP mode, similarly to another intra prediction mode, a neighboring sample may not be available. Accordingly, when unavailable samples are generated as virtual samples using available samples during intra prediction, neighboring samples may be always available and thus the prediction samples of the current block may be generated through the MIP mode using a simplified method without determining availability of the neighboring samples.

That is, the neighboring sample generation process may be performed before prediction using the MIP mode is performed, such that the neighboring samples which are reference samples may be always available. Prediction using the MIP mode may be performed using the available neighboring samples. The neighboring sample generation process may mean a process of generating unavailable samples using available samples and may be referred to as a reference sample generation process. In addition, the neighboring sample generation process may include at least one of an availability determination process or a sample replacement process.

For intra prediction, at least one of encoding/decoding methods (e.g., MIP, ISP, Angular Intra Mode, etc.) related to at least one intra prediction mode may share the generated neighboring samples. Here, ISP may mean an Intra Sub-Partition mode and Angular Intra Mode may mean an intra prediction mode in which intra prediction is performed according to an angle.

That is, a neighboring sample generation process of generating neighboring samples which are reference samples before prediction using at least one of the MIP mode, the ISP mode or the Angular Intra Mode is performed, such that the neighboring samples are always available.

In addition, the encoding/decoding method related to the intra prediction mode sharing the generated neighboring samples may mean that the generated neighboring samples are equally used in the encoding/decoding methods related to the intra prediction mode. That is, the methods of generating the neighboring samples may be the same in the encoding/decoding methods related to the intra prediction mode.

At this time, the length of the left neighboring sample may be set to twice the height of the transform block (or the coding block) and the length of the top neighboring sample may be set to twice the width of the transform block (or the coding block).

Alternatively, the length of the left neighboring sample may be set to a sum of the height and width of the transform block (or the coding block) and the length of the top neighboring sample may be set to a sum of the width and height of the transform block (or the coding block).

Accordingly, the neighboring samples may be composed of left neighboring samples, top neighboring samples and one top left neighboring sample.

According to one embodiment of the present invention, the length of the neighboring sample to be generated may vary according to the intra prediction mode. In this case, at least one of the encoding/decoding methods (e.g., the MIP mode, the ISP mode, the Angular Intra Mode, etc.) related to the intra prediction mode may generate neighboring samples to perform intra prediction. At this time, the neighboring sample may be used as the same meaning as the reference sample.

At this time, when the Angular Intra Mode is used as the intra prediction mode, the length of each of the top and left neighboring samples may be set to twice the width and height of the transform block (or the coding block).

In addition, when the MIP mode is used as the intra prediction mode, the lengths of the top and left neighboring samples may be set through various methods.

For example, when the MIP mode is used, the length of the left neighboring sample may be set to the height of the transform block (or the coding block)+1, and the length of the top neighboring sample may be set to the width of the transform block (or the coding block)+1. To this end, even if a sample is not available because the top or left is a picture, subpicture, slice or tile boundary, the sample value located at the top right or bottom left may be used to generate top or left neighboring samples.

As another example, when the MIP mode is used, the length of the left neighboring sample may be set to the height of the transform block (or the coding block) and the length of the top neighboring sample may be set to the width of the transform block (or the coding block)+1 or the length of the top neighboring sample may be set to twice the width of the transform block (or the coding block). To this end, even if a sample is not available because the top or left is a picture, subpicture, slice or tile boundary, the sample value located at the top right may be used to generate top or left neighboring samples.

Alternatively, if the MIP mode, the Angular Intra Mode, the DC mode or the Planar mode is used, the length of the left neighboring sample may be set to twice the height of the transform block, and the length of the top neighboring sample may be set to twice the width of the transform block.

In addition, when the Intra Sub-Partition (ISP) mode is used, the length of the left neighboring sample may be set to a sum of the height of the transform block and the height of the coding block, and the length of the top neighboring sample may be set to a sum of the width of the transform block and the width of the coding block.

Figure 24:
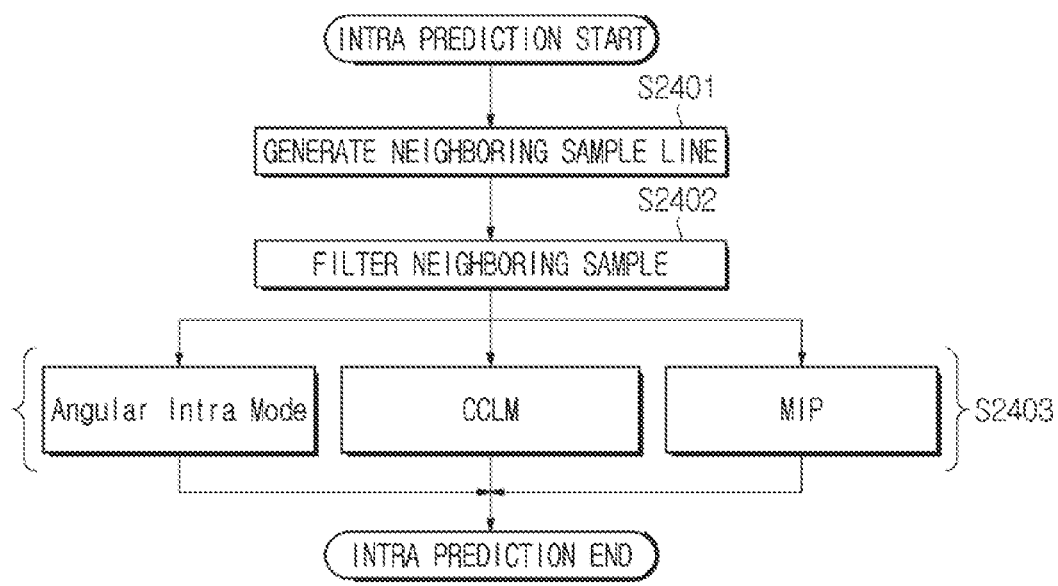
FIG. 24 is a view illustrating a process of generating a virtual sample using an available neighboring sample when an unavailable sample is present in neighboring samples, according to an embodiment of the present invention.

FIG. 24 is a view illustrating a process of generating a virtual sample using an available neighboring sample when an unavailable sample is present in neighboring samples, according to an embodiment of the present invention.

Referring to FIG. 24, intra prediction according to the embodiment of the present invention may include step S2401 of generating a neighboring sample line, step S2402 of filtering a neighboring sample and step S2403 of performing intra prediction. At this time, in step S2403 of performing intra prediction, at least one of intra prediction modes including an Angular Intra Mode, a CCLM (Cross-Component Linear Model) mode or an MIP mode may be used. As a result of performing step S2403, an intra prediction sample may be generated.

When at least one of neighboring samples is not available before each intra prediction mode is used to perform intra prediction, virtual samples may be generated using available samples.

At this time, when at least one of neighboring samples is not available, an availability determination process and a sample replacement process which may be used in a general intra prediction mode may be performed.

For example, when the intra prediction of the current block is an MIP mode, the reference sample of the MIP mode may be configured from the neighboring samples of the current block in order to perform the MIP mode. The configuration of the reference sample of the MIP mode may be performed similarly to the configuration of the reference sample of general intra prediction mode. For example, when the reference sample of the MIP mode is configured from the neighboring samples of the current block, whether the neighboring samples are available may be first determined. Thereafter, the reference sample of the MIP mode may be configured by replacing unavailable neighboring samples with available neighboring samples.

Accordingly, when the current prediction mode is an intra prediction mode, the encoder/decoder may commonly generate a neighboring sample line for all modes (S2401), perform neighboring sample filtering (S2402) and generate intra prediction samples according to each mode (S2403). At this time, the lengths of neighboring samples to be generated, whether multi neighboring sample lines are generated and/or whether the generated samples are filtered may vary according to the intra prediction mode. Here, the multi neighboring sample lines may mean two or more neighboring sample lines. One of the two or more neighboring sample lines may be used for intra prediction. That is, the multi neighboring sample lines may mean multiple reference lines (MRLs).

FIG. 25 is a view showing an embodiment in which a syntax element related to multiple reference lines (MRLs) is simplified, according to an embodiment of the present invention.

According to the embodiment of the present invention, if the multiple reference lines (MRLs) are used for intra prediction, reconstructed samples of one closest line at the top are used when neighboring sample lines of the blocks located at the CTU top boundary are generated, and second, third and fourth neighboring sample lines may be generated through a process of padding the closest line at the top. When intra prediction through MRL is performed with respect to all blocks, encoding/decoding may be performed regardless of whether it is a CTU boundary. Accordingly, it is possible to improve compression efficiency, and, when a conditional statement regarding whether it is a CTU boundary is removed when the MRL syntax element is encoded/decoded, it is possible to improve a parsing processing rate of the syntax element.

For example, referring to FIG. 25, a condition (e.g., ((y0% CtbSizeY)>0)) regarding whether it is a CTU boundary related to whether a syntax element intra_luma_ref_idx is transmitted may be removed.

Referring to FIG. 25, MRL enabled information sps_mrl_enabled_flag signaled in at least one of parameter sets may indicate whether intra prediction using MRL is available. For example, if the MRL enabled information indicates a specific value (e.g., "1"), the multi neighboring samples lines may be used when intra prediction is performed with respect to the current block.

In addition, a neighboring sample line indicator intra_luma_ref_idx may be an indicator for determining a neighboring sample line when intra prediction using MRL is used. At this time, the neighboring sample line indicator may be used as the same meaning as a reference sample line indicator.

In addition, a block partition indicator intra_subpartitions_mode_flag may indicate whether the current block subjected to intra prediction is partitioned. That is, the block partition indicator may indicate whether an intra sub-partition (ISP) mode is used.

In addition, a block partition direction indicator intra_subpartitions_split_flag may indicate whether the partitioning direction of the current block subjected to intra prediction is a horizontal direction or a vertical direction. At this time, the block partition direction indicator may be signaled when the block partition indicator indicates "partition".

Referring to FIG. 25, in the embodiment of the present invention, a condition (e.g., ((y0 CtbSizeY)>0)) regarding whether it is a CTU boundary related to whether a neighboring sample line indicator is signaled may be removed, thereby improving the parsing processing rate of the syntax element.

The cross-component prediction according to the present invention has been described above and the present invention may include various variations of performing cross-component prediction based on the above description.

FIGS. 26 to 31 are views illustrating an embodiment of a process of performing cross-component prediction according to the present invention.

FIGS. 26 and 27 show examples of defining input and output for performing cross-component prediction and implementing step S801 of generating the neighboring sample of the first component block.

More specifically, according to FIGS. 26 and 27, the location (xTbY, yTbY) of the corresponding first component block may be derived based on the location (xTbC, yTbC) of the second component block and the ratio (SubWidthC, SubHeightC) between the sizes of the first component block and the second component block. In addition, availability (avail, availT, availL, etc.) of neighboring samples may be determined, the number numSampT or numSampL of available neighboring samples and the above-described various variables (numIs4N, startPosN, numSampN, cntN, pickPosN, pickStepN, etc.) may be derived.

When the numbers numSampL and numSampT of available neighboring samples are both 0, as shown in Equation 27-7, the prediction sample predSamples of the second component block may be generated based on the bit depth.

When numSampL or numSampT is not 0, as step of performing cross-component prediction, the reconstructed sample (before deblocking filtering is performed) of the first component block at a location corresponding to the location of the second component block may be allocated to the inner sample (colocated luma samples pY[x][y]) of the first component block. In addition, the neighboring sample (neighboring luma samples pY[x][y]) of the first component block may be generated.

FIGS. 28 and 29 show examples of step S802 of performing down-sampling of the first component samples as step of performing cross-component prediction.

As shown in FIGS. 28 and 29, down-sampling may be performed with respect to the reconstructed first component block corresponding to the second component block, and down-sampled colocated luma samples pDsY[x][y] may be generated. Specifically, when SubWidthC and SubHeightC are both 1, that is, when the color format is YUV 4:4:4, as shown in Equation 28-1, down-sampling may not be performed. When SubWidthC or SubHeightC is not 1, the filter coefficient of down-sampling may be first determined and down-sampling may be performed using the determined filter coefficient. The filter coefficient to be used for down-sampling and the form of the filter may be variously determined as described above. Down-sampling may be performed based on information sps_chroma_vertical_collocated_flag signaled through the bitstream and the ratio between the sizes of the first component block and the second component block (SubWidthC and SubHeightC). In addition, down-sampling may be performed with respect to the reconstructed left and top neighboring samples of the first component block, thereby generating pSelDsY.

FIGS. 30 and 31 show examples of implementing step S803 of deriving the cross-component parameter as step of performing cross-component prediction.

As shown in FIG. 30, a maximum value maxY and a minimum value minY may be determined from the down-sampled neighboring sample pSelDsY of the first component block. For example, the maximum value maxY may be derived as an average of a first maximum value and a second maximum value of pSelDsY. In addition, the minimum value minY may be derived as an average of a first minimum value and a second minimum value of pSelDsY. In addition, the maximum value maxC and the minimum value minC may be determined from the neighboring sample pSelC of the second component block. For example, the maximum value maxC may be derived as an average of a value of a second component sample corresponding to a first maximum value of pSelDsY and a value of a second component sample corresponding to a second maximum value of pSelDsY. In addition, the minimum value minC may be derived as an average of a value of a second component sample corresponding to a first minimum value of pSelDsY and a value of a second component sample corresponding to a second minimum value of pSelDsY.

Thereafter, as shown in FIG. 31, at least one of cross-component parameters a, b and k may be derived.

As Equation 31-18 of FIG. 31, cross-component prediction may be performed using the derived cross-component parameter to generate the prediction samples predSamples of the second component block.

FIGS. 32 to 57 show various variations of a process of performing cross-component prediction according to the present invention.

The variations shown in FIGS. 32 to 57 are obtained by modifying some of the embodiments shown in FIGS. 26 to 31 and the basic procedures thereof may be the same. Specifically, FIGS. 32 to 37 show a first variation (variation #1), FIGS. 38 to 42 show a second variation (variation #2), FIGS. 43 to 47 show a third variation (variation #3), FIGS. 48 to 52 show a fourth variation (variation #4), and FIGS. 53 to 57 show a fifth variation (variation #5).

The above embodiments may be performed in the same method in an encoder and a decoder.

At least one or a combination of the above embodiments may be used to encode/decode a video.

A sequence of applying to above embodiment may be different between an encoder and a decoder, or the sequence applying to above embodiment may be the same in the encoder and the decoder.

The above embodiment may be performed on each luma signal and chroma signal, or the above embodiment may be identically performed on luma and chroma signals.

A block form to which the above embodiments of the present invention are applied may have a square form or a non-square form.

At least one of syntax elements (flags, indices, etc.) entropy-coded by the encoder and entropy-decoded by the decoder may use at least one of the following binarization methods.

Truncated Rice binarization method
K-th order Exp_Golomb binarization method
Restricted K-th order Exp_Golomb binarization method
Fixed-length binarization method
Unary binarization method
Truncated Unary binarization method
Truncated binary binarization method The above embodiment of the present invention may be applied depending on a size of at least one of a coding block, a prediction block, a transform block, a block, a current block, a coding unit, a prediction unit, a transform unit, a unit, and a current unit. Herein, the size may be defined as a minimum size or maximum size or both so that the above embodiments are applied, or may be defined as a fixed size to which the above embodiment is applied. In addition, in the above embodiments, a first embodiment may be applied to a first size, and a second embodiment may be applied to a second size. In other words, the above embodiments may be applied in combination depending on a size. In addition, the above embodiments may be applied when a size is equal to or greater that a minimum size and equal to or smaller than a maximum size. In other words, the above embodiments may be applied when a block size is included within a certain range.

For example, the above embodiments may be applied when a size of current block is 8×8 or greater. For example, the above embodiments may be applied when a size of current block is 4×4 only. For example, the above embodiments may be applied when a size of current block is 16×16 or smaller. For example, the above embodiments may be applied when a size of current block is equal to or greater than 16×16 and equal to or smaller than 64×64.

The above embodiments of the present invention may be applied depending on a temporal layer. In order to identify a temporal layer to which the above embodiments may be applied, a corresponding identifier may be signaled, and the above embodiments may be applied to a specified temporal layer identified by the corresponding identifier. Herein, the identifier may be defined as the lowest layer or the highest layer or both to which the above embodiment may be applied, or may be defined to indicate a specific layer to which the embodiment is applied. In addition, a fixed temporal layer to which the embodiment is applied may be defined.

For example, the above embodiments may be applied when a temporal layer of a current image is the lowest layer. For example, the above embodiments may be applied when a temporal layer identifier of a current image is 1. For example, the above embodiments may be applied when a temporal layer of a current image is the highest layer.

A slice type or a tile group type to which the above embodiments of the present invention are applied may be defined, and the above embodiments may be applied depending on the corresponding slice type or tile group type.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and structured for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

APPLICABILITY

The present invention may be used in an apparatus for encoding/decoding an image.

The invention claimed is:

1. A method of decoding an image, the method comprising:
  determining an intra prediction mode of a current block; and
  generating a prediction block of the current block, by performing prediction based on the intra prediction mode,
  wherein when the current block is a chroma block and the intra prediction mode of the current block is a cross-component prediction mode, the generating the prediction block of the current block includes:
    generating neighboring samples of a luma block corresponding to the current block;
    performing down-sampling with respect to the neighboring samples of the luma block by applying at least one filter to neighboring samples at specific locations among the neighboring samples of the luma block;
    deriving a cross-component parameter based on the down-sampled neighboring samples; and
    generating the prediction block of the current block based on the cross-component parameter,
  wherein the neighboring samples of the luma block includes at least one of top neighboring samples or left neighboring samples,
  wherein a number of samples used in a filter used for down-sampling of the top neighboring samples varies depending on whether a top boundary of the current block is a coding tree unit (CTU) boundary or not, and
  wherein an interval between the specific locations is determined based on a type of the cross-component prediction mode and the number of available neighboring samples of the current block.

2. The method of claim 1, wherein when the intra prediction mode of the current block is a matrix-based intra (MIP) mode, a length of top reference samples is derived as a width of the current block+1, and a length of left reference samples is derived as a height of the current block+1.

3. The method of claim 1, wherein when the intra prediction mode of the current block is a matrix-based intra (MIP) mode, a length of top reference samples is derived as twice a width of the current block and a length of left reference samples is derived as twice a height of the current block.

4. The method of claim 1,
  wherein, when the neighboring samples of the luma block are not available, the unavailable neighboring block is replaced with inner samples of the luma block.

5. The method of claim 4,
  wherein, when the unavailable neighboring samples are the top neighboring samples, the inner samples of the luma block are inner samples adjacent to a top boundary of the luma block, and
  wherein, when the unavailable neighboring samples the left neighboring samples, the inner samples of the luma block are inner samples adjacent to a left boundary of the luma block.

6. The method of claim 5,
  wherein the unavailable top neighboring samples and the inner samples adjacent to the top boundary of the luma block have the same x coordinate, and
  wherein the unavailable left neighboring samples and the inner samples adjacent to the left boundary of the luma block have the same y coordinate.

7. The method of claim 4,
  wherein the generating the prediction block of the current block further includes performing down-sampling with respect to the inner samples of the luma block, and
  wherein the filter used for down-sampling of the inner samples of the luma block is differently determined further based on whether the neighboring samples are available.

8. The method of claim 1, wherein a number of the neighboring samples of the luma block and weights to be applied to the neighboring samples of the luma block with respect to the filter become different based on whether the positions of the chroma signal and the luma signal corresponding thereto are same.

9. A method of encoding an image, the method comprising:
  determining an intra prediction mode of a current block; and generating a prediction block of the current block, by performing prediction based on the intra prediction mode, wherein when the current block is a chroma block and the intra prediction mode of the current block is a cross-component prediction mode, the generating the prediction block of the current block includes:

generating neighboring samples of a luma block corresponding to the current block;

performing down-sampling with respect to the neighboring samples of the luma block by applying at least one filter to neighboring samples at specific locations among the neighboring samples of the luma block;

deriving a cross-component parameter based on the down-sampled neighboring samples; and generating the prediction block of the current block based on the cross-component parameter, wherein the neighboring samples of the luma block includes at least one of top neighboring samples or left neighboring samples, wherein a number of samples used in a filter used for down-sampling of the top neighboring samples varies depending on whether a top boundary of the current block is a coding tree unit (CTU) boundary or not, and wherein an interval between the specific locations is determined based on a type of the cross-component prediction mode and the number of available neighboring samples of the current block.

10. The method of claim 9, wherein when the intra prediction mode of the current block is a matrix-based intra (MIP) mode, a length of top reference samples is derived as a width of the current block+1, and a length of left reference samples is derived as a height of the current block+1.

11. The method of claim 9, wherein when the intra prediction mode of the current block is a matrix-based intra (MIP) mode, a length of top reference samples is derived as twice a width of the current block and a length of left reference samples is derived as twice a height of the current block.

12. The method of claim 9,
wherein, when the neighboring samples of the luma block are not available, the unavailable neighboring block is replaced with inner samples of the luma block.

13. The method of claim 12,
wherein, when the unavailable neighboring samples are the top neighboring samples, the inner samples of the luma block are inner samples adjacent to a top boundary of the luma block, and
wherein, when the unavailable neighboring samples the left neighboring samples, the inner samples of the luma block are inner samples adjacent to a left boundary of the luma block.

14. The method of claim 12,
wherein the generating the prediction block of the current block further includes performing down-sampling with respect to the inner samples of the luma block, and
wherein the filter used for down-sampling of the inner samples of the luma block is differently determined further based on whether the neighboring samples are available.

15. The method of claim 9, wherein a number of the neighboring samples of the luma block and weights to be applied to the neighboring samples of the luma block with respect to the filter become different based on whether the positions of the chroma signal and the luma signal corresponding thereto are same.

16. A non-transitory computer-readable recording medium for storing a bitstream generated by an image encoding method, the image encoding method comprises:

determining an intra prediction mode of a current block; and generating a prediction block of the current block, by performing prediction based on the intra prediction mode, wherein when the current block is a chroma block and the intra prediction mode of the current block is a cross-component prediction mode, the generating the prediction block of the current block includes:

generating neighboring samples of a luma block corresponding to the current block;

performing down-sampling with respect to the neighboring samples of the luma block by applying at least one filter to neighboring samples at specific locations among the neighboring samples of the luma block;

deriving a cross-component parameter based on the down-sampled neighboring samples; and generating the prediction block of the current block based on the cross-component parameter, wherein the neighboring samples of the luma block includes at least one of top neighboring samples or left neighboring samples, wherein a number of samples used in a filter used for down-sampling of the top neighboring samples varies depending on whether a top boundary of the current block is a coding tree unit (CTU) boundary or not, and wherein an interval between the specific locations is determined based on a type of the cross-component prediction mode and the number of available neighboring samples of the current block.

* * * * *